United States Patent
Kuwamura

(10) Patent No.: US 9,465,595 B2
(45) Date of Patent: Oct. 11, 2016

(54) COMPUTING APPARATUS, COMPUTING METHOD, AND COMPUTING PROGRAM

(71) Applicant: FUJITSU LIMITED, Kawasaki-shi, Kanagawa (JP)

(72) Inventor: Shinya Kuwamura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 322 days.

(21) Appl. No.: 14/289,772

(22) Filed: May 29, 2014

(65) Prior Publication Data

US 2014/0365735 A1    Dec. 11, 2014

(30) Foreign Application Priority Data

Jun. 11, 2013  (JP) ................. 2013-122786

(51) Int. Cl.
| | |
|---|---|
| G06F 12/08 | (2016.01) |
| G06F 11/34 | (2006.01) |
| G06F 9/45 | (2006.01) |
| G06F 12/10 | (2016.01) |
| G06F 9/455 | (2006.01) |

(52) U.S. Cl.
CPC ............. G06F 8/52 (2013.01); G06F 8/4442 (2013.01); G06F 9/455 (2013.01); G06F 11/3457 (2013.01); G06F 12/0802 (2013.01); G06F 12/0888 (2013.01); G06F 12/1027 (2013.01)

(58) Field of Classification Search
None
See application file for complete search history.

(56) References Cited

U.S. PATENT DOCUMENTS

| | | | | |
|---|---|---|---|---|
| 4,888,688 A * | 12/1989 | Hartvigsen | ......... | G06F 12/1027 711/202 |
| 5,845,310 A * | 12/1998 | Brooks | ................... | G06F 11/32 710/18 |
| 5,931,951 A * | 8/1999 | Ando | .................... | G06F 1/3228 711/141 |
| 6,016,466 A * | 1/2000 | Guinther | ............. | G06F 11/3419 702/186 |
| 6,442,652 B1 * | 8/2002 | Laboy | ..................... | G06F 11/00 455/12.1 |
| 2002/0166112 A1 * | 11/2002 | Martin | ................ | G06F 11/3447 717/124 |
| 2004/0193395 A1 * | 9/2004 | Paulraj | ................ | G06F 17/5018 703/22 |
| 2005/0120341 A1 * | 6/2005 | Blumenthal | ........ | G06F 11/3428 717/158 |
| 2009/0119477 A1 * | 5/2009 | Plondke | .............. | G06F 12/1027 711/207 |

FOREIGN PATENT DOCUMENTS

JP    2001-249829    9/2001

* cited by examiner

*Primary Examiner* — Michael Krofcheck
(74) *Attorney, Agent, or Firm* — Staas & Halsey LLP

(57) ABSTRACT

A computing apparatus computes a performance value of a program which includes a specific code which is executed multiple times by the processor and an access instruction for instructing the processor to access a memory area. The computing apparatus includes: a determining unit that determines, whether or not a cache memory is available for use at a time of execution of the access instruction in a simulation of an operation in which the processor executes the program; a generating unit that generates, in a case where the first determining unit has determined that the cache memory is not available, a computational code for computing the performance value of the specific code for a case where the processor executes the specific code, based on performance values of individual instructions within the specific code for a case where the cache memory is not used, without depending on an attribute of the memory area.

14 Claims, 37 Drawing Sheets

| INSTRUCTION | REFERENCE VALUE | SOURCE REGISTER | DESTINATION REGISTER | PENALTY |
|---|---|---|---|---|
| ld | 2 | rs1: e1 | rd: e2 | DATA CACHE: 6, TLB AVAILABLE FOR USE: 6, TLB UNAVAILABLE FOR USE: 2 |
| mult | 3 | rs1: e1, rs2: e2 | rd: e3 | – |
| add | 3 | rs1: e1, rs2: e1 | rd: e2 | – |
| ... | ... | ... | ... | ... |

320

| PROCESSING DETAILS | PREDICTION CASE |
|---|---|
| DATA CACHE | HIT |
| INSTRUCTION CACHE | HIT |
| TLB | HIT |
| BRANCH PREDICTION | HIT |
| CALL/RETURN | HIT |

```
cache_ld( address, rep_delay, pre_delay ) {
         avail_delay = 0;
         if(pre_delay < current_time - preld_time)
                  avail_delay = pre_delay - current_time + preld_time;
         cache_lookup( address );
         if(cache_hit) {
                  cache_update_onhit( address );
         } else {
                  cache_update_onmiss( address );
                  avail_delay += cache_miss_latency
                  if(rep_delay < avail_delay)
                           avail_delay -= avail_delay - rep_delay;
         }
         preld_time = current_time;
}
```

PELATED ART

PELATED ART

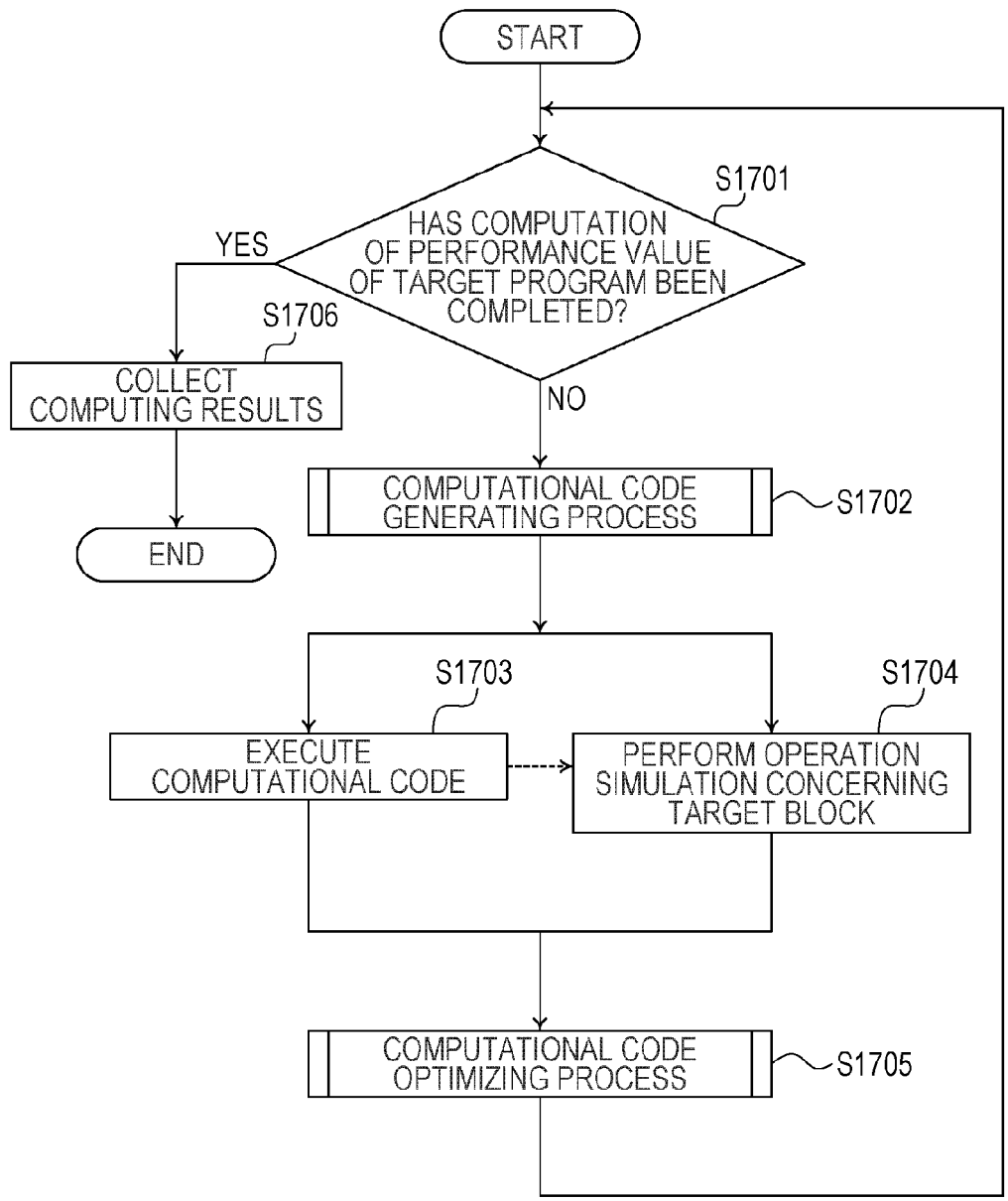

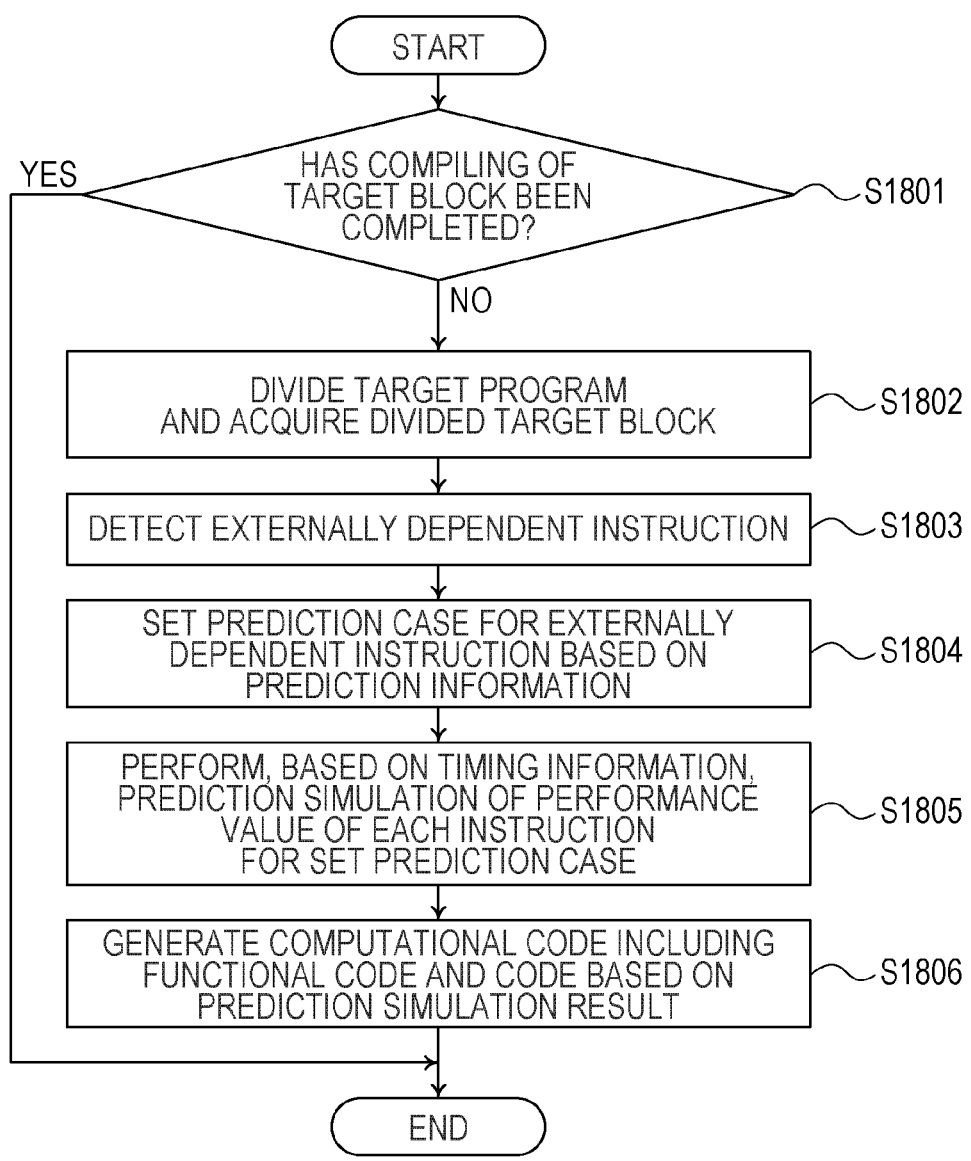

FIG. 32 m_helper = 6                                          cc321

1: HOST INSTRUCTION OF INSTRUCTION i1
2: HOST INSTRUCTION OF INSTRUCTION i2
3: PERFORMANCE COMPUTING INSTRUCTION 1 OF INSTRUCTION i1
4: PERFORMANCE COMPUTING INSTRUCTION 2 OF INSTRUCTION i1: PERFORMANCE VALUE=1
5: PERFORMANCE COMPUTING INSTRUCTION 3 OF INSTRUCTION i1
6: HELPER FUNCTION 1 CALL INSTRUCTION OF INSTRUCTION i2: PERFORMANCE VALUE=2 ← m_helper

FIG. 33 r_start = 3                                           cc321

1: HOST INSTRUCTION OF INSTRUCTION i1
2: HOST INSTRUCTION OF INSTRUCTION i2
3: PERFORMANCE COMPUTING INSTRUCTION 1 OF INSTRUCTION i1 ← r_start
4: PERFORMANCE COMPUTING INSTRUCTION 2 OF INSTRUCTION i1: PERFORMANCE VALUE=1
5: PERFORMANCE COMPUTING INSTRUCTION 3 OF INSTRUCTION i1
6: HELPER FUNCTION 1 CALL INSTRUCTION OF INSTRUCTION i2: PERFORMANCE VALUE=2

FIG. 34 r_end = 6                                             cc321

1: HOST INSTRUCTION OF INSTRUCTION i1
2: HOST INSTRUCTION OF INSTRUCTION i2
3: PERFORMANCE COMPUTING INSTRUCTION 1 OF INSTRUCTION i1 ← r_start
4: PERFORMANCE COMPUTING INSTRUCTION 2 OF INSTRUCTION i1: PERFORMANCE VALUE=1
5: PERFORMANCE COMPUTING INSTRUCTION 3 OF INSTRUCTION i1
6: HELPER FUNCTION 1 CALL INSTRUCTION OF INSTRUCTION i2: PERFORMANCE VALUE=2 ← r_end sum = 1+2 = 3

L_helper = {2} sum = 2+1 = 3

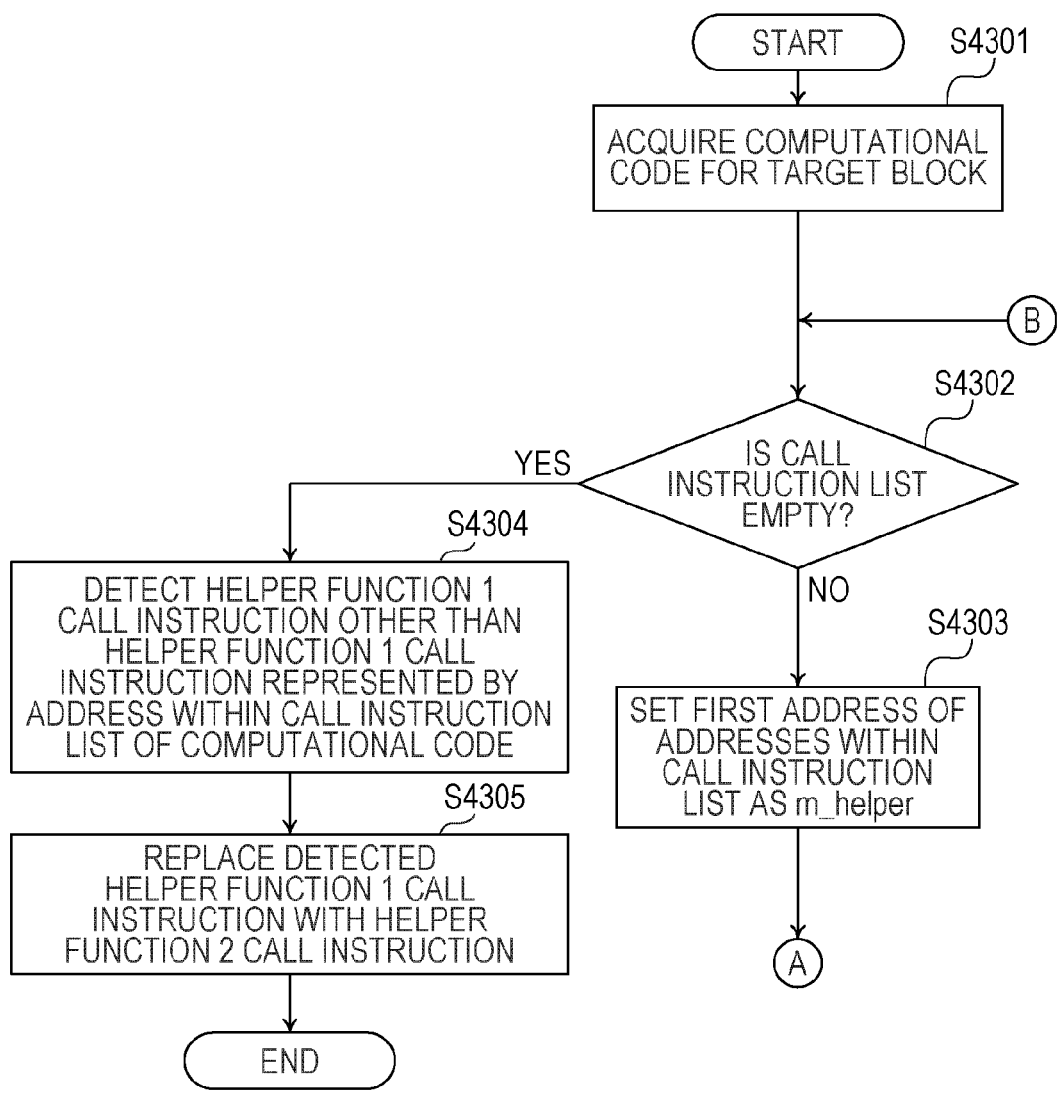

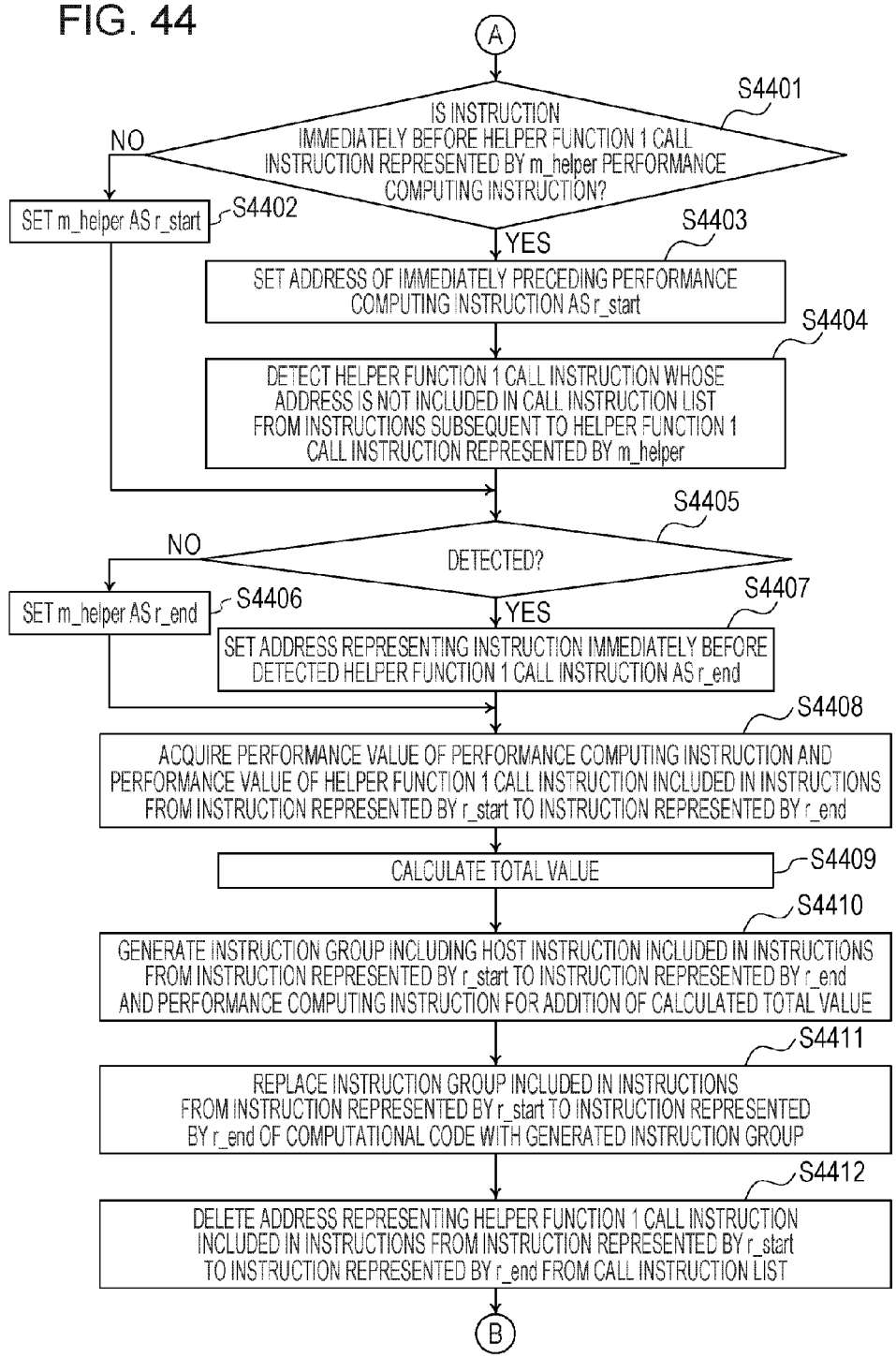

COMPUTING APPARATUS, COMPUTING METHOD, AND COMPUTING PROGRAM

CROSS-REFERENCE TO RELATED APPLICATION

This application is based upon and claims the benefit of priority of the prior Japanese Patent Application No. 2013-122786, filed on Jun. 11, 2013, the entire contents of which are incorporated herein by reference.

FIELD

The embodiments discussed herein are related to a computing apparatus, a computing method, and a computing program.

BACKGROUND

A technique for outputting the operational result of a cache memory accessible by a central processing unit (CPU) in the process of a simulation of an operation in which the CPU executes a program and computing, based on the operational result, the performance value of the program for the case where the CPU executes the program, has been available (see, for example, Japanese Laid-open Patent Publication No. 2001-249829).

However, in the existing technique, every time an access instruction for instructing the CPU to access a memory area is executed during the simulation of the operation, the operational result of the cache memory is referred to and the performance value of the program is computed. Accordingly, there is a problem that the amount of computation for the performance values of access instructions increases.

In an aspect, the embodiments discussed herein aim to provide a computing apparatus, a computing method, and a computing program capable of reducing the amount of computation.

SUMMARY

According to an aspect of the invention, a computing apparatus that computes a performance value of a program for a case where the program is executed by a processor, the program including a specific code which is executed multiple times by the processor and which includes an access instruction for instructing the processor to access a memory area, the computing apparatus includes:

a first determining unit that determines, in a case where the specific code has become a computing target for a performance value, whether or not a cache memory accessible by the processor is in an available state for use at a time of execution of the access instruction in a simulation of an operation in which the processor executes the program, in accordance with a direction of the access instruction;

a generating unit that generates, in a case where the first determining unit has determined that the cache memory is not in the available state for use, a computational code for computing the performance value of the specific code for a case where the processor executes the specific code, based on performance values of individual instructions within the specific code for a case where the cache memory is not used, without depending on an attribute of the memory area; and an execution unit that executes the generated computational code in a case where the specific code has become a new computing target for a performance value.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 13 is an explanatory diagram illustrating a detailed example of helper function 2 concerning a data cache memory of an Id instruction;

FIG. 17 is a flowchart illustrating an example of a computing processing procedure by the computing apparatus according to the first and second embodiments;

FIG. 18 is a flowchart illustrating a generation process illustrated in FIG. 17 according to the first and second embodiments in more detail;

FIG. 32 is an explanatory diagram (part 1) illustrating detailed operation example 1 by the code optimization unit;

FIG. 33 is an explanatory diagram (part 2) illustrating detailed operation example 1 by the code optimization unit;

FIG. 34 is an explanatory diagram (part 3) illustrating detailed operation example 1 by the code optimization unit;

FIG. 43 is a flowchart (part 1) illustrating the code optimization process illustrated in FIG. 17 in more detail; and FIG. 44 is a flowchart (part 2) illustrating the code optimization process illustrated in FIG. 17 in more detail.

DESCRIPTION OF EMBODIMENTS

In embodiments, a simulation of function and performance in the case where a first processor which is to be evaluated executes a target program is performed by a second processor included in a computing apparatus. As a technique for converting the target program of the first processor into a code which may be executed by the second processor when the second processor performs a simulation of function and performance, for example, an interpreter method or a just-in-time (JIT) compiler method may be used. A computing apparatus according to the embodiments performs a simulation of performance by the JIT complier method. The first processor is referred to as a target CPU, and the second processor is referred to as a host CPU.

Hereinafter, with reference to the illustrations provided, a computing apparatus, a computing method, and a computing program according to embodiments will be explained in detail.

Figure 1:
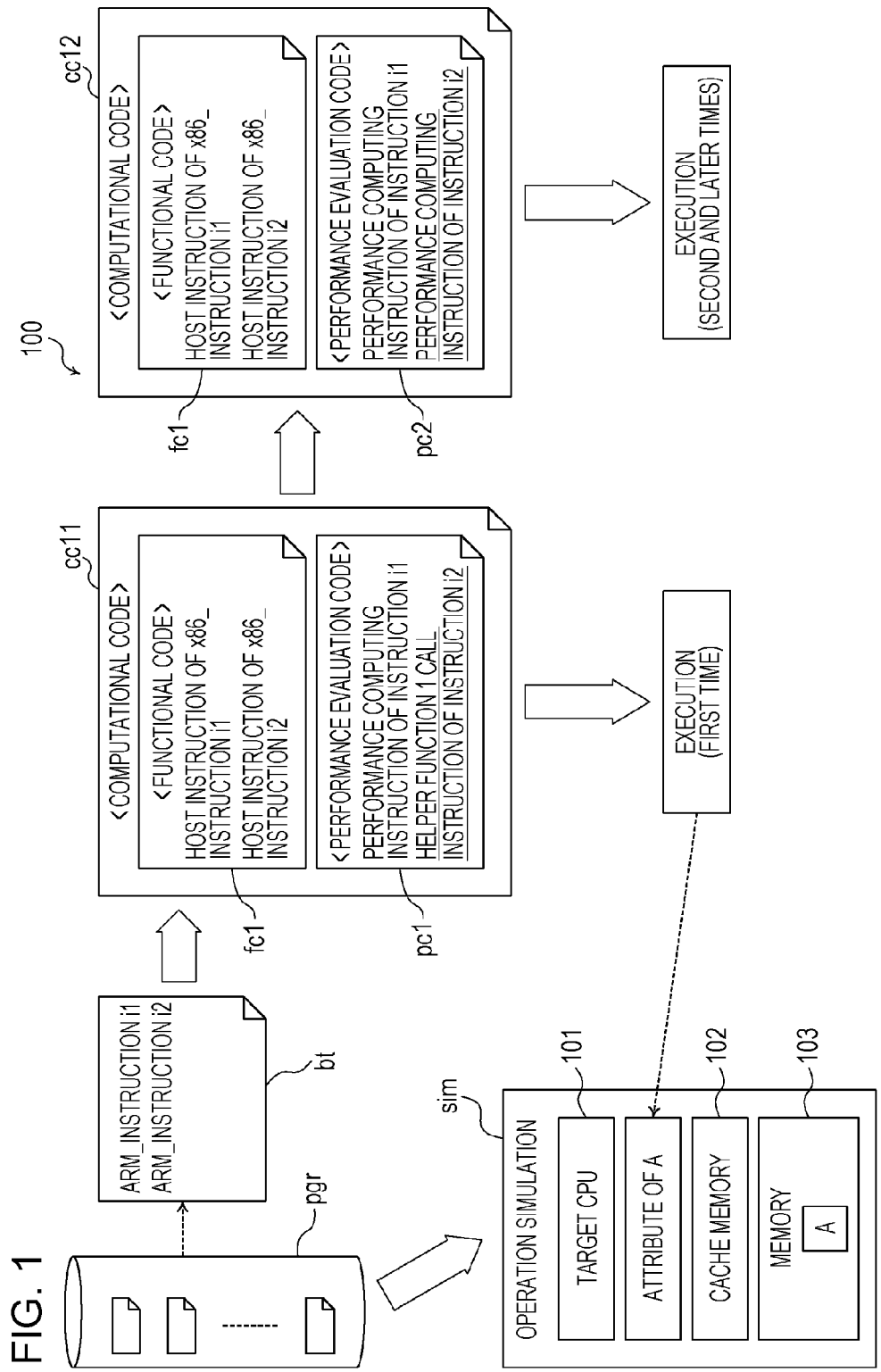
FIG. 1 is an explanatory diagram illustrating an example of an operation by a computing apparatus according to an embodiment.

FIG. 1 is an explanatory diagram illustrating an example of an operation by a computing apparatus according to an embodiment. A computing apparatus 100 is a computer which computes a performance value of a target program pgr in the case where a target CPU 101 executes the target program pgr. Here, a performance value represents the number of cycles and an execution time. A processor included in the computing apparatus 100 is referred to as a host CPU. Here, each code split from the target program pgr is referred to as a block. The target program pgr includes a block bt which includes an access instruction for instructing the target CPU 101 to access a memory area A within a memory 103 and which is executed multiple times by the target CPU. An access instruction is, for example, an ld (load) instruction or an st (store) instruction. Here, for example, the block bt includes an instruction i1 and an instruction i2. The instruction i2 is an access instruction for instructing the target CPU 101 to access the memory area A within the memory 103.

Furthermore, the computing apparatus 100 executes an operation simulation sim, which is a simulation of an operation of the case in which the target CPU 101 executes the target program pgr. The operation simulation sim here is, for example, a simulation for providing the target program pgr to a model of a system including the target CPU 101 and hardware resources that the target CPU 101 may access. In the example provided in FIG. 1, hardware resources include a cache memory 102 and a memory 103. A model of a system used in this embodiment is, for example, a behavior model reproducing only the function of a system by hardware description language or the like. Here, the timing to execute each block bt of the operation simulation sim is the same as the timing to execute a computational code cc11 for computing the performance value of the block bt. Here, for example, the target CPU 101 is a CPU of ARM® architecture, and the host CPU included in the computing apparatus 100 is, for example, a CPU of x86 architecture.

In the case where the block bt becomes a computing target, the computing apparatus 100 generates the computational code cc11. The computational code cc11 includes a functional code fc1 and a performance evaluation code pc1. The functional code fc1 includes host instructions of individual instructions within the block bt obtained by compiling the block bt. The performance evaluation code pc1 includes an instruction for computing the performance value of the block bt in the case where the target CPU 101 executes the block bt using the performance value of each instruction within the block bt based on an attribute of the cache memory 102 accessible by the target CPU 101. More specifically, the performance evaluation code pc1 includes a performance computing instruction, which is a first instruction of the instruction i1, and a helper function 1 call instruction, which is a second instruction of the instruction i2. The performance computing instruction of the instruction i1 is an instruction for instructing the target CPU 101 to add the performance value of the instruction i1 to the performance value of the block bt. The helper function 1 call instruction of the instruction i2 is an instruction for calling a helper function 1 which corrects the performance value of the instruction i2 according to the attribute of the memory area A at the time of execution of the instruction i2 in the operation simulation sim and the operational result of the cache memory 102. Furthermore, the helper function 1 call instruction of the instruction i2 is an instruction for adding the performance value output by the execution of the helper function 1 to the performance value of the block bt.

The computing apparatus 100 then executes the computational code c11. Here, the computing apparatus 100 performs a simulation of a function by executing the functional code fc1 within the computational code a11. Furthermore, the computing apparatus 100 performs a simulation of a performance by executing the performance evaluation code pc1 within the computational code a11. After executing the helper function 1 call instruction of the instruction i2 within the computational code a11, the computing apparatus 100 calls the helper function 1. Next, the computing apparatus 100 executes the helper function 1 which has been called out. The computing apparatus 100 determines, according to the helper function 1, whether or not the attribute of the memory area A at the time of execution of the instruction i2 in the operation simulation sim is an attribute which indicates that the target CPU 101 is able to use the cache memory 102. For example, in the case where the target CPU 101 is an ARM processor, it is assumed that the attribute of the memory area A represents values of TEX, B, and C bits set on a page table entry for the memory area A. For example, when all the values of TEX, B, and C bits are 1, the computing apparatus 100 determines that the attribute of the memory area A is an attribute which indicates that the cache memory 102 is available for use. Furthermore, when either one of the values of TEX, B, and C bits is not 1, the computing apparatus 100 determines that the attribute of the memory area A is not an attribute which indicates that the cache memory 102 is available for use.

In the case where the computing apparatus 100 has determined that the attribute indicates that the cache memory 102 is available for use, the computing apparatus 100 corrects, based on the operational result of the cache memory 102 in the operation simulation sim, the performance value, and adds the corrected performance value to the performance value of the block bt. The operational result of the cache memory 102 is either one of a cache hit and a miss hit.

In the case where the computing apparatus 100 has determined that the attribute does not indicate that the cache memory 102 is available for use, the computing apparatus 100 makes a correction to a performance value for the case where the cache memory 102 is not used, and adds the corrected performance value to the performance value of the block bt. Then, the computing apparatus 100 executes the computational code cc11 in the case where the block bt becomes a new computing target for a performance value.

In the case where the computing apparatus 100 has determined that the attribute does not indicate that the cache memory 102 is available for use, the computing apparatus 100 generates a computational code cc12. The computational code cc12 is a code for computing the performance value of the block bt for the case where the target CPU 101 executes the block bt, based on performance values of individual instructions within the block bt for the case where the cache memory 102 is not used, without depending on the attribute. More specifically, the computing apparatus 100 replaces the helper function 1 call instruction of the instruction i2 with a performance computing instruction for adding the performance value of the instruction i2 for the case where the cache memory 102 is not used to the performance value of the block bt. Accordingly, the computing apparatus 100 generates the computational code cc12 which includes a performance evaluation code pc1 which includes a performance computing instruction of the instruction i2. In the case where the block bt becomes a new computing target for a performance value, the computing apparatus 100 executes the generated computational code cc12. Accordingly, the amount of computation for the case where the block bt becomes a new computing target may be reduced.

Example of Hardware Configuration of Computing Apparatus 100

Figure 2:
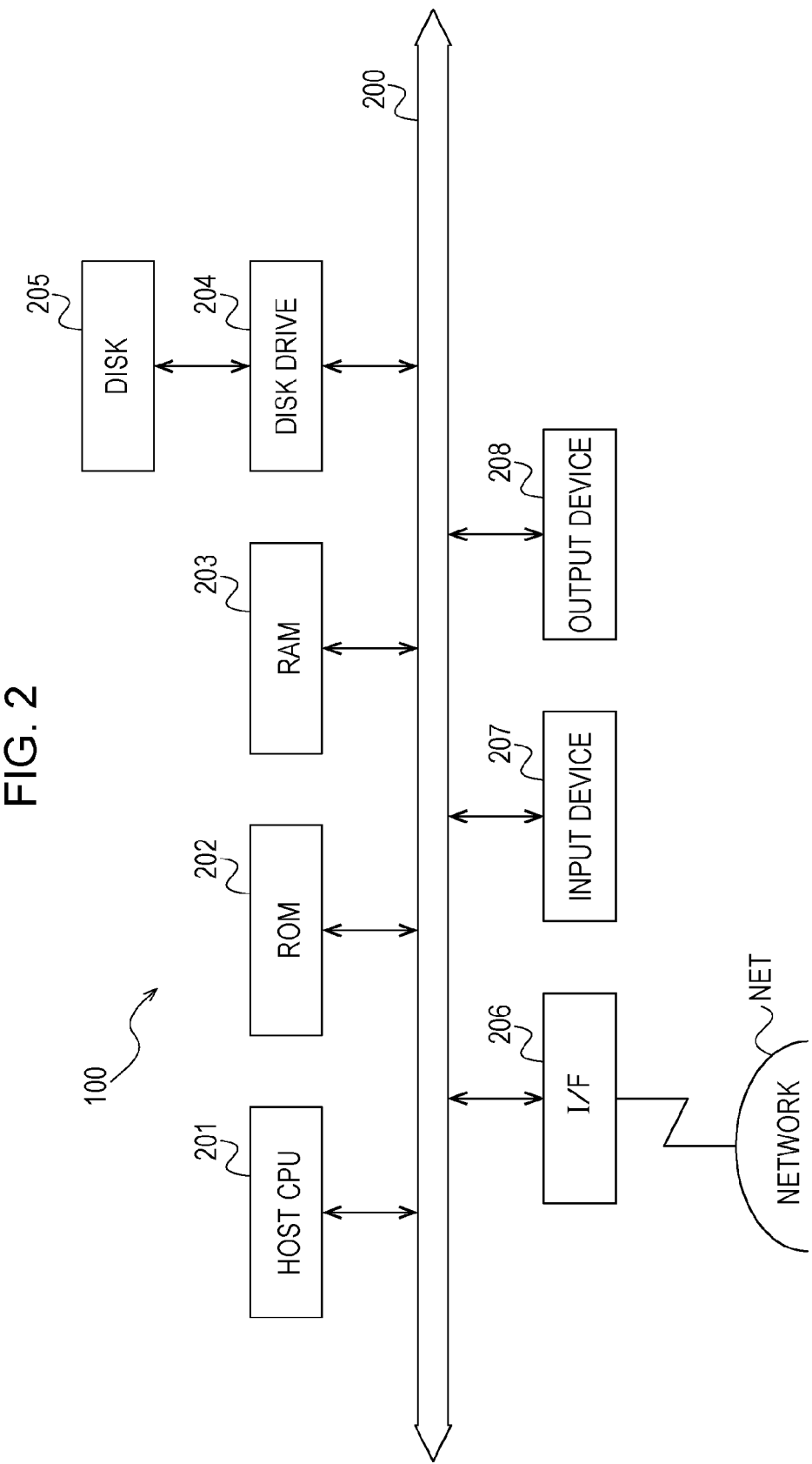
FIG. 2 is a block diagram illustrating an example of a hardware configuration of a computing apparatus according to an embodiment.

FIG. 2 is a block diagram illustrating an example of a hardware configuration of a computing apparatus according to an embodiment. The computing apparatus 100 includes a host CPU 201, a read only memory (ROM) 202, a RAM 203, a disk drive 204, and a disk 205. The computing apparatus 100 also includes an interface (I/F) 206, an input device 207, and an output device 208. Furthermore, the individual components are connected by a bus 200.

Here, the host CPU 201 controls the entire computing apparatus 100. The ROM 202 stores programs such as a boot program. The RAM 203 is a memory unit used as a work area for the host CPU 201. The disk drive 204 controls the reading/writing of data from/to the disk 205 under the control of the host CPU 201. The disk 205 stores data written under the control of the disk drive 204. The disk 205 may be a magnetic disk, an optical disk, or the like.

The I/F 206 is connected to a network NET, such as a local area network (LAN), a wide area network (WAN), or the Internet, through a communication line and is connected to a different apparatus via the network NET. Furthermore, the I/F 206 serves as an interface with the network NET, and controls the input/output of data to/from an external apparatus. The I/F 206 may be, for example, a modem or a LAN adapter.

The input device 207 is an interface, such as a keyboard, a mouse, or a touch panel, for inputting various data based on a user operation. Furthermore, the input device 207 may also capture images and moving images from a camera. Moreover, the input device 207 may also capture sound from a microphone. The output device 208 is an interface for outputting data in accordance with an instruction from the host CPU 201. The output device 208 may be, for example, a display monitor or a printer.

The embodiments will be described separately as first to fifth embodiments. In the first embodiment, in a simulation of an operation of a block including an access instruction, in the case where an access destination of the access instruction is not able to use a cache memory, a computational code for computing a performance value of the block based on the assumption that the cache memory is not used, is generated.

In the second embodiment, in the case where an access instruction within a target block is able to use a cache memory, a computational code for computing a performance value of the block by correcting the performance value based on an operation of the cache memory, without depending on an attribute of a memory area, is generated.

In the third embodiment, during the period of time in which a cache memory is shifted from an unavailable state for use to an available state for use, a computational code for computing a performance value of a target block based on a performance value of an access instruction for the case where the cache memory is not used, is executed. Furthermore, in the third embodiment, during the period of time in which a translation lookaside buffer (TLB) is shifted from an unavailable state for use to an available state for use, a computational code for computing a performance value of a target block based on a performance value of an access instruction for the case where the TLB is not used, is executed.

In the fourth embodiment, in the case where an operation mode of a target CPU at the time when an access instruction in a simulation of an operation is being executed is a privileged mode, a computational code for computing the performance value of a target block, based on performance values of individual instructions of the target block for the case where there is a hit in a TLB, is generated.

In the fifth embodiment, in replacing a helper function 1 call instruction with a performance computing instruction in the first to fourth embodiments, consecutive performance computing instructions are integrated into one performance computing instruction.

First Embodiment

A memory address space includes an area in which a data cache memory is available for use and an area in which a data cache memory is unavailable for use. For example, an area in which a device is mapped or the like, is an area in which a data cache memory is unavailable for use. Therefore, the performance value of an access instruction for access to an area in which a data cache memory is unavailable for use is stable. Thus, in the first embodiment, in a simulation of an operation of a block including an access instruction, in the case where an access destination of the access instruction is not able to use a cache memory, a computational code for computing a performance value of the block based on the assumption that the cache memory is not used, is generated. Accordingly, the amount of computation when the block becomes a target again may be reduced.

Figure 3:
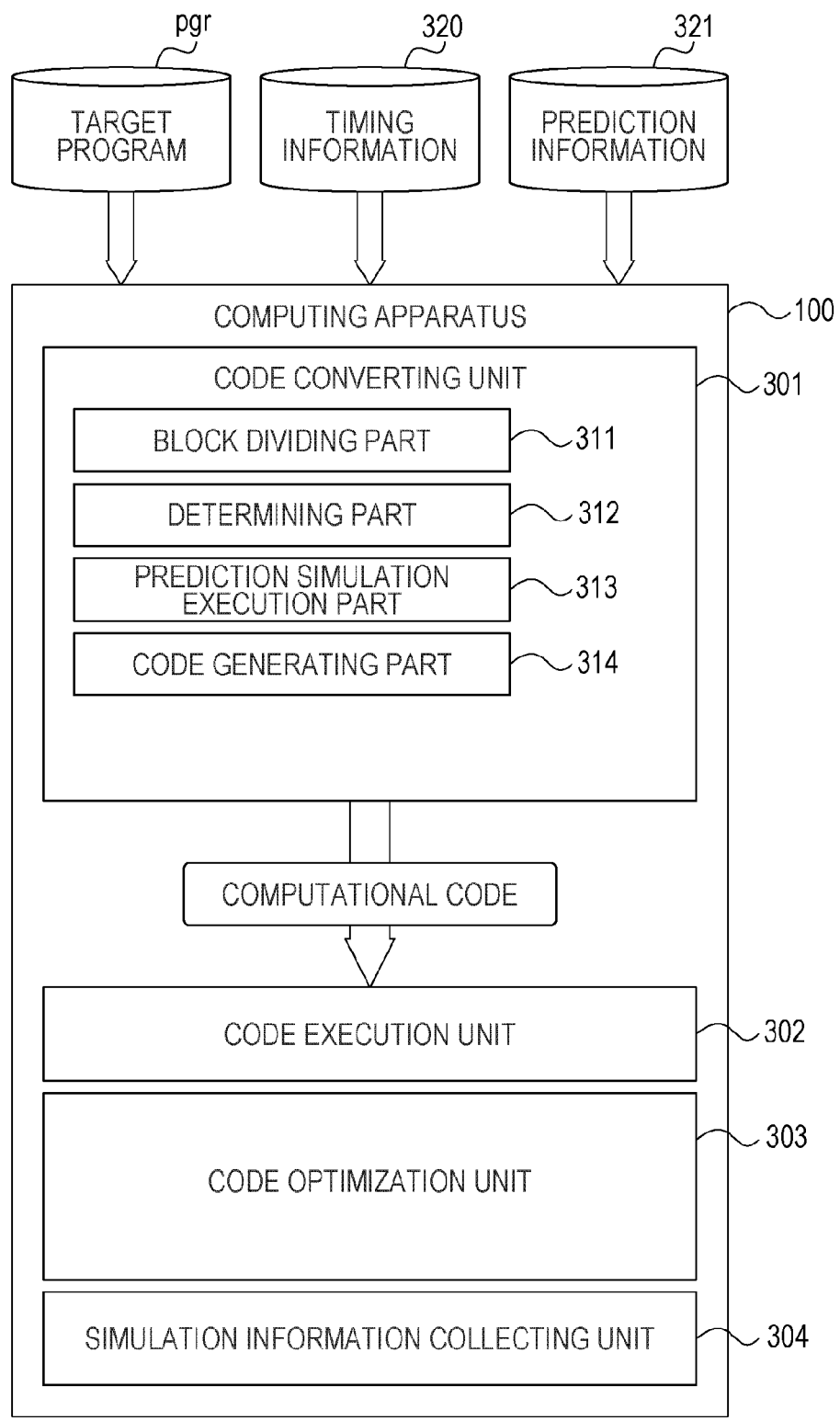
FIG. 3 is a block diagram illustrating an example of a functional configuration of a computing apparatus according to a first embodiment.

Example of Functional Configuration of Computing Apparatus 100 According to First Embodiment FIG. 3 is a block diagram illustrating an example of a functional configuration of a computing apparatus according to the first embodiment. The computing apparatus 100 includes a code converting unit 301, a code execution unit 302, a code optimization unit 303, and a simulation information collecting unit 304.

Processing from the code converting unit 301 to the simulation information collecting unit 304, for example, is coded on a simulation program stored in a memory device, such as the disk 205, which is accessible by the host CPU 201. The host CPU 201 reads a computing program stored in the memory device, and executes processing coded on the computing program. Accordingly, the processing from the code converting unit 301 to the simulation information collecting unit 304 is implemented. Furthermore, the processing result of each unit is stored, for example, in the memory device such as the RAM 203 or the disk 205.

Furthermore, timing information 320, the target program pgr, and prediction information 321 are obtained in advance, and is stored in the memory device such as the RAM 203 or the disk 205.

The code converting unit 301 generates a computational code with which a performance value for the case where a target block is executed by the target CPU 101 may be calculated based on the performance value of each instruction of the target block. The code execution unit 302 calculates, by executing the computational code, the performance value for the case where the target block is executed by the target CPU 101.

More specifically, the code converting unit 301 includes a block dividing part 311, a determining part 312, a prediction simulation execution part 313, and a code generating part 314.

The block dividing part 311 divides the target program pgr input to the computing apparatus 100 into blocks according to predetermined criteria. Regarding the timing for division, for example, in the case where a target block has changed, a new target block may be divided or the target program pgr may be divided into a plurality of blocks beforehand. A unit of a divided block may, for example, be a basic block unit, or any predetermined code unit. The basic block unit is an instruction group of instructions starting from a branching instruction up to but not including the next branching instruction.

Figure 4:
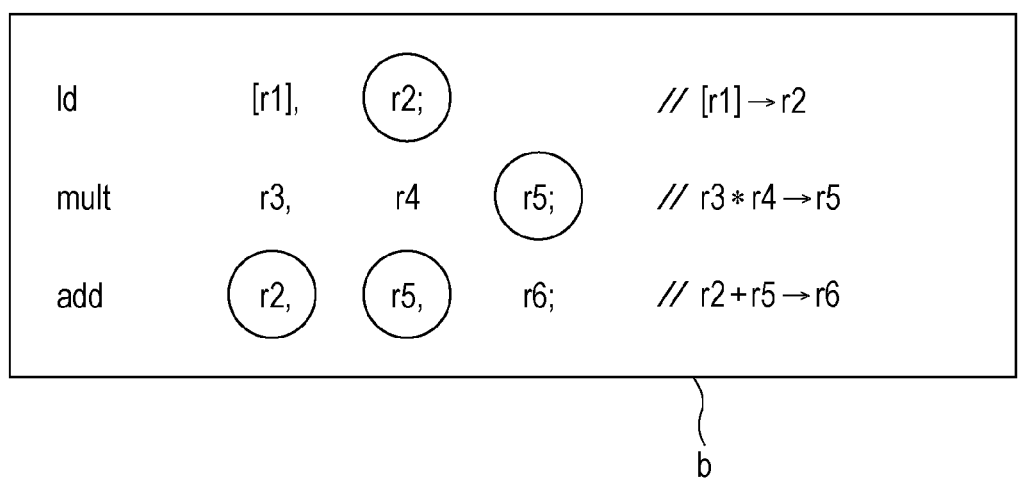
FIG. 4 is a diagram illustrating an example of instructions included in a block.

FIG. 4 is a diagram illustrating an example of instructions included in a block. As illustrated in FIG. 4, it is assumed that, in a block b within the target program pgr, three instructions: (1) "ld [r1], r2" (load); (2) "mult r3, r4, r5" (multiplication); and (3) "add r2, r5, r6" (addition), are included, which are input to the pipeline of the target CPU 101 and executed in the order of (1) to (3). For the individual instructions, r1 to r6 each represent a register (address). Hereinafter, blocks and target blocks will all have a reference sign b, even when they are not the same as the block illustrated in FIG. 4.

Figure 5:
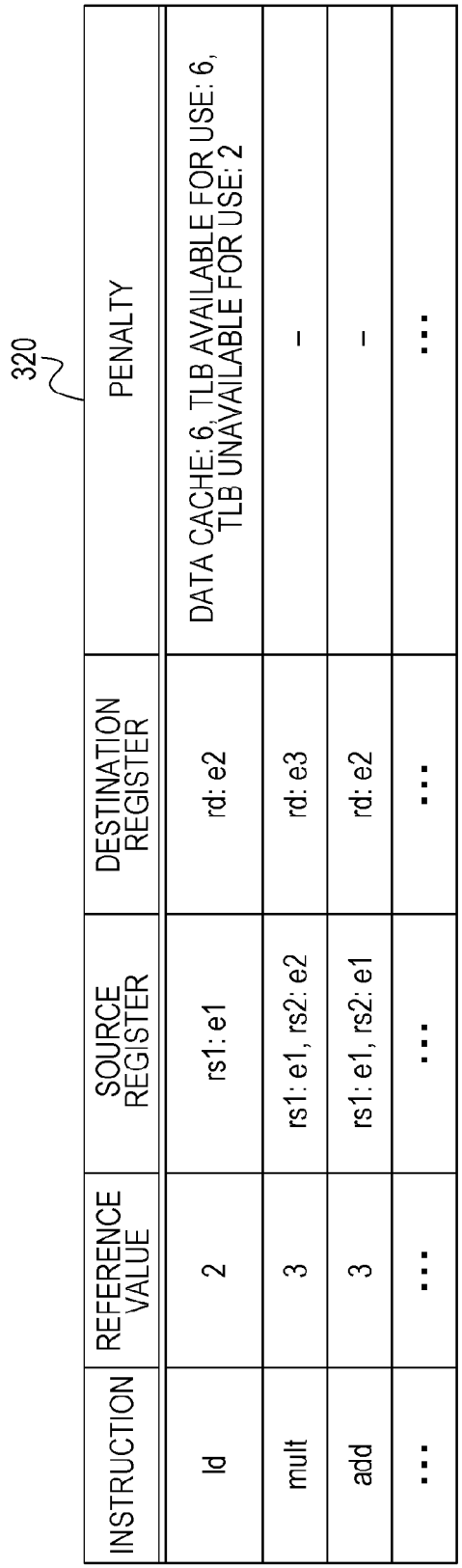
FIG. 5 is a diagram illustrating an example of timing information.

FIG. 5 is a diagram illustrating an example of timing information. The timing information 320 illustrated in FIG. 5 indicates that, for the ld instruction, a source register rs1 (r1) is available for use in the first processing element (e1) and a destination register rd (r2) is available for use in the second processing element (e2). Furthermore, the timing information 320 indicates that, for the mult instruction, a first source register rs1 (r3) is available for use in the first processing element (e1), a second source register rs2 (r4) is available for use in the second processing element (e2), and a destination register rd (r5) is available for use in the third processing element (e3). Moreover, the target information 320 indicates that, for the add instruction, the first source register rs1 (r2) and the second source register rs2 (r5) are available for use in the first processing element (e1) and a destination register rd (r6) is available for use in the second processing element (e2).

Figure 6A:
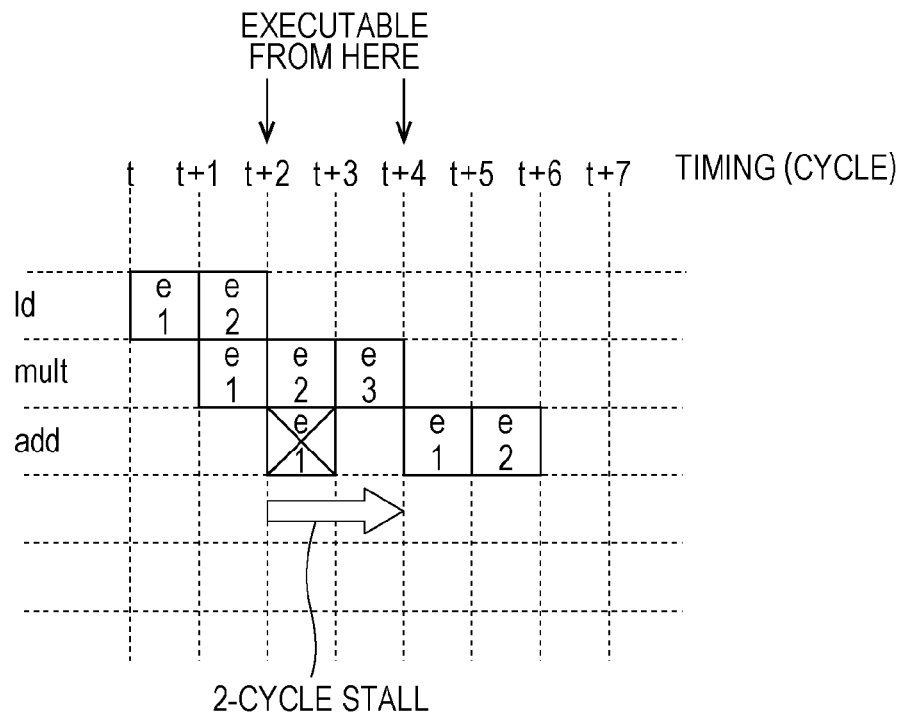
FIGS. 6A and 6B are diagrams illustrating examples of execution timings of individual instructions of the block illustrated in FIG. 4.
Figure 6B:
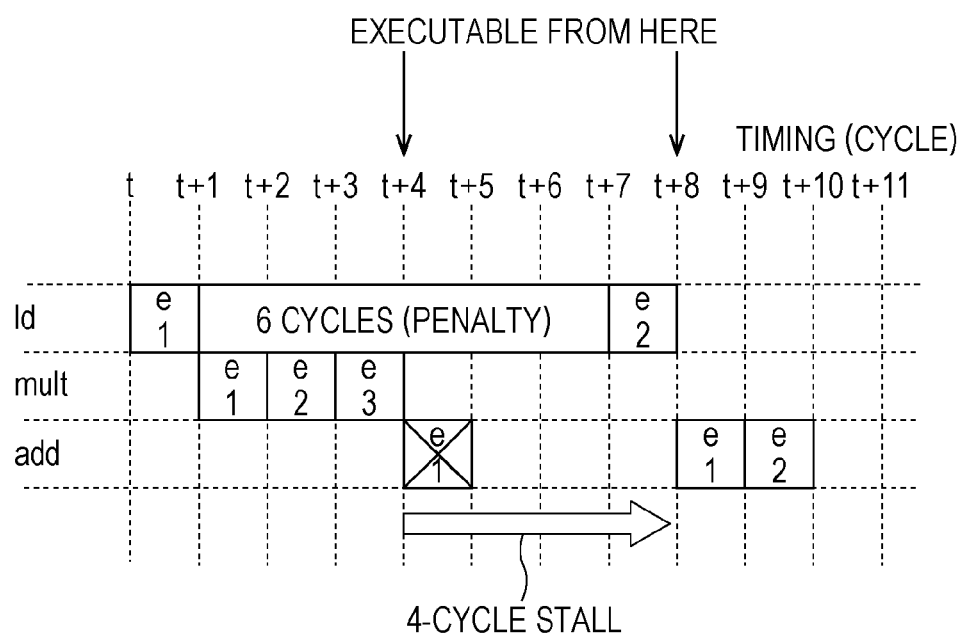

FIGS. 6A and 6B are diagrams illustrating examples of execution timings of the individual instructions of the block illustrated in FIG. 4. Referring to the timing information 320 illustrated in FIG. 5, the timings at which the instructions are input to the pipeline are, assuming the execution start of the ld instruction as a timing t, the mult instruction is input at a timing t+1, and the add instruction is input at a timing t+2. The first source register (r2) and the second source register (r5) of the add instruction are being used in the ld instruction and the mult instruction. Therefore, the add instruction starts at or after a timing t+4, by when the execution of the ld instruction and the mult instruction is completed, thereby generating a latency corresponding to two cycles (a stall corresponding to two cycles).

Therefore, as is clear from FIG. 6A, when a simulation of the block b illustrated in FIG. 4 is performed, in the case where the operational result of the cache memory for the case where the ld instruction is executed is a cache hit, the execution time of the block b is 6 cycles. Here, the operational result of the target CPU 101 and the hardware resources obtained when an externally dependent instruction is executed will be referred to as an execution result of the externally dependent instruction. The externally dependent instruction is an instruction with which the operation of the target CPU or the hardware resources accessible by the target CPU is one of a plurality of operations in the case where the target CPU 101 executes the externally dependent instruction. For example, the externally dependent instruction may be the ld instruction, the st instruction, or the branching instruction. FIG. 6B illustrates a timing example in a case in which the execution result of the ld instruction of the block b illustrated in FIG. 4 is a cache miss. When the result of the ld instruction is a cache miss, since an arbitrary time (corresponding to 6 cycles here) that is considered as being sufficient for re-execution is set in the timing information 320 as a penalty, the penalty cycle is added as the delay time. Therefore, the execution of the second processing element (e2) is delayed to a timing t+7. The mult instruction which is to be executed after the ld instruction is executed on time without being affected by the delay. However, the add instruction comes at or after a timing t+8, by when the execution of the ld instruction is completed, thereby generating a latency corresponding to four cycles (a stall corresponding to four cycles).

Therefore, as is clear from FIG. 6B, when the execution the instructions of the block b illustrated in FIG. 4 is simulated, in the case in which the execution result of the ld instruction is a cache miss, the execution time is 10 cycles.

Figure 7:
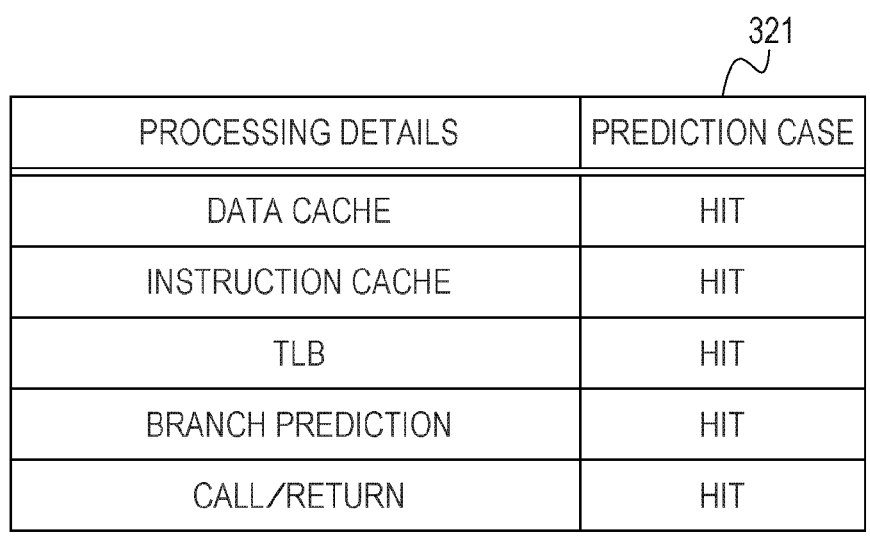
FIG. 7 is an explanatory diagram illustrating an example of prediction information.

FIG. 7 is an explanatory diagram illustrating an example of prediction information. The prediction information 321 is information that defines a result that has a high occurrence probability amongst the operational results of the target CPU 101 and the hardware resources accessible by the target CPU 101 in the case where the target CPU 101 executes an externally dependent instruction within the target program pgr. This operational result will be referred to as a prediction case.

Furthermore, for example, the hardware resources which may be accessed by the target CPU 101 include an instruction cache memory, a data cache memory, and a TLB within a memory management unit (MMU). The instruction cache memory is a memory in which highly frequently used instructions are temporarily stored. The data cache memory is a memory in which highly frequently used data are temporarily stored. The TLB is a memory in which highly frequently used conversion information is temporarily stored. The conversion information is information for conversion of a logical address and a physical address. For example, when executing an access instruction for access to a memory area, such as an ld instruction or an st instruction, the target CPU 101 uses the data cache memory, the TLB, or the like. For example, the block b illustrated in FIG. 4 includes an ld instruction, and regarding the ld instruction, the prediction case of the data cache is a "cache hit", and the prediction case of the TLB search is a "TLB hit".

The determining part 312 determines whether or not compiling of the target block b has been completed. The determining part 312, for example, is able to make a determination of a block that becomes the next computing target according to the execution result of a performance simulation or the execution result of an operation simulation sim. More specifically, the determining part 312 determines whether or not there is a computational code associated with the target block b. In the case where there is a computational code associated with the target block b, the determining part 312 determines that the compiling of the target block b has been completed. In the case where there is no computational code associated with the target block b, the determining part 312 determines that the compiling of the target block b has not been completed.

In the case where it has been determined that the target block b has not previously been a computing target, the prediction simulation execution part 313 sets a prediction case for an externally dependent instruction included in the target block b based on the prediction information 321. Then, the prediction simulation execution part 313 simulates the progress of the execution of each instruction within the block b based on the assumption of the prediction case by referring to the timing information 320. Accordingly, the prediction simulation execution part 313 obtains the performance value of each instruction within the block b based on the assumption of the set prediction case.

The code generating part 314 generates, based on the prediction simulation result, a first computational code for computing the performance value of the target block b for the case where the target CPU 101 executes the target block b. The first computational code generated, for example, is associated with the target block b and stored in the memory device such as the RAM 203 or the disk 205.

Figure 8:
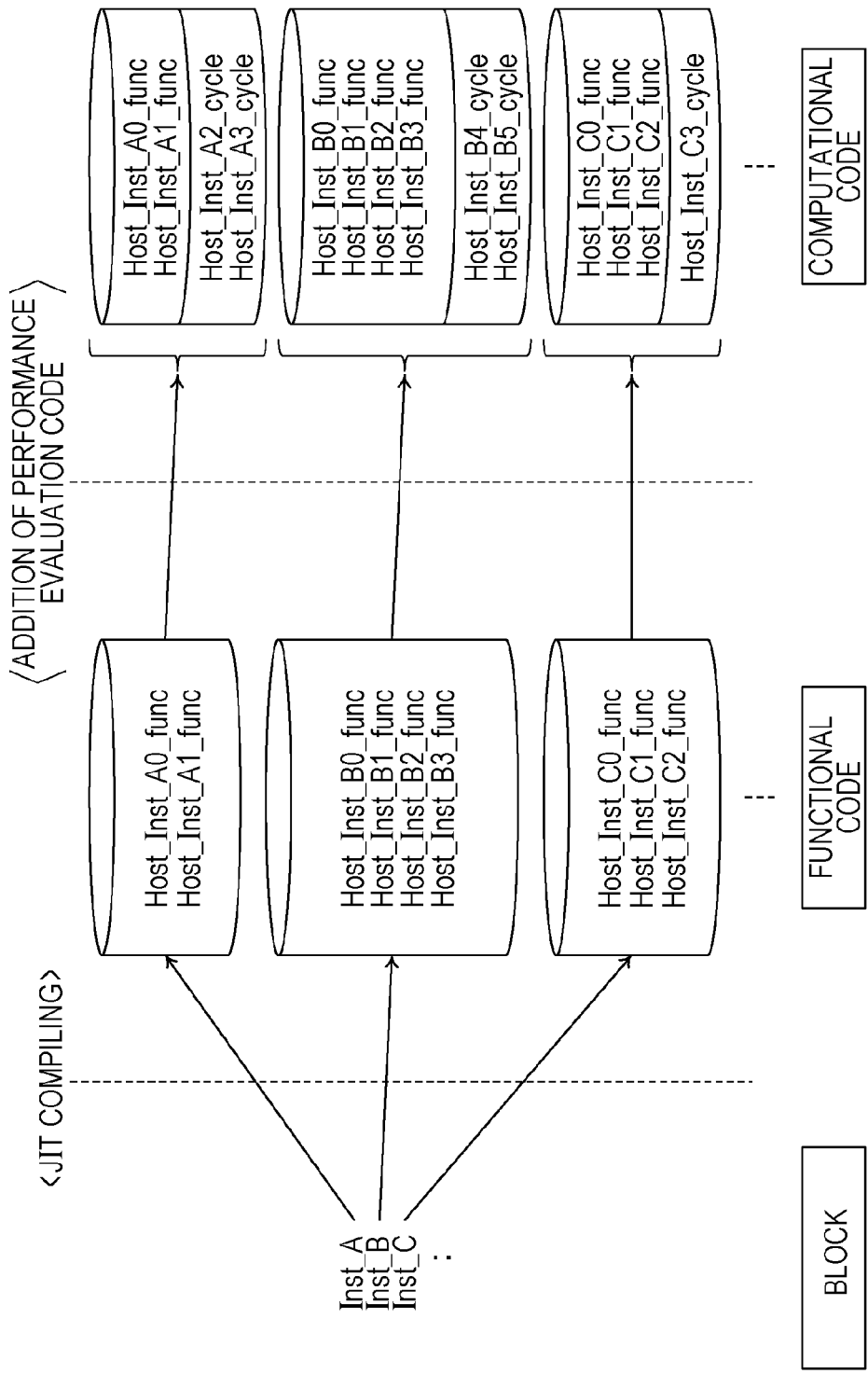
FIG. 8 is an explanatory diagram illustrating an example in which a first computational code is generated.

FIG. 8 is an explanatory diagram illustrating an example in which a first computational code is generated. The code generating part 314 generates a functional code by compiling of the target block b. Furthermore, the code generating part 314 generates a performance computing instruction for adding the performance value of each instruction within the target block b obtained by prediction simulation to the performance value of the target block b. Furthermore, the code generating part 314 generates a helper function 1 call instruction for calling a helper function 1 for an externally dependent instruction. The helper function 1 call instruction is an instruction for calling a helper function 1 and adding a performance value output by processing according to the helper function 1 to the performance value of the target block b. The processing according the helper function 1 in the first embodiment is processing for correcting the performance value of an access instruction according to an attribute of a memory area of an access destination directed by the access instruction and operation of a cache memory and outputting the corrected performance value.

Furthermore, for an externally dependent instruction which is different from an access instruction, the code generating part 314 generates a helper function for directing processing of correcting the performance value of the externally dependent instruction for the case of the prediction case based on whether or not the execution result of the externally dependent instruction matches the prediction case. The code generating part 314 then generates the first computational code by adding a performance evaluation code including the performance computing instruction and the helper function 1 call instruction generated to a functional code. The generated first computational code is associated with the target block b and stored in the memory device such as the RAM 203 or the disk 205. The code execution unit 302 executes a performance simulation for computing the performance value of the target block b by executing the first computational code.

Figure 9:
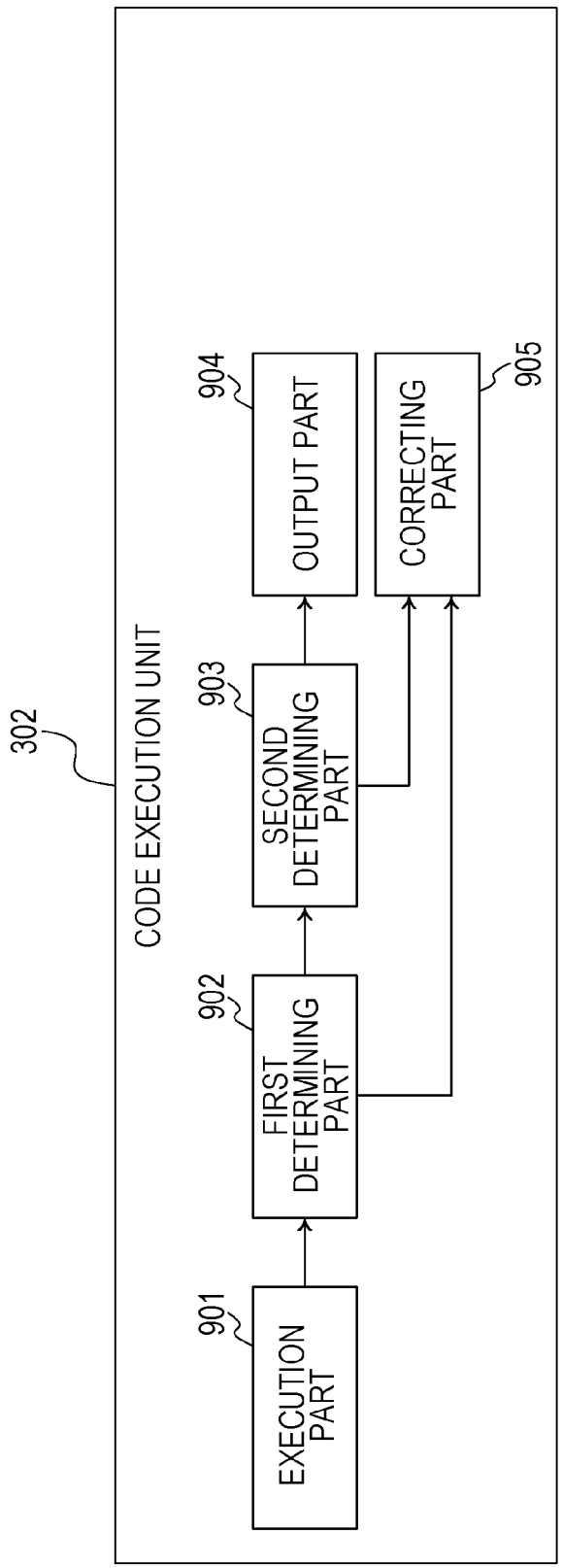
FIG. 9 is a block diagram illustrating an example of a functional configuration of a code execution unit according to the first embodiment.

FIG. 9 is a block diagram illustrating an example of a functional configuration of the code execution unit according to the first embodiment. The code execution unit 302 includes an execution part 901, a first determining part 902, a second determining part 903, an output part 904, and a correcting part 905. Processing of the first determining part 902, the second determining part 903, the output part 904, and the correcting part 905 is coded on a helper function 1 stored in the memory device, such as the disk 205, accessible by the host CPU 201. The host CPU 201 reads the helper function 1 stored in the memory device, and executes the processing coded on the helper function 1. Accordingly, the processing of the first determining part 902, the second determining part 903, the output part 904, and the correcting part 905 is implemented. Furthermore, the processing result of each part is, for example, stored in the memory device such as the RAM 203 or the disk 205.

Figure 10:
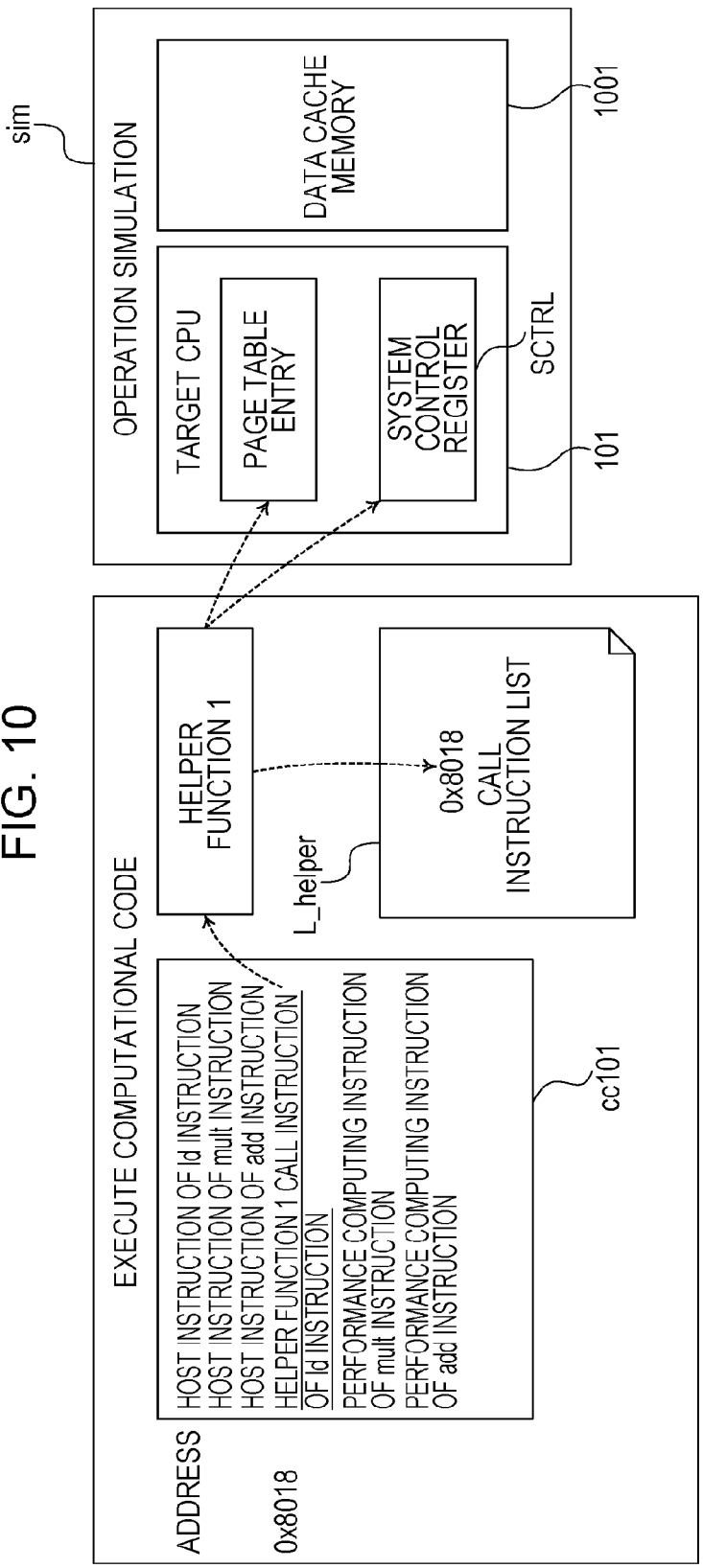
FIG. 10 is an explanatory diagram illustrating an example of execution by the code execution unit according to the first embodiment.

FIG. 10 is an explanatory diagram illustrating an example of execution by the code execution unit according to the first embodiment. For example, the code execution unit 302 executes instructions included in a first computational code cc101 in order. For example, the execution part 901 executes a helper function 1 call instruction for a data cache memory 1001 of an ld instruction, calls a helper function 1, and then executes processing directed by the helper function 1. Accordingly, processing from the first determining part 902 to the correcting part 905 is executed. The data cache memory 1001 is provided as an example of the cache memory. However, a similar processing is performed also in the case where the cache memory is an instruction cache memory.

In the example of FIG. 10, the first determining part 902 determines whether or not the cache memory is in an available state for use at the time of execution of the target block b in the simulation sim of an operation in which the target CPU 101 executes the target program pgr. For example, in the case where the target CPU 101 is an ARM processor, in an operation at the time of execution of the target block b in the operation simulation sim, the first determining part 902 detects a C-bit value of a system control register SCTRL. Then, the first determining part 902 determines whether the C-bit value of the system control register SCTRL is 0 or 1. The first determining part 902 determines that the data cache memory 1001 is not in an available state for use in the case where the C-bit value of the system control register SCTRL is 0. The first determining part 902 determines that the data cache memory 1001 is in an available state for use in the case where the C-bit value of the system control register SCTRL is 1.

In the case where it has been determined that the data cache memory 1001 is in the available state for use, the second determining part 903 determines an attribute of an access destination at the time of execution of an access instruction in the operation simulation sim. More specifically, the second determining part 903 determines whether the attribute indicates that the data cache memory 1001 is available for use. The second determining part 903 detects the values of the TEX, B, and C bits set on the page table entry for the access destination at the time of execution of the access instruction in the operation simulation sim, as the attribute of the access destination. For example, in the case where the target CPU 101 is an ARM processor, the second determining part 903 detects the values of the TEX, B and C bits set on the page table entry within the TLB regarding the access destination at the time of execution of the ld instruction in the operation simulation sim.

The second determining part 903 determines that the attribute of the access destination is an attribute which indicates that the data cache memory 1001 is available for use in the case where all the detected values of the TEX, B, and C bits are 1. Furthermore, the second determining part 903 determines that the attribute of the access destination is not an attribute which indicates that the data cache memory 1001 is available for use in the case where either one of the detected values of the TEX, B, and C bits is not 1.

In the case where it has been determined that the data cache memory 1001 is unavailable for use, the output part 904 outputs the address of the memory area in which the helper function 1 call instruction, which is a callout source, is stored to a call instruction list L_helper.

In the case where it has been determined that the attribute does not indicate that the data cache memory 1001 is available for use, when the prediction case is a "cache hit", the correcting part 905 corrects the performance value obtained by the prediction simulation to a performance value for the case of a "miss hit". Then, the correcting part 905 outputs the corrected performance value. In the case where it has been determined that the attribute does not indicated that the data cache memory 1001 is available for use, when the prediction case is a "miss hit", the correcting part 905 outputs the performance value of the access instruction obtained by the prediction simulation, without making a correction. In the above described example, the prediction case is a "cache hit". Therefore, the correcting part 905, for example, adds the value of penalty included in the timing information 320 to the performance value of the ld instruction.

In the case where it has been determined that the attribute indicates that the data cache memory 1001 is available for use, the correcting part 905 determines whether or not the operation of the data cache memory 1001 in the operation simulation sim matches the prediction case. In the case where the operation of the data cache memory 1001 matches the prediction case, the correcting part 905 outputs the performance value obtained by the prediction simulation, without making a correction. In the case where the operation of the data cache memory 1001 does not match the prediction case, the correcting part 905 corrects the performance value obtained by the prediction simulation and outputs the corrected performance value. Here, the prediction case is a "cache hit". Therefore, the correcting part 905 determines whether or not the operational result of the data cache memory 1001 in the operation simulation sim is a "cache miss". If the operational result is a "cache miss", the correcting part 905 adds the value of penalty within the timing information 320 to the performance value of the ld instruction. A detailed example of correcting processing by the correcting part 905 will be provided in the second embodiment.

In the case where it has been determined that the data cache memory 1001 is unavailable for use, the code optimization unit 303 generates a second computational code. The second computational code is a code for computing the performance value of the target block b for the case where the host CPU 201 executes the target block b, based on the performance value of each instruction within the target block b for the case where the data cache memory 1001 is not used, without depending on the attribute of the memory area.

Figure 11:
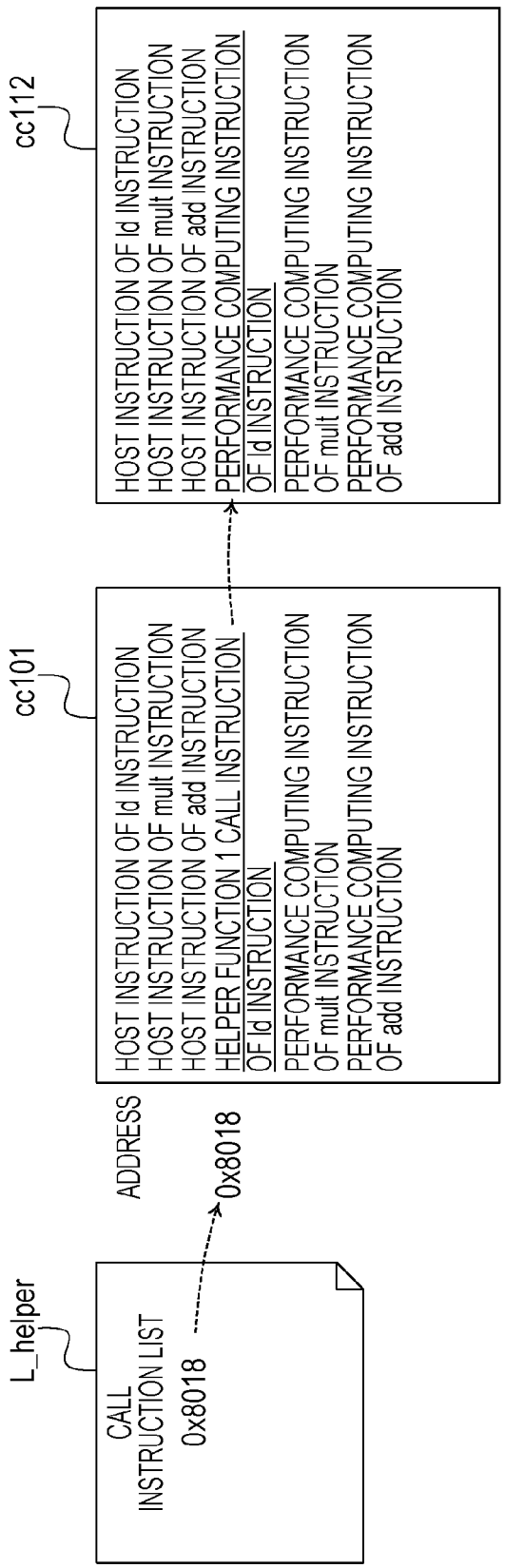
FIG. 11 is an explanatory diagram illustrating an example in which a second computational code is generated in the first embodiment.

FIG. 11 is an explanatory diagram illustrating an example in which the second computational code is generated in the first embodiment. Specifically, the code optimization unit 303 replaces the helper function 1 call instruction indicated by the address within the call instruction list L_helper in the first computational code cc101 with a performance computing instruction for adding the performance value of the ld instruction for the case of a "cache miss". Accordingly, the code optimization unit 303 generates a second computational code cc112. The generated second computational code cc112 is associated with the target block b and stored in the memory device such as the RAM 203 or the disk 205. Furthermore, the first computational code previously associated with the target block b is deleted when the second computational code cc112 is newly associated with the target block b.

Furthermore, in the case where the block b newly becomes the target block b, the determining part 312 determines that the target block b has been a computing target before. Then, the code execution unit 302 executes the performance simulation which computes the performance value of the target block b by executing the second computational code c112. As described above, the processing from the first determining part 902 to the correcting part 905 included in the code execution unit 302 is coded on the helper function 1. Therefore, during the execution of the second computational code cc112 on which the helper function 1 call instruction is not coded, the processing from the first determining part 902 to the correcting part 905 is not executed. Accordingly, a performance value in the case where a target block b which includes an access instruction becomes a new computing target may be computed more quickly.

Furthermore, the simulation information collecting unit 304 collects the computing result of the performance value of each block b and computes the performance value of the target program pgr for the case where the target CPU 101 executes the target program pgr.

Second Embodiment

In the second embodiment, in the case where a cache memory is available for use by an access instruction in a block b, the computing apparatus generates a computational code for computing the performance value of the block b by correcting the performance value according to an operation of the cache memory, without depending on an attribute of a memory area. Accordingly, since a determination as to the attribute of the memory area is not performed when the block b becomes a new computing target, the amount of computation for the performance value may be reduced. In the second embodiment, detailed explanations for the same functions and configurations as those described in the first embodiment will be omitted. In the second embodiment, as with the first embodiment, the data cache memory 1001 is given as an example. However, an instruction cache memory may be used instead.

First, when it has been determined that information indicates that the data cache memory 1001 is available for use, the code optimization unit 303 generates a second computational code. The second computational code is a code executable by the host CPU 201, and is a code for computing the performance value of the target block b based on a performance value of each instruction in a target block for the case where the data cache memory 1001 is used, without depending on the attribute of the memory area. The generated second computational code is associated with the target block b, and is stored in the memory device such as the RAM 203 or the disk 205. Furthermore, the first computational code previously associated with the target block b is deleted when the second computational code is newly associated with the target block b.

Figure 12:
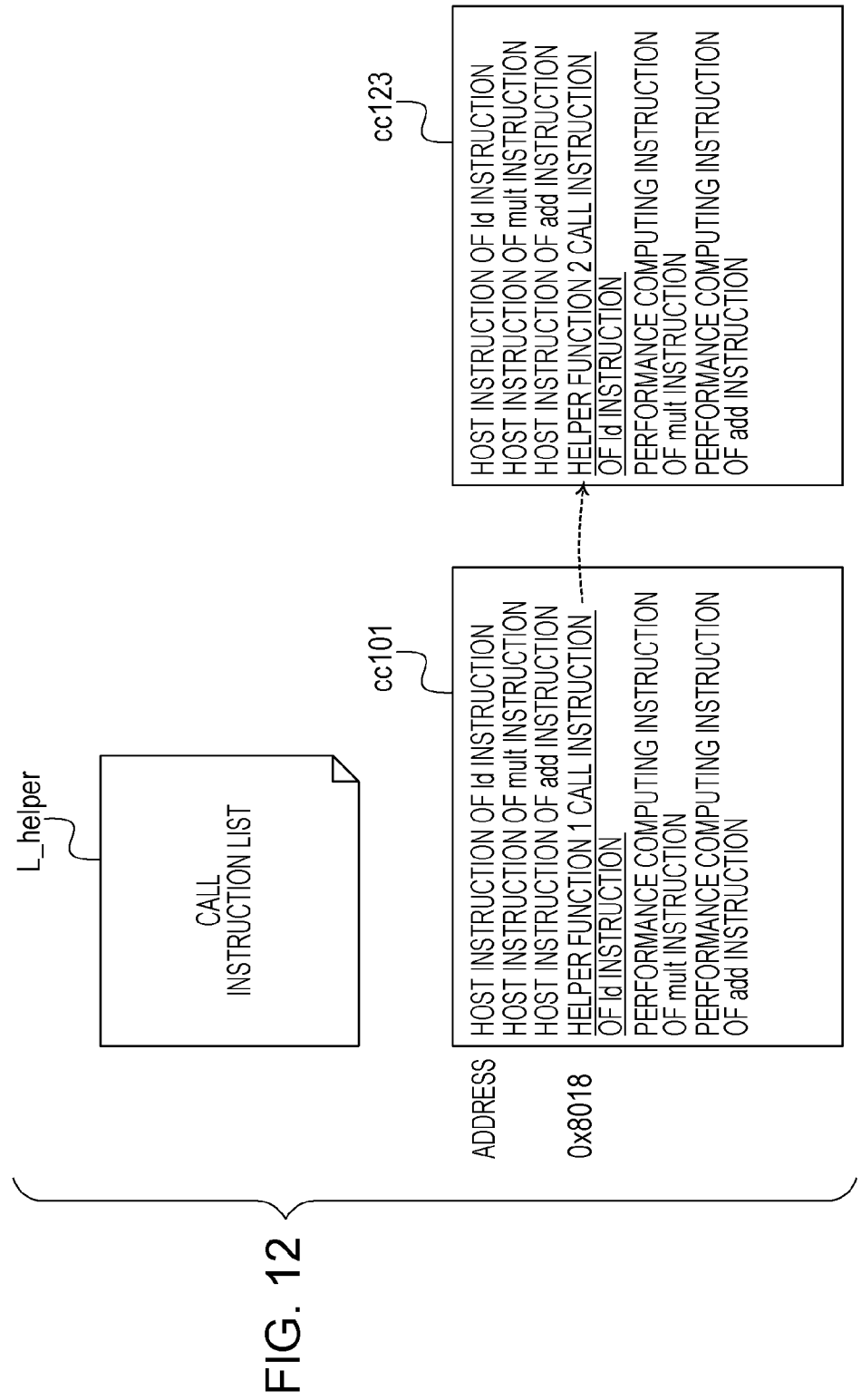
FIG. 12 is an explanatory diagram illustrating an example in which a second computational code is generated in a second embodiment.

FIG. 12 is an explanatory diagram illustrating an example in which a second computational code is generated in the second embodiment. Specifically, the code optimization unit 303 detects, among the helper function 1 call instructions within the first computational code cc101, a helper function 1 call instruction other than helper function 1 call instructions that are indicated by an address within a call instruction list L_helper. Then, the code optimization unit 303 replaces the detected helper function 1 call instruction with a helper function 2 call instruction to generate a second computational code cc123. The helper function 2 call instruction is an instruction for calling a helper function 2 and adding a performance value output by processing according to the helper function 2 to the performance value of the target block b. Here, in the second embodiment, for easier understanding, a description is given on the assumption that the helper function 1 call instruction included in the first computational code cc101 is only concerned with a data cache. The helper function 2 is a function which does not include an instruction for processing for detecting an attribute of the memory area of an access destination of an access instruction included in the helper function 1 and processing for determining whether or not the data cache memory 1001 is available for use. Specifically, processing of the correcting part 905 has been coded on the helper function 2.

Accordingly, when the target block b becomes a new computing target, processing for determining an attribute of the access destination of an access instruction for which it has been determined that the data cache memory 1001 is available for use, is not performed. Thus, the amount of computation for a performance value may be reduced, and the performance value of the target program pgr may be computed more quickly.

FIG. 13 is an explanatory diagram illustrating a detailed example of the helper function 2 concerning a data cache memory of an ld instruction. The helper function 2 "cache_ld (address, rep_delay, pre_delay)" call instruction is integrated in the second computational code cc123.

In the helper function 2, "rep_delay" represents a time (grace time) that is not processed as a delay time during a penalty time until the execution of the next instruction which uses a return value of the load (ld) instruction. In the helper function 2, "pre_delay" represents a delay time received from the immediately preceding instruction. In the helper function 2, "−1" indicates that there is no delay in the preceding instruction. Further, "rep_delay" and "pre_delay" represent time information that may be obtained from a result of static analysis processing of a performance simulation result acquired by the prediction simulation execution part 313 and the timing information 320.

In the example illustrated in FIG. 13, when the difference between the current timing "current_time" and an execution timing "preld_time", which is the execution timing of the immediately preceding ld instruction, exceeds the delay time "pre_delay", which corresponds to the delay time of the immediately preceding ld instruction, the correcting part 905 adjusts the delay time "pre_delay" between the time "preld_time", which is the execution timing of the immediately preceding ld instruction, and the current timing "current_time," and obtains a valid delay time "avail_delay."

When the operational result of the data cache memory 1001 is a "cache miss," since there is an error in the prediction case, the correcting part 905 adds a penalty time "cache_miss_latency", which is a penalty time for the case of a cache miss, to the valid delay time "avail_delay," and corrects the performance value of the ld instruction, based on the grace time "rep_delay."

FIGS. 14A to 14D, 15A to 15D, and 16A to 16D illustrate examples of a correction made by the correcting part to an execution result of an ld instruction. FIGS. 14A to 14D are explanatory diagrams illustrating examples of a correction made by the correcting part to an execution result of an ld instruction. With reference to FIGS. 14A to 14D, examples of a correction made in the case where a single cache miss occurs with the execution of a single cache processing operation will be described.

In the examples in FIGS. 14A to 14D, a simulation of the following three instructions is performed:

"ld [r1], r2: [r1]→r2;
mult r3, r4, r5: r3*r4→r5;
add r2, r5, r6: r2+r5→r6"

Figure 14A:
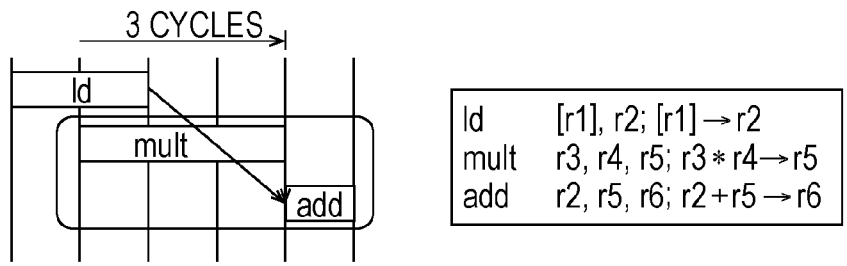
FIGS. 14A to 14D are explanatory diagrams illustrating examples of a correction made by a correcting part to an execution result of an Id instruction.
Figure 14B:
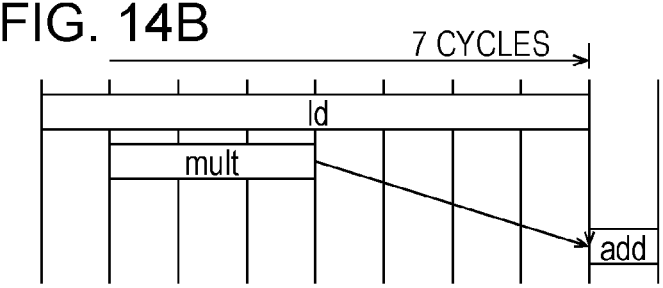
Figure 14C:
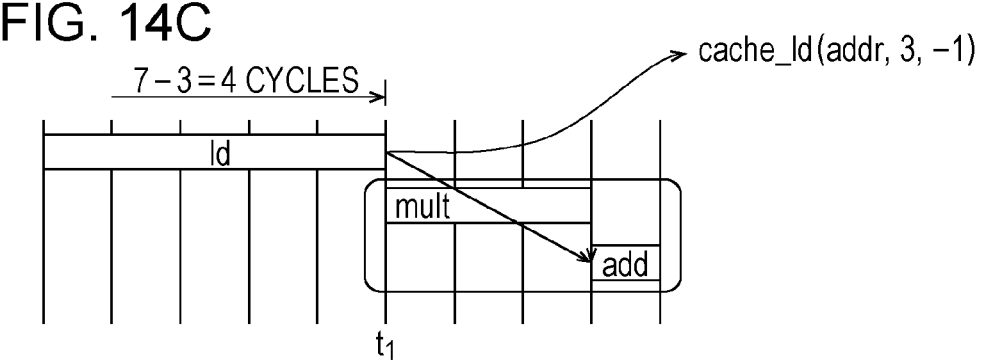

FIG. 14A is a chart illustrating an example of instruction execution timings in the case where a prediction case is a "cache hit." In this prediction case, a 2-cycle stall occurs for an add instruction which is executed thirdly. FIG. 14B is a chart illustrating an example of instruction execution timings in the case of a "cache miss," which is different from the prediction case. In this execution result, which is different from the prediction case, when the execution result of an ld instruction is a cache miss, a delay for the period of a penalty cycle (6 cycles) occurs. Although a mult instruction is executed without being affected by the delay, since the add instruction is not executed until the ld instruction is completed, a delay for the period of 4 cycles occurs. FIG. 14C is a chart illustrating an example of instruction execution timings after correction by the correcting part 905.

Since the execution result of the ld instruction is a cache miss (the execution result is different from the prediction case), the correcting part 905 adds a predetermined penalty time (6 cycles) for the case of a cache miss to the remaining execution time (2−1=1 cycle) to obtain a valid delay time (7 cycles). The valid delay time is the longest delay time. Further, the correcting part 905 obtains an execution time (3 cycles) of the next mult instruction, determines that the execution time of the next instruction does not exceed the delay time, and subtracts the execution time of the next instruction from the valid delay time (7−3=4 cycles) to obtain the delayed execution time (delay time) of the ld instruction. Furthermore, the correcting part 905 defines the time (3 cycles) obtained by subtracting the above-mentioned delay time from the valid delay time as a grace time. The grace time is a time for which a delay as a penalty is waived. The correcting part 905, with the helper function 2 "cache_ld (address, rep_delay, pre_delay)," returns the grace time "rep_delay=3" and the delay time of the preceding instruction "pre_delay=−1" (no delay).

With this correction, the execution time of an ld instruction becomes the sum of the executed time and the delay time (1+4=5 cycles), and execution times of the subsequent mult instruction and add instruction are calculated based on a timing $t_1$ at which execution is completed. In other words, by simply adding respective execution times of the mult instruction and add instruction (3 cycles and 3 cycles), obtained from the processing result of the prediction simulation execution part 313 (result of the prediction simulation by the prediction result), to the corrected execution time (5 cycles) of the ld instruction, the execution time (the number of cycles) of the block b may be obtained.

Accordingly, by performing correction processing through addition or subtraction of the execution time of only an instruction whose execution result is different from the prediction, and as for other instructions, by adding the execution time obtained by a simulation based on the prediction result, the number of execution cycles in the simulation for the case of a cache miss may be obtained with high accuracy.

Figure 14D:
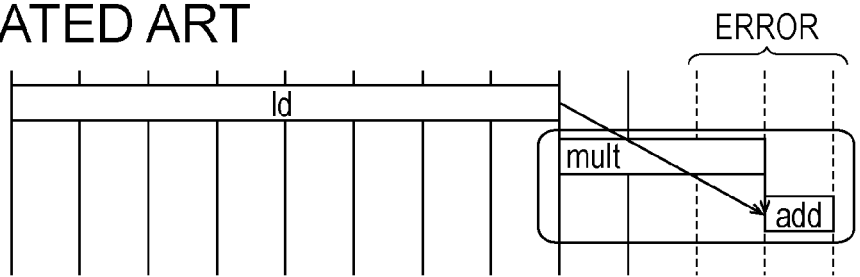

FIG. 14D is a chart illustrating, for comparison with the processing by the computing apparatus 100, the magnitude of error generated when the number of cycles at the time of a cache miss is obtained by a simple addition according to related art. In the case of FIG. 14D, the delay time of an ld instruction is added directly. Therefore, in reality, an error occurs by a timing deviation in execution of the mult instruction which is completed during the execution of the ld instruction.

FIG. 15A to 15D are charts illustrating correction examples of a correction made by the correcting part to the execution result of an ld instruction. With reference to FIGS. 15A to 15D, examples of a correction made in the case where two cache misses occur with the execution of two cache processing operations will be described. In the examples in FIG. 15A to 15D, a prediction simulation of the following five instructions is performed:

"ld [r1], r2: [r1]→r2;
ld [r3], r4: [r3]→r4;
mult r5, r6, r7: r5*r6→r7;
add r2, r4, r2: r2+r4→r2;
add r2, r7, r2: r2+r7→r2"

Figure 15A:
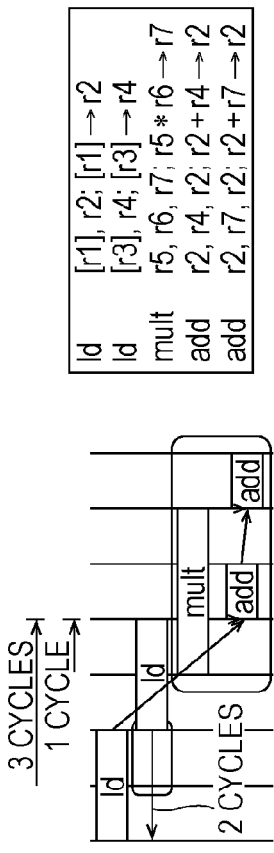
FIGS. 15A to 15D are charts illustrating examples of a correction made by the correcting part to an execution result of an Id instruction.
Figure 15B:
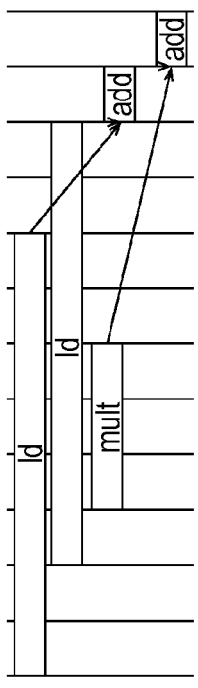
Figure 15C:
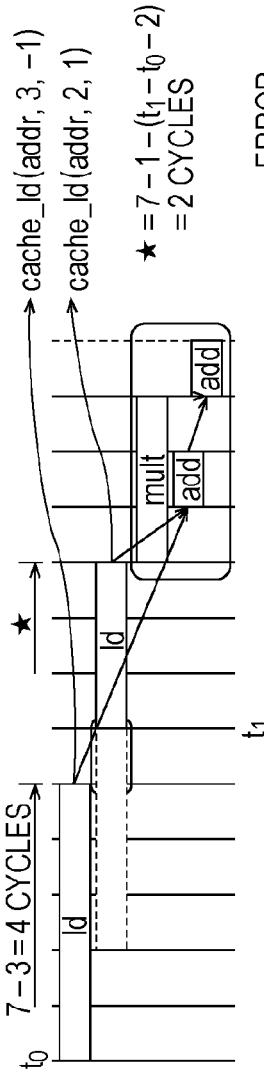

FIG. 15A is a chart illustrating an example of instruction execution timings in the case where the prediction result of two cache processing operations is a "cache hit." In this prediction case, it is assumed that two ld instructions are executed with an interval of 2 cycles (normal 1 cycle+added 1 cycle). FIG. 15B is a chart illustrating an example of instruction execution timings in the case of a "cache miss" where both the two cache processing operations are different from the prediction result. In the case of the prediction miss, two ld instructions each have a cache miss, causing a delay for the period of a penalty cycle (6 cycles). However, the delay times of the two ld instructions partially overlap. In addition, a mult instruction is executed without being affected by the delay, and the execution of two add instructions are delayed until the second ld instruction is completed. FIG. 15C is a chart illustrating an example of instruction execution timings after correction by the correcting part 905.

The correcting part 905, as described with reference to FIGS. 14A to 14D, corrects the delay time of the first ld instruction at a timing $t_0$, and returns the helper function 2 cache_ld (addr, 3, −1). Then, at the current timing $t_1$, since the execution result of the second ld instruction is a cache miss (miss in the prediction result), the correcting part 905 adds the penalty cycle (6) to the remaining execution time of the ld instruction, and obtains a valid delay time (1+6=7 cycles).

The correcting part 905 subtracts the delay time spent up to the current timing $t_1$ from the valid delay time ("current timing $t_1$−execution timing $t_0$ of the preceding instruction"-set interval) to obtain a valid delay time exceeding the current timing $t_1$ (7−(6−2)=3 cycles). The correcting part 905 defines the excess valid delay time as the execution time of the second ld instruction. Further, the correcting part 905 subtracts the original execution time from the excess valid delay time (3−1=2 cycles), and defines the obtained delay time as a delay time of the preceding instruction. Furthermore, the correcting part 905 subtracts the sum of the delay time spent up to the current timing $t_1$ and the valid delay time exceeding the current timing $t_1$ from the valid delay time (7−(3+3)=1 cycle), and defines the obtained time as a grace time.

The correcting part 905, at the timing $t_1$, after correcting the delay time of the second ld instruction, returns the helper function 2 cache_ld (addr, 2, 1). With this correction, a timing obtained by adding the corrected value (3 cycles) to the current timing $t_1$ becomes a timing at which the ld instruction is completed, and from that time on, execution times of the subsequent mult instruction and add instruction will be added.

Figure 15D:
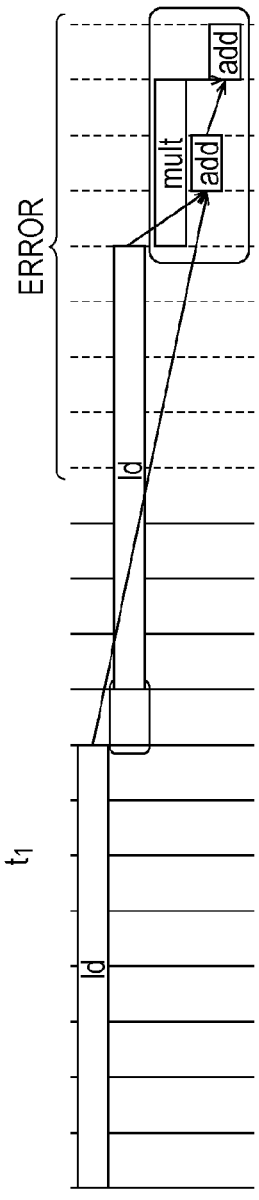

FIG. 15D is a chart illustrating, for comparison with the processing by the computing apparatus 100, the magnitude of error generated when the number of cycles at the time of a cache miss is obtained by a simple addition according to related art. In the case illustrated in FIG. 15D, since the delay times based on the penalties given to two ld instructions are added directly, a large scale of an error (8 cycles) is generated. An error (1 cycle) is generated even with the correction by the correcting part 905 illustrated in FIG. 15C compared to the case in which a correct simulation is performed as illustrated in FIG. 15B. However, the number of cycles may be obtained with very high accuracy compared to related art.

FIGS. 16A to 16D are charts illustrating examples of a correction made by the correcting part to an execution result of an ld instruction. With reference to FIGS. 16A to 16D, examples of a correction made in the case where one cache miss occurs with the execution of two cache processing operations will be described. In the examples of FIGS. 16A to 16D, a simulation of the same five instructions as those of the examples illustrated in FIGS. 15A to 15D is performed.

Figure 16A:
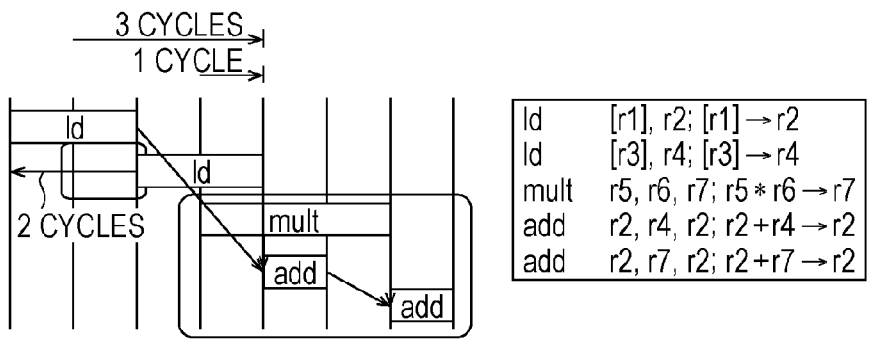
FIGS. 16A to 16D are charts illustrating examples of a correction made by the correcting part to an execution result of an Id instruction.
Figure 16B:
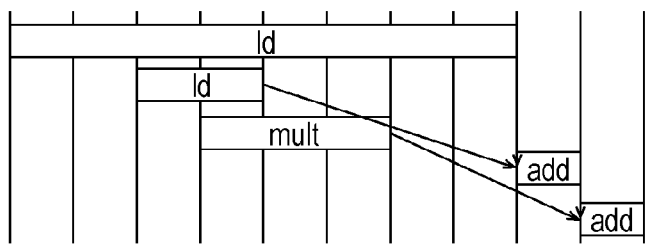
Figure 16C:
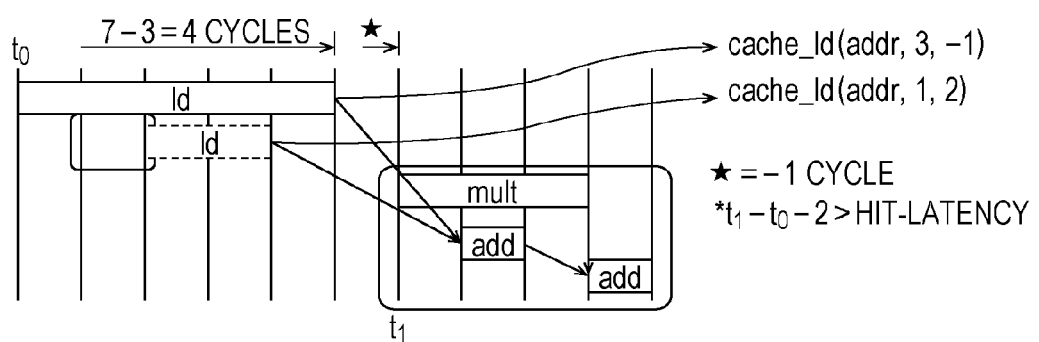

FIG. 16A is a chart illustrating an example of instruction execution timings in the case where the prediction result of two cache processing operations is a "cache hit." In this prediction case, as is the case of FIG. 15A, it is assumed that two ld instructions are executed with an interval of 2 cycles (normal 1 cycle+1 added cycle). FIG. 16B is a chart illustrating an example of instruction execution timings in the case where the result of the first ld instruction is different from the prediction result, that is, a "cache miss", and the result of the second ld instruction is the same as the prediction result, that is, a "cache hit". In the case of the prediction miss, the first ld instruction causes a delay for the period of a penalty cycle (6 cycles). The second ld instruction and a mult instruction are executed without being affected by the delay. The execution of two add instructions is delayed until the first ld instruction is completed. FIG. 16C is a chart illustrating an example of instruction execution timings after correction by the correcting part 905.

The correcting part 905, as described with reference to FIGS. 14A to 14D, corrects the delay time of the first ld instruction at a timing $t_0$, and returns the helper function 2 cache_Id (addr, 3, −1). Then, at the current timing $t_1$, since the execution result of the second ld instruction is a cache hit (the same as the prediction result), the correcting part 905 determines whether or not the period of time from the start of the execution of the ld instruction up to the current timing $t_1$ "$t_1-t_0$-set interval (6−0−2=4 cycles)" is longer than the execution time of the ld instruction (2 cycles). Since the period of time from the start of the execution of the second ld instruction up to the current timing $t_1$ is longer than the execution time of the ld instruction (2 cycles), the correcting part 905 defines the current timing $t_1$ as the execution timing of the next mult instruction.

The correcting part 905 deals the period of time from the completion of the execution of the second ld instruction up to the current timing $t_1$ (2 cycles) as the delay time for the next instruction, and the delay time of the preceding instruction pre_delay is set to 2. The correcting part 905 subtracts the sum of the delay time spent up to the current timing $t_1$ and the valid delay time exceeding the current timing $t_1$ from the valid delay time of the first ld instruction (7−(6+0)=1 cycle), defines the obtained time as the grace time rep_delay=1, and returns the helper function 2 cache_Id (addr, 1, 2).

Figure 16D:
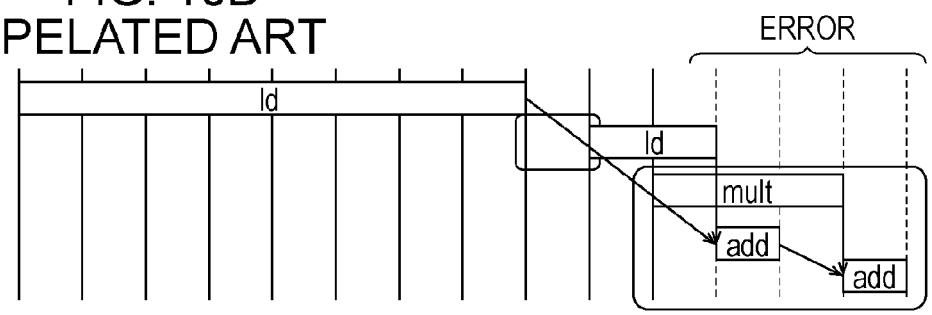

FIG. 16D illustrates, for comparison with the processing by the computing apparatus 100, the magnitude of error generated when the number of cycles at the time of a cache miss is obtained by a simple addition according to related art. In the case of FIG. 16D, since the delay time based on the penalty of the first ld instruction is added directly, an error is generated.

Example of Computing Processing Procedure by Computing Apparatus 100 According to First and Second Embodiments FIG. 17 is a flowchart illustrating an example of a computing processing procedure by the computing apparatus according to the first and second embodiments. The computing apparatus 100 determines whether or not the computation of a performance value of the target program pgr has been completed (step S1701). When the computation has not been completed (step S1701: No), the computing apparatus 100 performs a process for generating a computational code (step S1702).

Then, the computing apparatus 100 executes a computational code associated with a target block b (step S1703). Further, the computing apparatus 100 executes an operation simulation sim concerning the target block b for the case where the target CPU 101 executes the target block b (step S1704). In the case where the execution result of the operation simulation sim concerning the target block b is utilized for execution of the computational code, the execution of the computational code waits for the execution of the operation simulation sim concerning the target block b to be completed.

Following step S1703 and step S1704, the computing apparatus 100 performs a process for optimizing the computational code (step S1705), and returns to step S1701. When the computation has been completed in step S1701 (step S1701: Yes), the computing apparatus 100 collects computing results (step S1706), and terminates the series of processing operations. In step S1706, the computing apparatus 100, for example, sums up performance values of individual blocks b, and thus obtains the performance value of the target program pgr for the case where the target CPU 101 is executed with the target program pgr.

FIG. 18 is a flowchart illustrating the generation process illustrated in FIG. 17 according to the first and second embodiments in detail. The computing apparatus 100 determines whether or not compiling of the target block b has been completed (step S1801). The computing apparatus 100 is then capable of specifying a target block b that is to be the next computing target, based on the value of a program counter (PC) in the operation simulation sim. Further, the computing apparatus 100 is capable of specifying the target block b based on the execution result of a functional code included in the computational code.

In the case where compiling of the target block b has not been completed (step S1801: No), the computing apparatus 100 divides the target program pgr and acquires a target block b (step S1802). Then, the computing apparatus 100 detects an externally dependent instruction in the target block b (step S1803).

The computing apparatus 100, based on the prediction information 321, sets a prediction case concerning the externally dependent instruction (step S1804). Then, the computing apparatus 100, based on the timing information 320, performs a prediction simulation of performance values of individual instructions for the set prediction case (S1805). Next, the computing apparatus 100 generates a computational code which includes a functional code obtained by compiling the target block b, and a code based on the prediction simulation result (step S1806), and terminates the series of processing operations. The computational code generated in step S1806 is, for example, a first computational code.

When compiling of the target block b has been completed in step S1801 (step S1801: Yes), the computing apparatus 100 terminates the series of processing operations.

Figure 19:
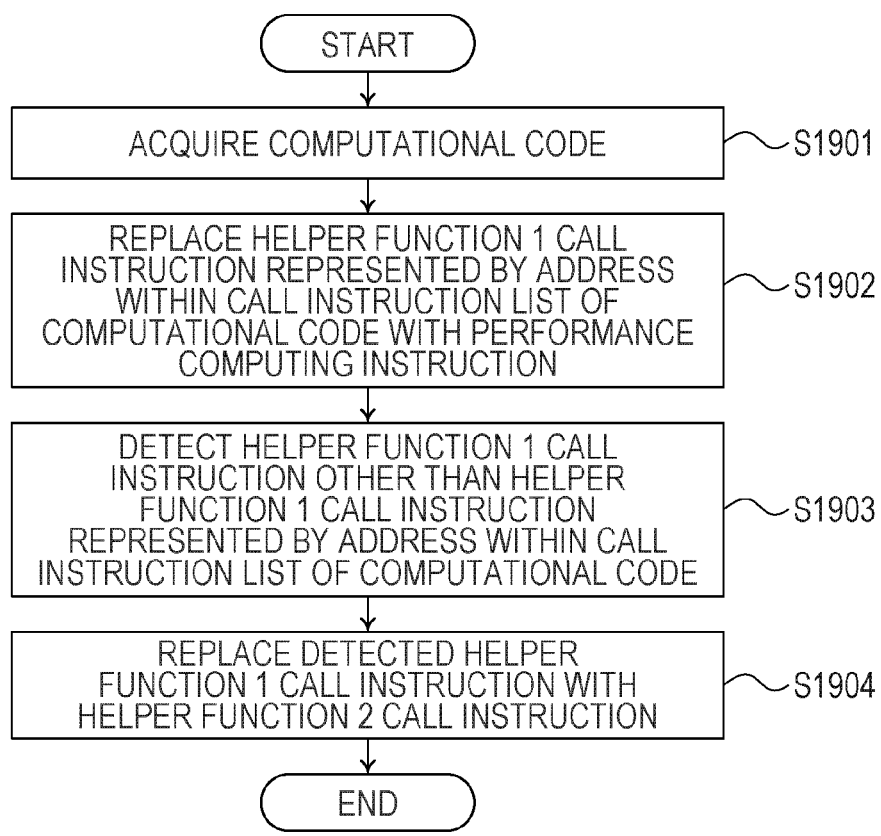
FIG. 19 is a flowchart illustrating a code optimizing process illustrated in FIG. 17 according to the first and second embodiments in more detail.

FIG. 19 is a flowchart illustrating the code optimizing process illustrated in FIG. 17 according to the first and second embodiments in detail. The computing apparatus 100 acquires a computational code (step S1901). The computing apparatus 100 replaces a helper function 1 call instruction that is represented by an address in the call instruction list L_helper of the computational code with a performance computing instruction (step S1902). The computing apparatus 100 detects a helper function 1 call instruction concerning the data cache memory 1001 other than the helper function 1 call instruction represented by the address in the call instruction list L_helper of the computational code (step S1903). The computing apparatus 100 replaces the detected helper function 1 call instruction with a helper function 2 call instruction concerning the data cache memory 1001 (step S1904), and terminates the series of processing operations.

Figure 20:
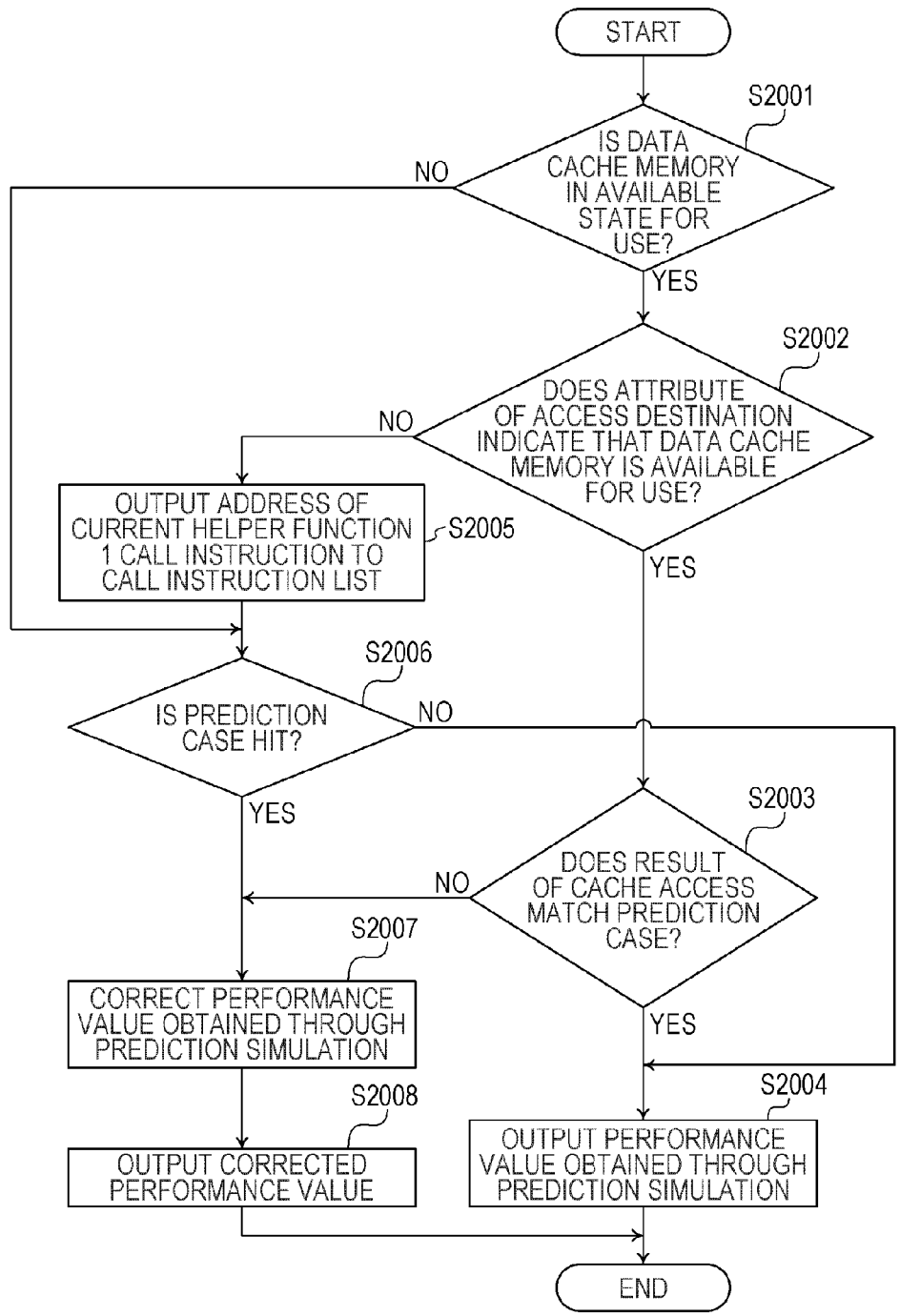
FIG. 20 is a flowchart illustrating an example of a computing processing procedure according to a helper function 1 concerning the data cache memory by the computing apparatus according to the first embodiment.

FIG. 20 is a flowchart illustrating an example of a computing processing procedure according to the helper function 1 concerning the data cache memory by the computing apparatus according to the first embodiment. The computing apparatus 100 determines whether or not the data cache memory 1001 is in an available state for use (step S2001). When the data cache memory 1001 is in the available state for use (step S2001: Yes), the computing apparatus 100 determines whether or not an attribute of the access destination in the operation simulation sim is an attribute which indicates that the data cache memory 1001 is available for use (step S2002).

When it has been determined that the attribute is an attribute which indicates that the data cache memory 1001 is available for use (step S2002: Yes), the computing apparatus 100 determines whether or not the cache access result in the operation simulation sim matches the prediction case (step S2003). The cache access result is an operational result of the data cache memory 1001. In the case where the cache access result matches the prediction case (step S2003: Yes), the computing apparatus 100 outputs a performance value obtained through a prediction simulation (step S2004), and terminates the series of processing operations. In the case where the cache access result does not match the prediction case (step S2003: No), the computing apparatus 100 proceeds to step S2007.

When it has been determined that the attribute is not an attribute which indicates that the data cache memory 1001 is available for use (step S2002: No), the computing apparatus 100 outputs the address of the current helper function 1 call instruction to the call instruction list L_helper (step S2005). The computing apparatus 100 determines whether or not the prediction case is a hit (step S2006). In the case where the prediction case is a hit (step S2006: Yes), the computing apparatus 100 corrects the performance value obtained through the prediction simulation (step S2007). Then, the computing apparatus 100 outputs the corrected performance value (step S2008), and terminates the series of processing operations. In the case where the prediction case is not a hit (step S2006: No), the computing apparatus 100 proceeds to step S2004.

In the case where the data cache memory 1001 is not in the available state for use in step S2001, (step S2001: No), the computing apparatus 100 proceeds to step S2006.

Figure 21:
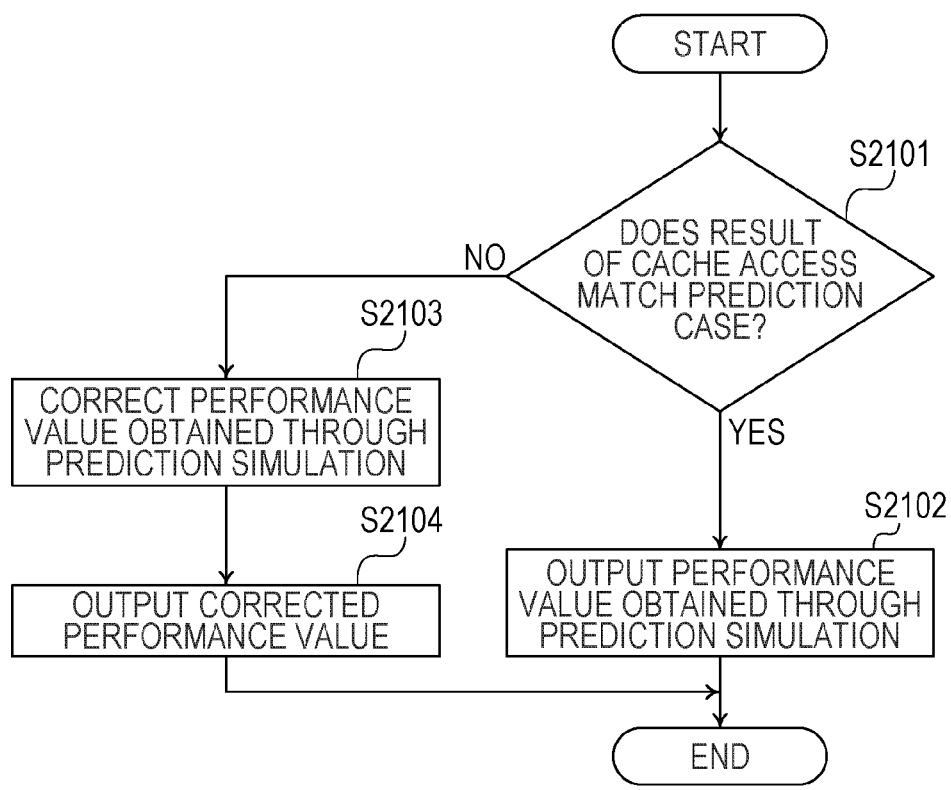
FIG. 21 is a flowchart illustrating an example of a computing processing procedure according to a helper function 2 concerning the data cache memory by the computing apparatus according to the first embodiment.

FIG. 21 is a flowchart illustrating an example of a computing processing procedure according to the helper function 2 concerning the data cache memory by the computing apparatus according to the first embodiment. The helper function 2 concerning the data cache memory 1001 is a function in which instructions for processing for determining the state of availability of the data cache memory 1001 and processing for determining an attribute of the access destination in the helper function 1 concerning the data cache memory 1001 are omitted.

First, the computing apparatus 100 determines whether or not the cache access result in the operation simulation sim matches the prediction case (step S2101). In the case where the cache access result matches the prediction case (step S2101: Yes), the computing apparatus 100 outputs a performance value obtained through a prediction simulation (step S2102), and terminates the series of processing operations.

In the case where the cache access result does not match the prediction case (step S2101: No), the computing apparatus 100 corrects the performance value obtained through the prediction simulation (step S2103). The computing apparatus 100 outputs the corrected performance value (step S2104), and terminates the series of processing operations.

Third Embodiment

During initialization of the target CPU 101, a cache memory is not in the available state for use. When the initialization of the target CPU 101 is completed, the cache memory becomes available for use. In the third embodiment, during the period of time in which the state of the cache memory is shifted from the unavailable state for use to the available state for use, a computational code for computing a performance value of a target block b based on a performance value of an access instruction for the case where a cache memory is not used is executed. Accordingly, the amount of computation for the performance value of the target block b during the period when the cache memory is not available for use may be reduced, and the performance value of the target program pgr may be computed more quickly.

In the third embodiment, detailed explanations for the same functions and configurations as those described in the first or second embodiment will be omitted. In the third embodiment, as with the first embodiment and the second embodiment, the data cache memory 1001 is given as an example. However, an instruction cache memory may be used instead.

Furthermore, during initialization of the target CPU 101, a TLB is not in the available state for use. When the initialization of the target CPU 101 is completed, the TLB becomes available for use. In the third embodiment, during the period of time in which the state of the TLB is shifted from the unavailable state for use to the available state for use, a computational code for computing a performance value of the target block b based on a performance value of an access instruction for the case where the TLB is not used is executed. Accordingly, the amount of computation for the performance value of the target block b during the period when the TLB is not available for use may be reduced, and the performance value of the target program pgr may be computed more quickly.

Figure 22:
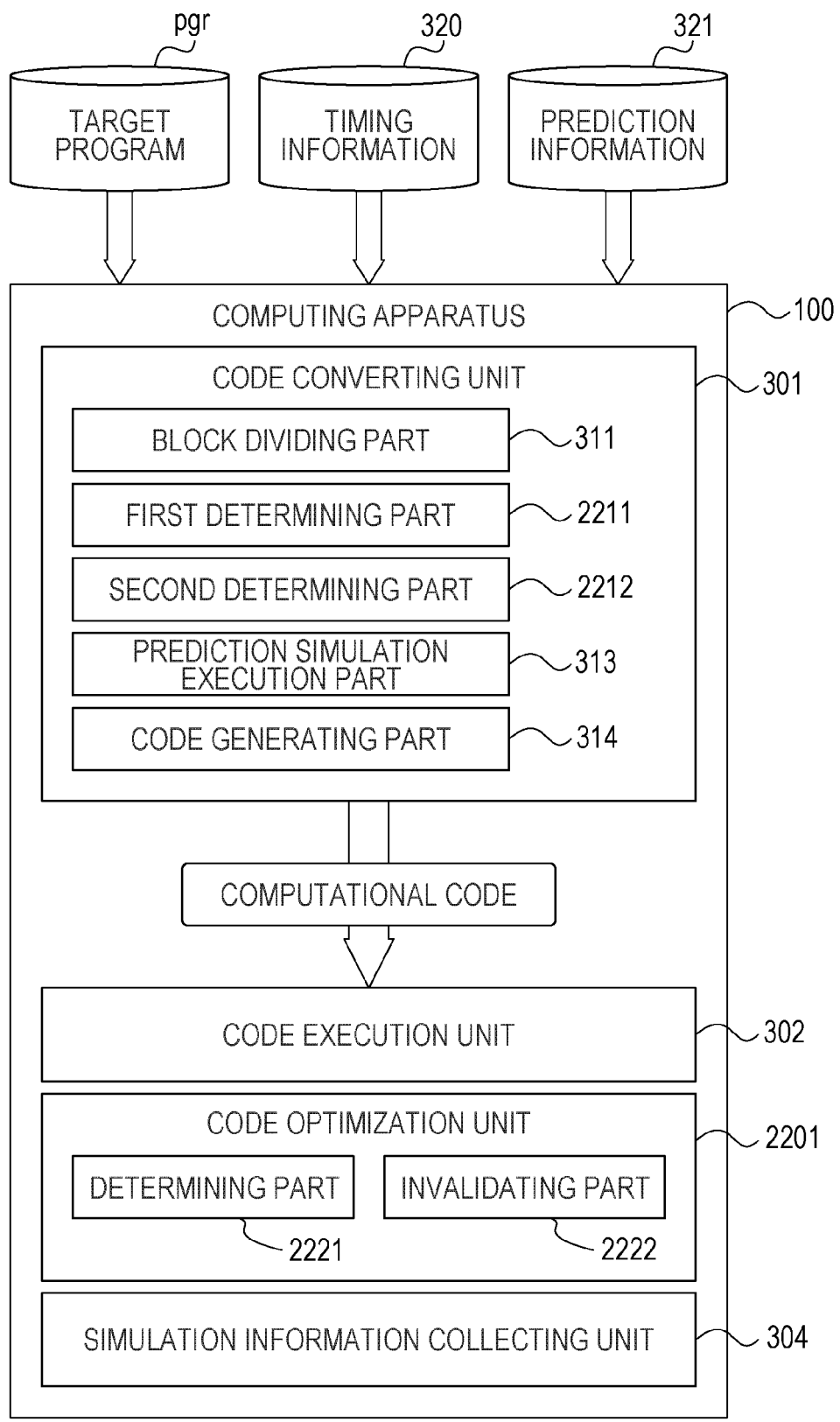
FIG. 22 is a block diagram illustrating an example of a functional configuration of a computing apparatus according to a third embodiment.

Example of Functional Configuration of Computing Apparatus 100 According to Third Embodiment FIG. 22 is a block diagram illustrating an example of a functional configuration of the computing apparatus according to the third embodiment. The computing apparatus 100 includes the code converting unit 301, the code execution unit 302, a code optimization unit 2201, and the simulation information collecting unit 304.

Processing from the code converting unit 301 to the simulation information collecting unit 304 illustrated in FIG. 22 is, for example, coded on a computing program stored in the memory device such as the disk 205 accessible by the host CPU 201. Then, the host CPU 201 reads the computing program stored in the memory device and executes the processing coded on the computing program. Accordingly, the processing from the code converting unit 301 to the simulation information collecting unit 304 is implemented. The processing results of the individual units are stored, for example, in the memory device, such as the RAM 203 or the disk 205.

Specifically, the code converting unit 301 includes the block dividing part 311, a first determining part 2211, a second determining part 2212, the prediction simulation execution part 313, and the code generating part 314. The block dividing part 311 has the same function as the block dividing part 311 explained in the first embodiment.

The first determining part 2211 determines whether or not compiling of the block b has been completed. An actual determination method by the first determining part 2211 is the same as the determination method by the determining part 312 illustrated in the first embodiment.

Data Cache Memory

Figure 23:
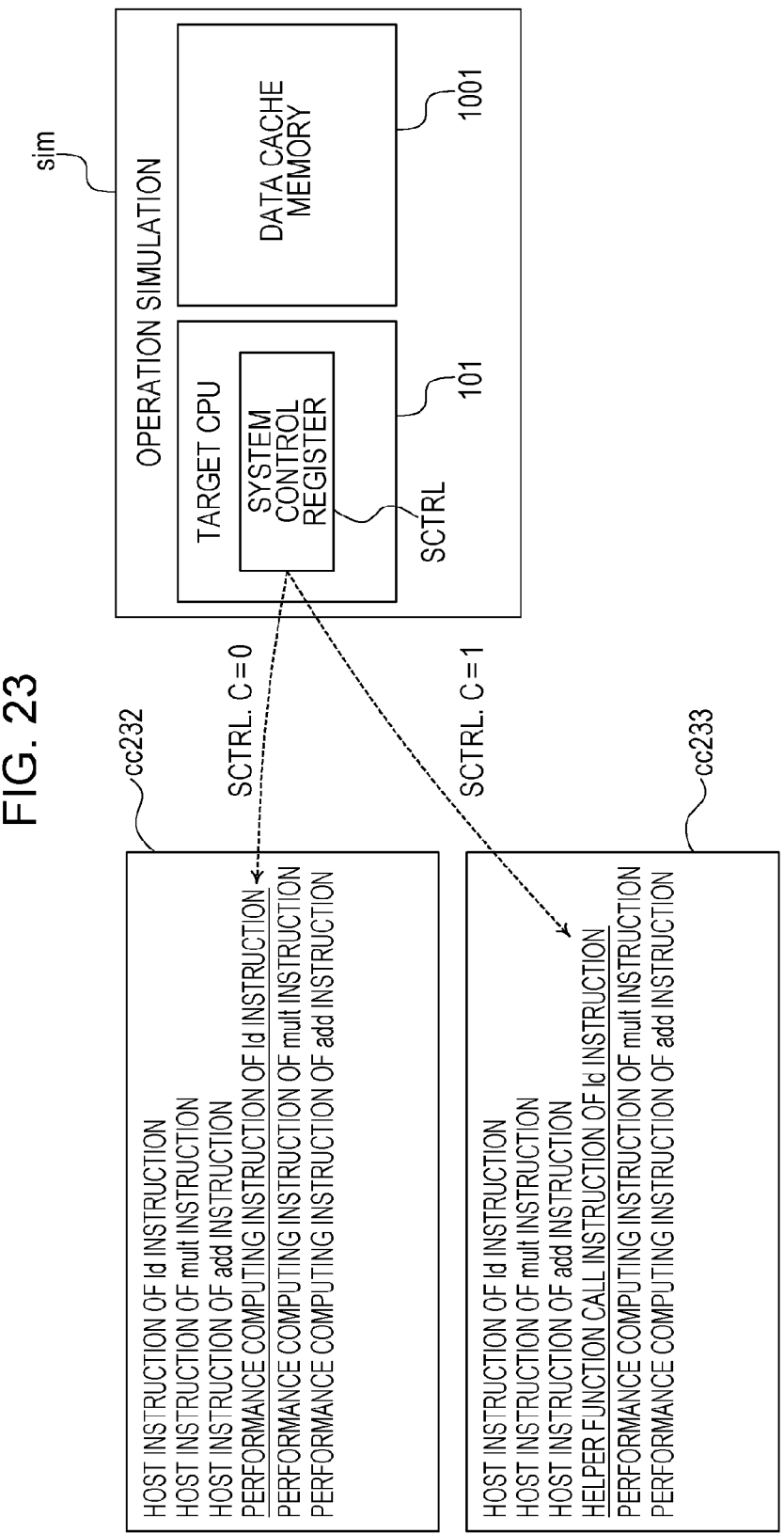
FIG. 23 is an explanatory diagram illustrating generation example 1 of a computational code concerning a data cache memory according to the third embodiment.

FIG. 23 is an explanatory diagram illustrating generation example 1 of a computational code concerning the data cache memory according to the third embodiment. When it has been determined that compiling has not been completed, the second determining part 2212 determines whether or not the data cache memory 1001 is in the available state for use when an access instruction in the target block b is executed in the operation simulation sim. Here, the target block b is not executed in the operation simulation sim. Therefore, the second determining part 2212 determines, based on the current state in the operation simulation sim, whether or not the data cache memory 1001 is in the available state for use at the time of execution of an access instruction in the target block b in the operation simulation sim.

The second determining part 2212 determines whether or not the data cache memory 1001 is in the available state for use. Specifically, the second determining part 2212 detects a C-bit value of a system control register SCTRL. When the C-bit value of the system control register SCTRL is 0, the second determining part 2212 determines that the data cache memory 1001 is not in the available state for use. When the C-bit value of the system control register SCTRL is 1, the second determining part 2212 determines that the data cache memory 1001 is in the available state for use.

The prediction simulation execution part 313 acquires and sets, based on the prediction information 321, each prediction case concerning an externally dependent instruction included in the target block b. Further, the prediction simulation execution part 313 sets, based on a determination result by the second determining part 2212, a prediction case concerning the data cache memory 1001 regarding an access instruction. For example, when it has been determined that the data cache memory 1001 is not in the available state for use, the prediction simulation execution part 313 sets a "cache miss" for the prediction case concerning the data cache memory 1001 for the case where an access instruction is executed. For example, when it has been determined that the data cache memory 1001 is in the available state for use, the prediction simulation execution part 313 sets a "cache hit" for the prediction case concerning the data cache memory 1001 for the case where an access instruction is executed.

Then, the prediction simulation execution part 313 referrers to the timing information 320, and simulates the execution progress of individual instructions in the target block b based on the assumption of the set prediction case. Accordingly, the prediction simulation execution part 313 obtains performance values of individual instructions in the target block b based on the assumption of the set prediction case.

In the case where it has been determined that the data cache memory 1001 is not in the available state for use, the code generating part 314 generates a computational code cc232. The generated computational code cc232 is associated with the target block b, and is stored in the memory device such as the RAM 203 or the disk 205. The computational code cc232 is a code for computing the performance value of the target block b, based on performance values of individual instructions in the target block b for the case where the data cache memory 1001 is not used, without depending on the state of the data cache memory 100. As illustrated in FIG. 23, in the case where the data cache memory 1001 is not in the available state for use, the computational code cc232 includes a performance computing instruction of an ld instruction for adding a performance value for the case where the data cache memory 1001 is not used to the performance value of the target block b. Further, the code execution unit 302 executes the generated computational code cc232. This enables a reduction in the amount of computation.

In the case where it has been determined that the data cache memory 1001 is not in the available state for use, after the code execution unit 302 executes the computational code cc232 associated with the target block b, the code optimization unit 2201 determines whether or not to invalidate all the computational codes. Specifically, the code optimization unit 2201 includes a determining part 2221 and an invalidating part 2222.

In the case where it has been determined that the data cache memory 1001 is not in the available state for use, after the computational code cc232 is executed, the determining part 2221 determines whether or not the data cache memory 1001 is in the available state for use. Depending on the determination of the determining part 2221, a shift in state of the data cache memory 1001 from the unavailable state for use to the available state for use is detected. The determination method of the determining part 2221 is the same as that of the second determining part 2212.

In the case where the determining part 2221 has determined that the data cache memory 1001 is not in the available state for use, the invalidating part 2222 does not invalidate the computational code cc232 for each block b. For example, in the case where the determining part 2221 has determined that the data cache memory 1001 is not in the available state for use and the target block b becomes a new computing target for a performance value, the code execution unit 302 executes the computational code cc232. Accordingly, during the period when the data cache memory 1001 is not in the available state for use, the performance value of the target block b is computed with the computational code cc232.

In contrast, in the case where the determining part 2221 has determined that the data cache memory 1001 is in the available state for use, the invalidating part 2222 invalidates the computational code cc232 for each block b. Specifically, by deleting the computational code cc232 stored in association with each block b, the invalidating part 2222 invalidates the computational code cc232. Accordingly, since the computational code associated with the target block b as a new computing target has been invalidated by the invalidating part 2222, the first determining part 2211 determines that compiling of the target block b has not yet been completed.

Then, when it has been determined that compiling of the target block b has not been completed, the second determining part 2212 determines whether or not the data cache memory 1001 is in the available state for use. As described above, in the case where it has been determined that the data cache memory 1001 is in the available state for use, the prediction simulation execution part 313 sets a "cache hit" for the prediction case concerning the data cache memory 1001 for the case where an access instruction is executed. The prediction simulation execution part 313 referrers to the timing information 320, and simulates the execution progress of individual instructions in the target block b based on the assumption of the set prediction case. Accordingly, the prediction simulation execution part 313 obtains performance values of individual instructions in the target block b based on the assumption of the set prediction case.

In the case where the second determining part 2212 has determined that the data cache memory 1001 is in the available state for use since the C-bit value of the system control register SCTRL is 1, the code generating part 314 generates a computational code cc233. The computational code cc233 is a code for computing a performance value of the block b based on performance values of individual instructions in the target block b for the case where the data cache memory 1001 is used. As illustrated in FIG. 23, the computational code cc233 includes a helper function call instruction of the Id instruction for calling a helper function for correcting the performance value of the Id instruction according to the result of a cache access of the data cache memory 1001. For example, the computational code cc233 including the helper function 1 call instruction described in the first embodiment may be generated here, and a combination of the first embodiment and the third embodiment may thus be achieved.

Then, the code execution unit 302 executes the generated computational code cc233. Further, once the state of the data cache memory 1001 is shifted from the unavailable state for use to the available state for use, the data cache memory 1001 will not return to the unavailable state. During initialization of the target CPU 101, the data cache memory 1001 is not in the available state for use. When the initialization of the target CPU 101 is completed, the data cache memory 1001 becomes available for use. When the second determining part 2212 determines that the data cache memory 1001 is in the available state for use, the code optimization unit 2201 according to the third embodiment does not perform processing.

TLB

Figure 24:
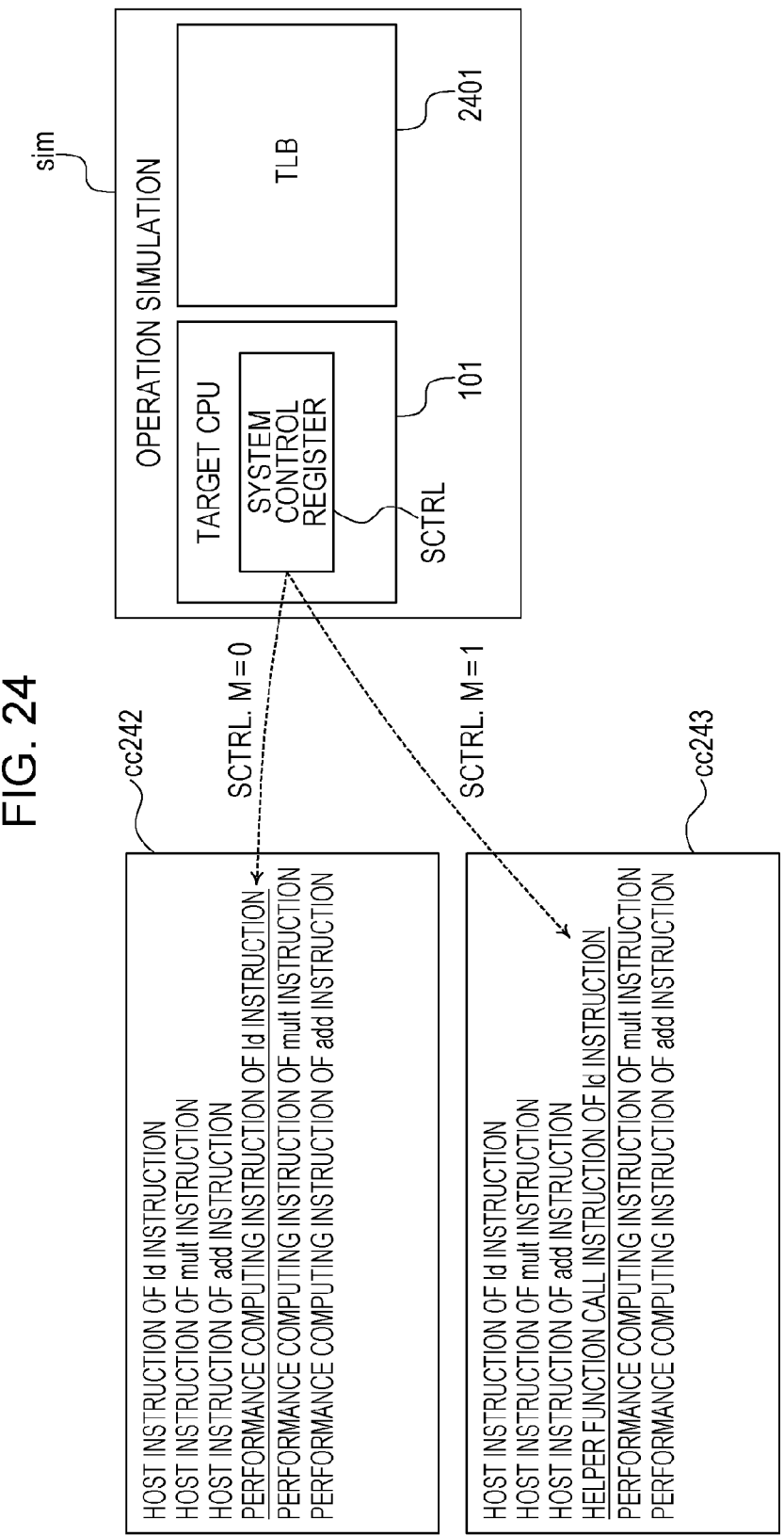
FIG. 24 is an explanatory diagram illustrating generation example 2 of a computational code concerning a TLB according to the third embodiment.

FIG. 24 is an explanatory diagram illustrating generation example 2 of a computational code concerning the TLB according to the third embodiment. In the case of a TLB 2401, as with the data cache memory 1001, processing is performed for individual parts. The second determining part 2212 determines whether or not the TLB 2401 is in the available state for use. Specifically, the second determining part 2212 detects an M-bit value of the system control register SCTRL. When the M-bit value of the system control register SCTRL is 0, the second determining part 2212 determines that the TLB 2401 is not in the available state for use. When the M-bit value of the system control register SCTRL is 1, the second determining part 2212 determines that the TLB 2401 is in the available state for use.

The prediction simulation execution part 313 acquires and sets, based on the prediction information 321, each prediction case concerning an externally dependent instruction included in the target block b. Further, the prediction simulation execution part 313 sets, based on the determination result by the second determining part 2212, a prediction case concerning the data cache memory 1001 regarding an access instruction. For example, in the case where it has been determined that the TLB 2401 is not in the available state for use, the prediction simulation execution part 313 sets "TLB unavailable for use" for the prediction case concerning the data cache memory 1001 for the case where an access instruction is executed. For example, in the case where it has been determined that the TLB 2401 is in the available state for use, the prediction simulation execution part 313 sets a "cache hit" for the prediction case concerning the TLB 2401 for the case where an access instruction is executed.

Then, the prediction simulation execution part 313, as described above, obtains performance values of individual instructions in the target block b based on the assumption of the set prediction case.

In the case where the second determining part 2212 has determined that the TLB 2401 is not in the available state for use, the code generating part 314 generates a computational code cc242. The computational code cc 242 is a code for computing a performance value of the target block b, based on performance values of individual instructions in the target block b for the case where the data cache memory 1001 is not used, without depending on the state of the TLB 2401. The code execution unit 302 executes the generated computational code cc242. As illustrated in FIG. 24, in the case where the TLB 2401 is not in the available state for use, the computational code cc242 includes a performance computing instruction of an Id instruction for adding a performance value for the case where the TLB 2401 is not used to the performance value of the target block b.

Since processing of the code execution unit 302, the code optimization unit 2201, and the like, is similar to that in the case of the data cache memory 1001, a detailed explanation for the processing will be omitted.

In the case where the second determining part 2212 has determined that the TLB 2401 is in the available state for use, the code generating part 314 generates a computational code cc243. The computational code cc243 is a code for computing the performance value of the target block b, based on performance values of individual instructions in the target block b for the case where the TLB 2401 is used. As illustrated in FIG. 24, the computational code cc243 includes a helper function call instruction of the Id instruction for calling a helper function for correcting a performance value of the Id instruction according to the search result of the TLB 2401. For example, the computational code cc243 including the helper function 1 call instruction described in the fourth embodiment may be generated here. Accordingly, a combination of the third embodiment and the fourth embodiment may thus be achieved.

For easier understanding, descriptions on the generation examples of the computational code cc 243 are given by discriminating between the cases of the TLB 2401 and of the data cache memory 1001. However, in actuality, the same performance computing instruction and the same helper function may be used.

Example of Computing Processing Procedure by Computing Apparatus 100 According to Third Embodiment In the third embodiment, a computing processing procedure example which is the same as that performed by the computing apparatus 100 according to the first or second embodiment will not be explained, and only computing processing different from that in the first and second embodiments will be explained in detail.

Figure 25:
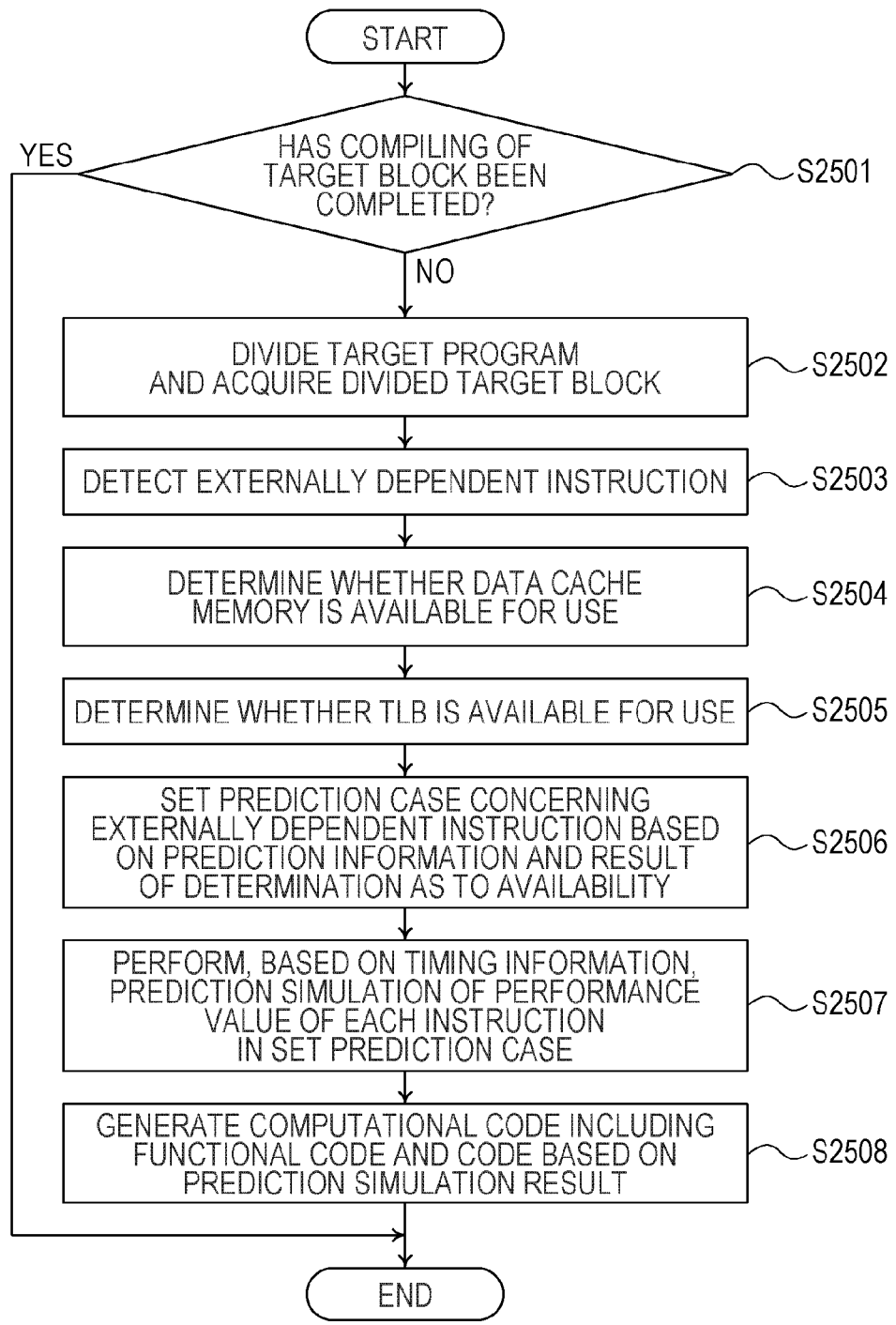
FIG. 25 is a flowchart illustrating the generation process illustrated in FIG. 17 according to the third embodiment in more detail.

FIG. 25 is a flowchart illustrating the generation process illustrated in FIG. 17 according to the third embodiment in detail. The computing apparatus 100 determines whether or not compiling of the target block b has been completed (step S2501). The computing apparatus 100 is capable of specifying a target block b that is to be the next computing target, based on the value of the PC in the operation simulation sim. Further, the computing apparatus 100 is capable of specifying a target block b based on the execution result of a functional code included in a computational code.

In the case where compiling of the target block b has not been completed (step S2501: No), the computing apparatus 100 divides the target program pgr and acquires a target block b (step S2502). The computing apparatus 100 detects an externally dependent instruction in the target block b (step S2503).

The computing apparatus 100 determines whether or not the data cache memory 1001 in the operation simulation sim is in the available state for use (step S2504). Specifically, the computing apparatus 100 makes the determination based on a C-bit value of the system control register SCTRL in the operation simulation sim. The computing apparatus 100 determines whether or not the TLB 2401 in the operation simulation sim is in the available state for use (step S2505). Specifically, the computing apparatus 100 makes the determination based on a C-bit value of the system control register SCTRL in the operation simulation sim.

The computing apparatus 100 sets, based on the prediction information 321 and a determination result as to the availability, a prediction case concerning the externally dependent instruction (step S2506). The computing apparatus 100 performs, based on the timing information 320, a prediction simulation of performance values of individual instructions for the set prediction case (step S2507). The computing apparatus 100 generates a computational code which includes a functional code obtained by compiling the target block b and a code based on the prediction simulation result (step S2508), and terminates the series of processing operations. The computational code generated in step S2508 is a first computational code.

When compiling of the target block b has been completed in step S2501 (step S2501: Yes), the computing apparatus 100 terminates the series of processing operations.

Figure 26:
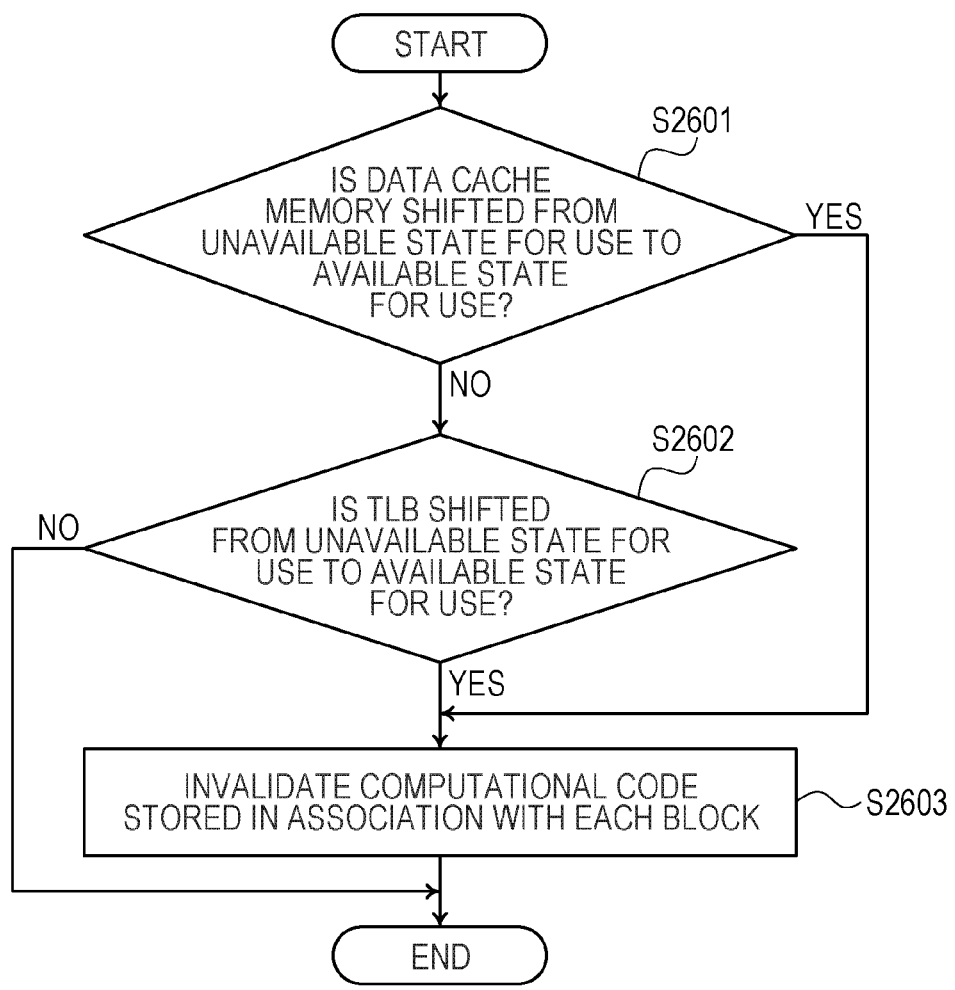
FIG. 26 is a flowchart illustrating the code optimization process illustrated in FIG. 17 according to the third embodiment in more detail.

FIG. 26 is a flowchart illustrating the code optimization process illustrated in FIG. 17 according to the third embodiment in more detail. The computing apparatus 100 determines whether or not the state of the data cache memory 1001 has been shifted from the unavailable state for use to the available state for use (step S2601). When the data cache memory 1001 has not been shifted from the unavailable state for use to the available state for use (step S2601: No), the computing apparatus 100 determines whether or not the TLB 2401 has been shifted from the unavailable state for use to the available state for use (step S2602). When the TLB 2401 has been shifted from the unavailable state for use to the available state for use in step S2602 (step S2602: Yes) or the data cache memory 1001 has been shifted from the unavailable state for use to the available state for use in step S2601 (step S2601: Yes), the computing apparatus 100 invalidates a computational code stored in association with each block b (step S2603), and terminates the series of processing operations. Specifically, the computing apparatus 100 deletes the computational code stored in association with each block b.

In contrast, in the case where the TLB 2401 has not been shifted from the unavailable state for use to the available state for use (step S2602: No), the computing apparatus 100 terminates the series of processing operations. Either of step S2601 and step S2602 may be executed first. For example, when a computational code is invalidated in step S2603, it is determined that compiling of the block b is not completed in step S2501 and a new computational code concerning the block b is generated.

Fourth Embodiment

In the case where the target CPU 101 is an ARM processor, the target CPU 101 has two operation modes: a first mode and a second mode. The first mode is referred to as a user mode. The second mode is referred to as a privileged mode, in which the operation of the target CPU 101 is less limited compared to the first mode. That is, the target CPU 101 has a privileged mode and a user mode. All the operation modes different from the user mode are referred to as a privileged mode. Since the privileged mode is an operation mode in which the operation of a processor is less limited compared to the user mode, it is possible to access a system area in which a kernel or the like is stored in the privileged mode. Access to the system area in the privileged mode is designed in advance so that there is a hit in the TLB 2401. For example, with the TLB 2401, the system area is managed with a single page table entry. The TLB 2401 is designed in advance in such a manner that the page table entry is not deleted from the TLB 2401 by using a special flag for the system area. Accordingly, a hit in the TLB 2401 by the access may be realized. Thus, in the case where an access instruction in the privileged mode is executed by the target CPU 101, since access to the system area is made, the operation of the TLB 2401 for the access instruction is "hit".

In the fourth embodiment, in the case where the operation mode is the privileged mode at the time when an access instruction is executed in an operation simulation sim, a computational code for computing the performance value of a target block b, based on performance values of individual instructions in the target block b based on the assumption of a hit in the TLB, is generated. Therefore, in the case where the target block b becomes a new computing target, processing for determining whether there is a hit in the TLB is not performed. Thus, the amount of computation for the case where the target block b becomes a new computing target may be reduced. In the fourth embodiment, detailed explanations for the same functions and configurations as those explained in any of the first to third embodiments will be omitted.

First, the code generating part 314 performs compiling of the target block b to generate a functional code. The code generating part 314 also generates a performance computing instruction for adding the performance values of individual instructions within the target block b obtained by a prediction simulation to the performance value of the target block b. The code generating part 314 also generates a helper function 1 call instruction for calling a helper function 1 for an externally dependent instruction. The helper function 1 call instruction is an instruction for calling a helper function 1 and adding a performance value output in accordance with processing according to the helper function 1 to the performance value of the target block b. The processing according to the helper function 1 in the fourth embodiment is processing for correcting the performance value of an access instruction based on the operation mode of the target CPU 101 and the state of the TLB 2401 at the time when the access instruction is executed and outputting the corrected performance value.

For an externally dependent instruction other than the access instruction, the code generating part 314 generates, based on whether the execution result of the externally dependent instruction matches a prediction case, a helper function for directing processing for correcting the performance value of the externally dependent instruction for the case of the prediction case. Then, the code generating part 314 generates a first computational code, which is obtained by adding the generated performance computing instruction and helper function 1 call instruction to the functional code. The generated first computational code is associated with the target block b and stored in the memory device such as the RAM 203 or the disk 205.

Then, the code execution unit 302 performs a performance simulation for computing the performance value of the target block b by executing the first computational code. As in the first embodiment, the code execution unit 302 includes the execution part 901, the first determining part 902, the second determining part 903, the output part 904, and the correcting part 905.

Figure 27:
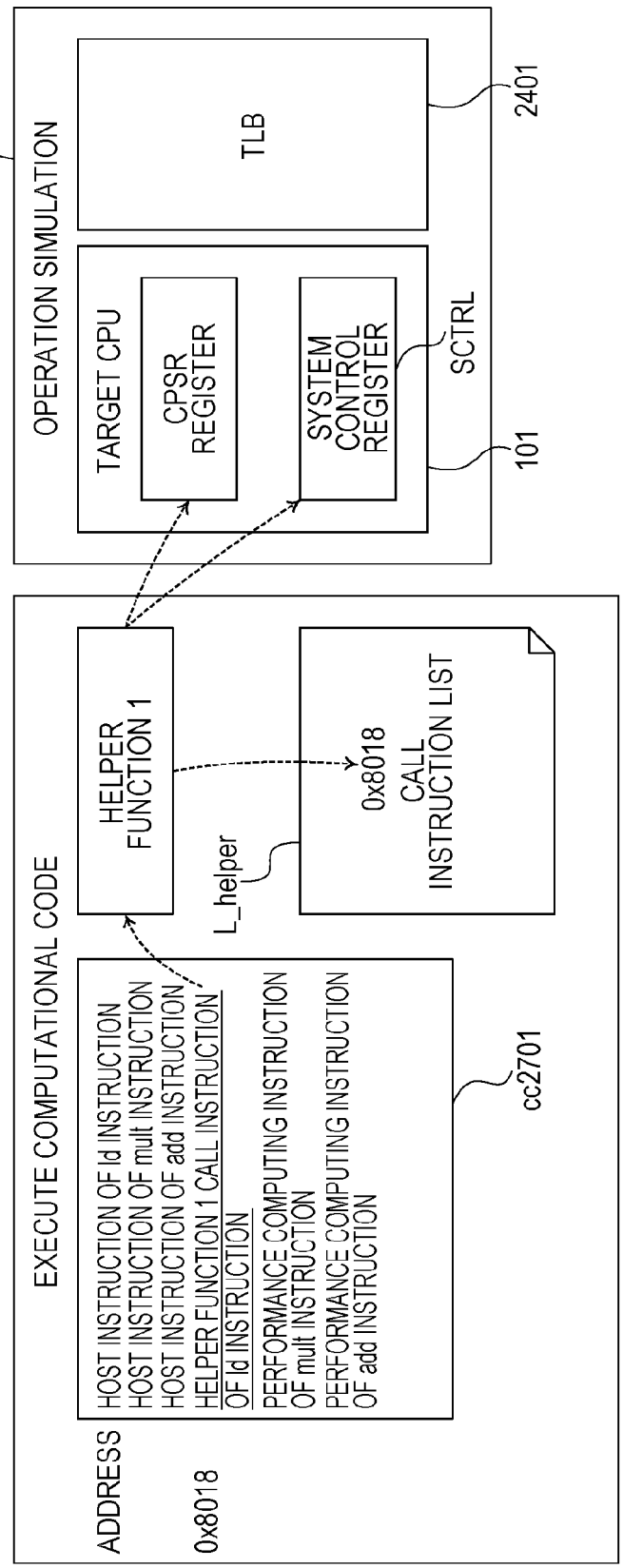
FIG. 27 is an explanatory diagram illustrating an execution example by a code execution unit according to a fourth embodiment.

FIG. 27 is an explanatory diagram illustrating an execution example by the code execution unit according to the fourth embodiment. For example, the code execution unit 302 executes instructions included in a first computational code cc2701 in order. Then, the execution part 901 executes a helper function 1 call instruction concerning the TLB 2401 of an ld instruction, calls a helper function 1, and performs processing instructed by the helper function 1. Accordingly, processing from the first determining part 902 to the correcting part 905 is performed.

In the example of FIG. 27, the first determining part 902 determines whether or not the TLB 2401 is effective in an operation at the time of execution of the target block b of the simulation sim of an operation in which the target CPU 101 executes the target program pgr. For example, in the case where the target CPU 101 is an ARM processor, the first determining part 902 detects an M-bit value of the system control register SCTRL in the operation at the time of execution of the target block b of the operation simulation sim. Then, the first determining part 902 determines whether the M-bit value of the system control register SCTRL is 0 or 1. In the case where the M-bit value of the system control register SCTRL is 0, the first determining part 902 determines that the TLB 2401 is not in an available state for use. In the case where the M-bit value of the system control register SCTRL is 1, the first determining part 902 determines that the TLB 2401 is in an available state for use.

In the case where it has been determined that the TLB 2401 is in the available state for use, the second determining part 903 determines whether or not the operation mode of the target CPU 101 at the time when executing an access instruction within the target block b in the operation simulation sim is a privileged mode.

More specifically, in the case where the target CPU 101 is an ARM processor, the second determining part 903 detects the value of an M field of a CPSR register. In the case where the value of the M field of the CPSR register is "1000b", the second determining part 903 determines that the operation mode of the target CPU 101 is a user mode. In the case where the value of the M field of the CPSR register is a value different from "1000b", the second determining part 903 determines that the operation mode of the target CPU 101 is a privileged mode.

In the case where it has been determined that the operation mode is a privileged mode, the output part 904 outputs the address of a memory area in which the helper function 1 call instruction, which is the callout source, is stored to a call instruction list L_helper.

In the case where it has been determined that the operation mode is a privileged mode, the correcting part 905 outputs the performance value of the access instruction without correcting the performance value, if the prediction case is a "hit". In the case where it has been determined that the operation mode is a privileged mode, the correcting part 905 makes a correction to a performance value of the access instruction for the case where the operation of the TLB 2401 is a "hit", based on the timing information 320, if the prediction case is a "miss hit", and outputs the corrected performance value.

In the case where it has been determined that the operation mode is a user mode, the correcting part 905 determines whether or not an operational result of the TLB 2401 in the operation simulation sim matches the prediction case, if the prediction case is a "miss hit". In the case where the operational result matches the prediction case, the correcting part 905 outputs the performance value of the access instruction, without correcting the performance value. In the case where the operational result does not match the prediction case, the correcting part 905 corrects the performance value of the access instruction, and outputs the corrected performance value. In the example described above, since the prediction case is a "cache hit", the correcting part 905 determines whether the operation of the TLB 2401 in the operation simulation sim is a "miss hit". In the case where the operation of the TLB 2401 is a "miss hit", the correcting part 905 corrects the performance value by adding a penalty value within the timing information 320 to the performance value of the access instruction, and outputs the corrected performance value. An example of correcting processing by the correcting part 905 is described in detail in the second embodiment.

In the case where it has been determined that the TLB 2401 is ineffective, the correcting part 905 corrects, based on the timing information 320, the performance value by adding a penalty value for the case where the TLB 2401 is ineffective to the performance value of the access instruction, and outputs the corrected performance value.

In the case where it has been determined that the operation mode is a privileged mode, the code optimization unit 2201 generates a second computational code. The second computational code is a computational code for computing the performance value of the target block b for the case where the host CPU 201 executes the target block b, based on the performance values of individual instructions within the target block b for the case where the operation of the TLB 2401 is a "hit", without depending on the operation mode. As described above, regarding access to the system area, since the operation of the TLB 2401 is a "hit", processing for correcting the performance value of the access instruction in accordance with whether or not the operation of the TLB 2401 is a "hit", is not performed.

More specifically, the code optimization unit 2201 replaces the helper function 1 call instruction represented by an address within the call instruction list L_helper of the first computational code cc2701 with a performance computing instruction for addition of the performance value of an ld instruction for the case where there is a "hit". Accordingly, the code optimization unit 2201 generates the second computational code. The generated second computational code is associated with the target block b and stored in memory device, such as the RAM 203 or the disk 205.

In the case where the block b for which the second computational code has been generated becomes the target block b, since the second computational code is associated with the target block b, the determining part 312 determines that compiling has been completed. The code execution unit 302 performs a simulation of a performance for computing the performance value of the target block b by executing the second computational code. As described above, processing from the first determining part 902 to the correcting part 905 included in the code execution unit 302 is coded on a helper function 1. Thus, in execution of the second computational code on which the helper function 1 call instruction is not coded, processing from the first determining part 902 to the correcting part 905 is not performed.

Accordingly, a performance value for the case where a target block b including an access instruction becomes a new computing target may be computed more quickly.

In the case where it has been determined that the operation mode is not a privileged mode, the code optimization unit 2201 generates a second computational code. The second computational code is a computational code for computing the performance value of the target block b for the case where the host CPU 201 executes the target block b, based on the performance values of individual instructions within a target block b for the case where the operation of the TLB 2401 matches a prediction case, without depending on the operation mode.

Example of Computing Processing Procedure by Computing Apparatus 100 According to Fourth Embodiment In the fourth embodiment, a computing processing procedure example which is the same as that performed by the computing apparatus 100 according to the first or second embodiment will not be explained, and only computing processing different from that in the first and second embodiments will be explained in detail.

Figure 28:
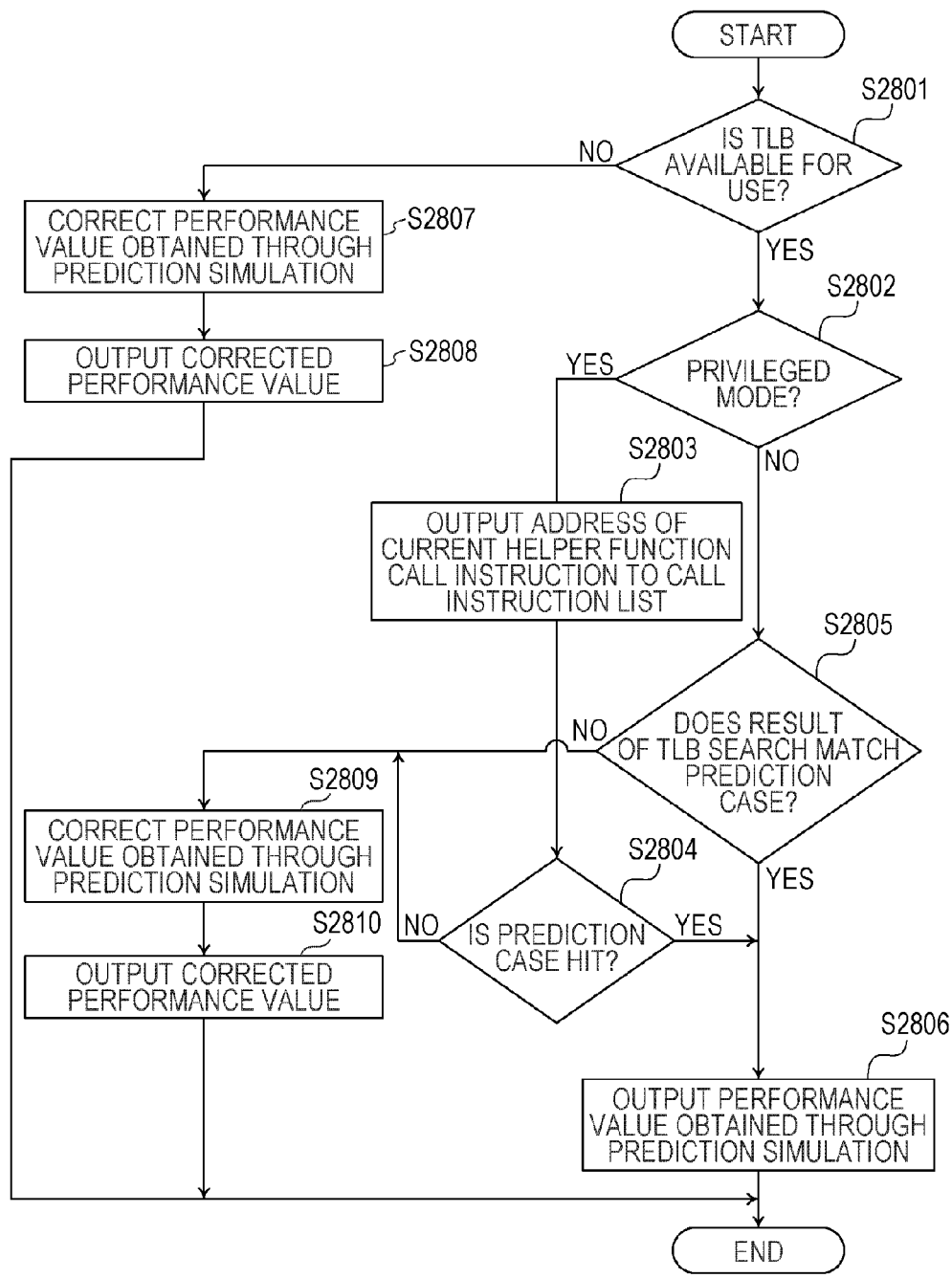
FIG. 28 is a flowchart illustrating an example of a computing processing procedure according to a helper function 1 concerning a TLB by a computing apparatus according to the fourth embodiment.

FIG. 28 is a flowchart illustrating an example of a computing processing procedure according to a helper function 1 concerning a TLB by the computing apparatus according to the fourth embodiment. The helper function 1 concerning the TLB 2401 is called, for example, when the host CPU 201 executes a helper function 1 call instruction, which is a code for a performance simulation for an access instruction, such as an st instruction or an ld instruction.

The computing apparatus 100 determines whether or not the TLB 2401 of the target CPU 101 is in the available state for use in an operation simulation sim (step S2801). As described above, in the case where the target CPU 101 is an ARM processor, the computing apparatus 100 determines whether the M-bit value of the system control register SCTRL in the operation simulation sim is 0 or 1. In the case where the M-bit value of the system control register SCTRL is 0, the computing apparatus 100 determines that the TLB 2401 is not in the available state for use. In the case where the M-bit value of the system control register SCTRL is 1, the computing apparatus 100 determines that the TLB 2401 is in the available state for use.

In the case where the TLB 2401 is in the available state for use (step S2801: Yes), the computing apparatus 100 determines whether or not the operation mode of the target CPU 101 in the operation simulation sim is a privileged mode (step S2802). For example, in the case where the target CPU 101 is an ARM processor, the computing apparatus 100 determines, based on the value of an M field of the CPSR, whether or not the operation mode is in the privileged mode. In the case where the value of the M field of the CPSR is 1000b, the computing apparatus 100 determines that the operation mode is a user mode. In the case where the value of the M field of the CPSR is different from 1000b, the computing apparatus 100 determines that the operation mode is a privileged mode.

In the case of the privileged mode (step S2802: Yes), the computing apparatus 100 outputs the address of the current helper function call instruction to the call instruction list L_helper (step S2803). The computing apparatus 100 determines whether or not a prediction case is a hit (S2804). In the case where the prediction case is a hit (step S2804: Yes), the computing apparatus 100 proceeds to step S2806. In the case where the prediction case is not a hit (step S2804: No), the computing apparatus 100 proceeds to step S2809.

In the privileged mode, access to the system area is made with an ld instruction or an st instruction. As described above, regarding access to the system area, the result of a search of the TLB 2401 represents a hit. Therefore, the performance value in the case where there is a hit in the TLB 2401 is output.

In the case of a mode different from the privileged mode in step S2802 (step S2802: No), the computing apparatus 100 determines whether or not the result of the search of the TLB 2401 in the operation simulation sim matches the prediction case (step S2805). In the case where the result matches the prediction case (step S2805: Yes), the computing apparatus 100 outputs the performance value obtained through a prediction simulation (step S2806). Then, the computing apparatus 100 terminates the series of processing operations. In the case where the result does not match the prediction case (step S2805: No), the computing apparatus 100 corrects the performance value obtained through the prediction simulation (step S2809). Here, a correction is made based on a penalty value in the case where the TLB is available for use included in the timing information 320. Then, the computing apparatus 100 outputs the corrected performance value (step S2810), and terminates the series of processing operations.

In the case where the TLB 2401 is not in the available state for use in step S2801 (step S2801: No), the computing apparatus 100 corrects the performance value obtained through the prediction simulation (step S2807). Here, a correction is made based on a penalty value in the case where the TLB is not available for use included in the timing information 320. The computing apparatus 100 outputs the corrected performance value (step S2808), and terminates the series of processing operations.

Figure 29:
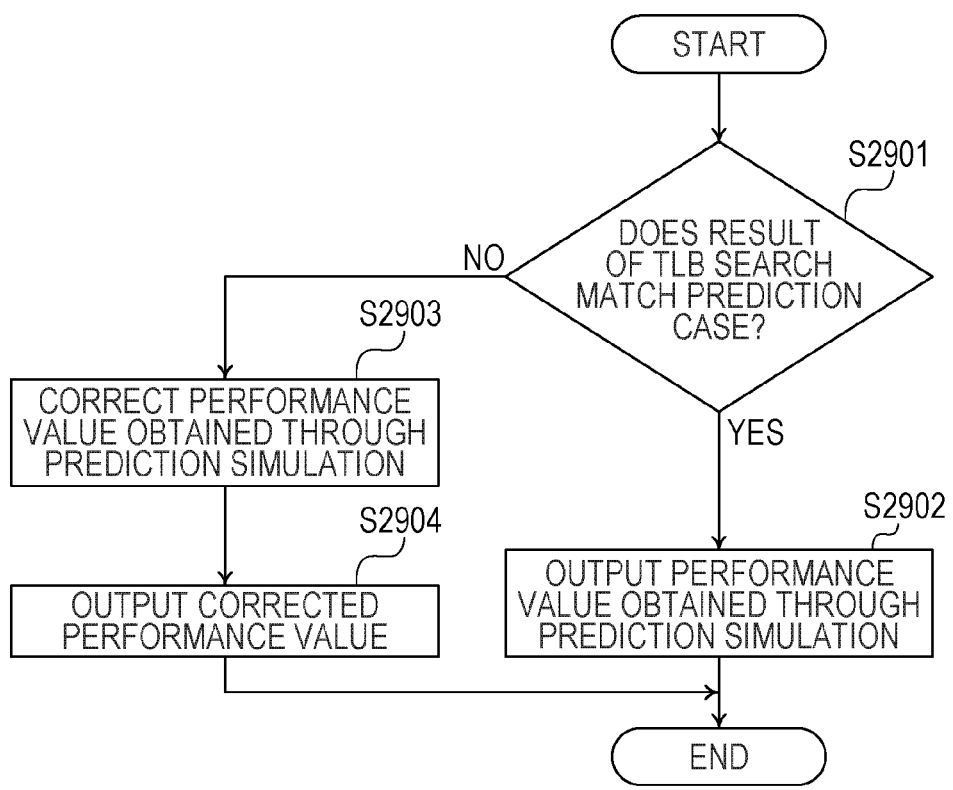
FIG. 29 is a flowchart illustrating an example of a computing processing procedure according to a helper function 2 concerning the TLB by the computing apparatus according to the fourth embodiment.

FIG. 29 is a flowchart illustrating an example of a computing processing procedure according to a helper function 2 concerning the TLB by the computing apparatus according to the fourth embodiment. The helper function 2 concerning the TLB 2401 is a function in which the determination as to whether or not the operation mode is a privileged mode in the helper function 1 is omitted. The computing apparatus 100 determines whether or not the result of a search of the TLB 2401 in the operation simulation sim matches the prediction case (step S2901). In the case where the result matches the prediction case (step S2901: Yes), the computing apparatus 100 outputs the performance value obtained through the prediction simulation (step S2902). Then, the computing apparatus 100 terminates the series of processing operations. In the case where the result does not match the prediction case (step S2901: No), the computing apparatus 100 corrects the performance value obtained through the prediction simulation (step S2903). Then, the computing apparatus 100 outputs the corrected performance value (step S2904), and terminates the series of processing operations.

Fifth Embodiment

In the fifth embodiment, in replacement of the helper function 1 call instruction in the first or fourth embodiment with a performance computing instruction, consecutive performance computing instructions are integrated into one performance computing instruction. Accordingly, the amount of computation for the case where the target block b becomes a new computing target may be reduced. Furthermore, in the fifth embodiment, a detailed explanation for the same functions and configurations as those explained in any of the first to fourth embodiments will be omitted.

Figure 30:
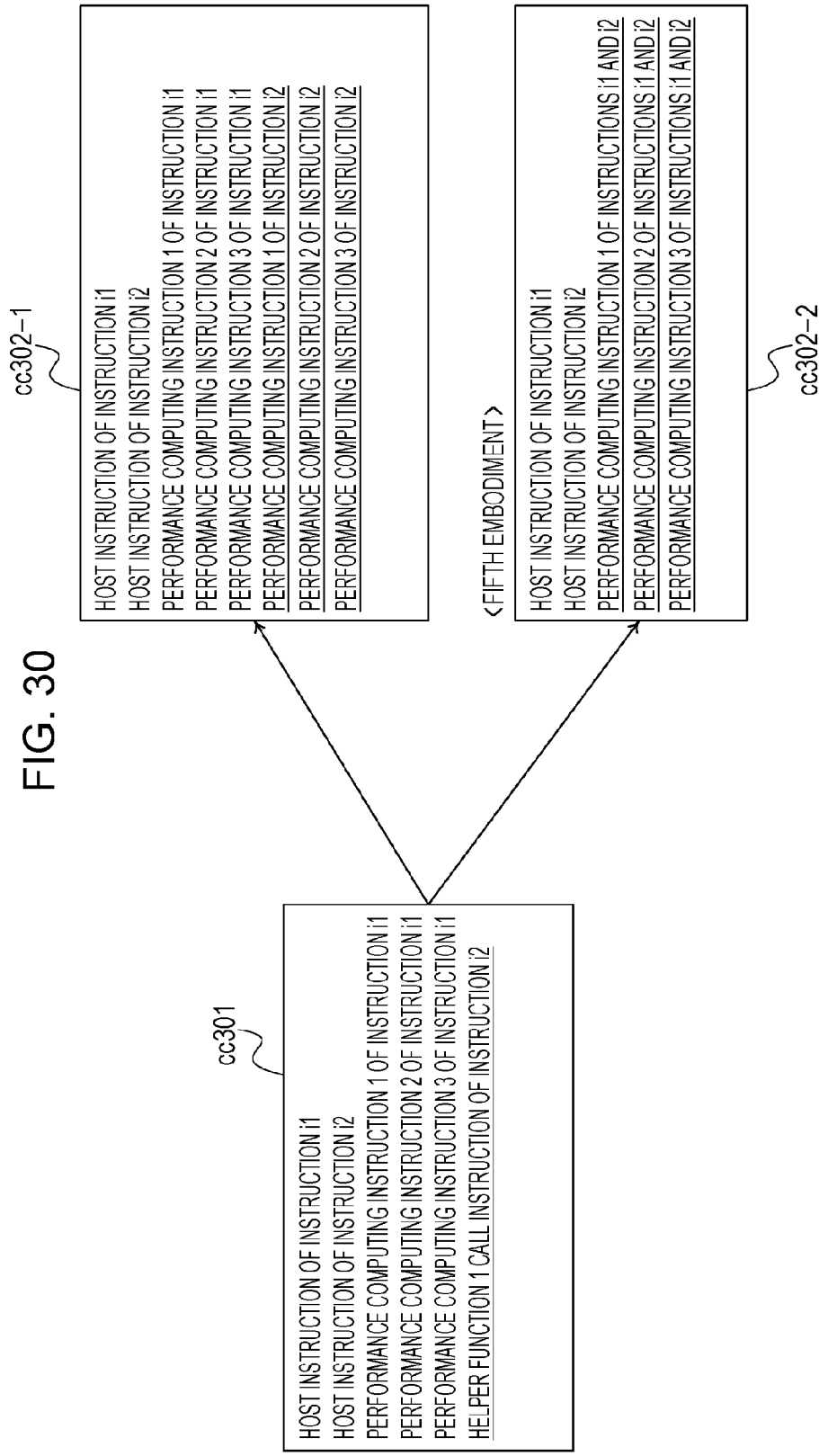
FIG. 30 is an explanatory diagram illustrating an example of code optimization by a computing apparatus according to a fifth embodiment.

FIG. 30 is an explanatory diagram illustrating an example of code optimization by the computing apparatus according to the fifth embodiment. The code optimization unit 2201 in the fifth embodiment generates a computational code cc302-2, which is obtained by replacing a helper function 1 call instruction within a computational code cc301 and performance computing instructions that may be consecutive to one another with an integrated performance computing instruction, which is an integration of the helper function 1 call instruction and the performance computing instructions. In this case, the amount of computation may be reduced compared to a computational code cc302-1 obtained by simply replacing the helper function 1 call instruction with a performance computing instruction.

Figure 31:
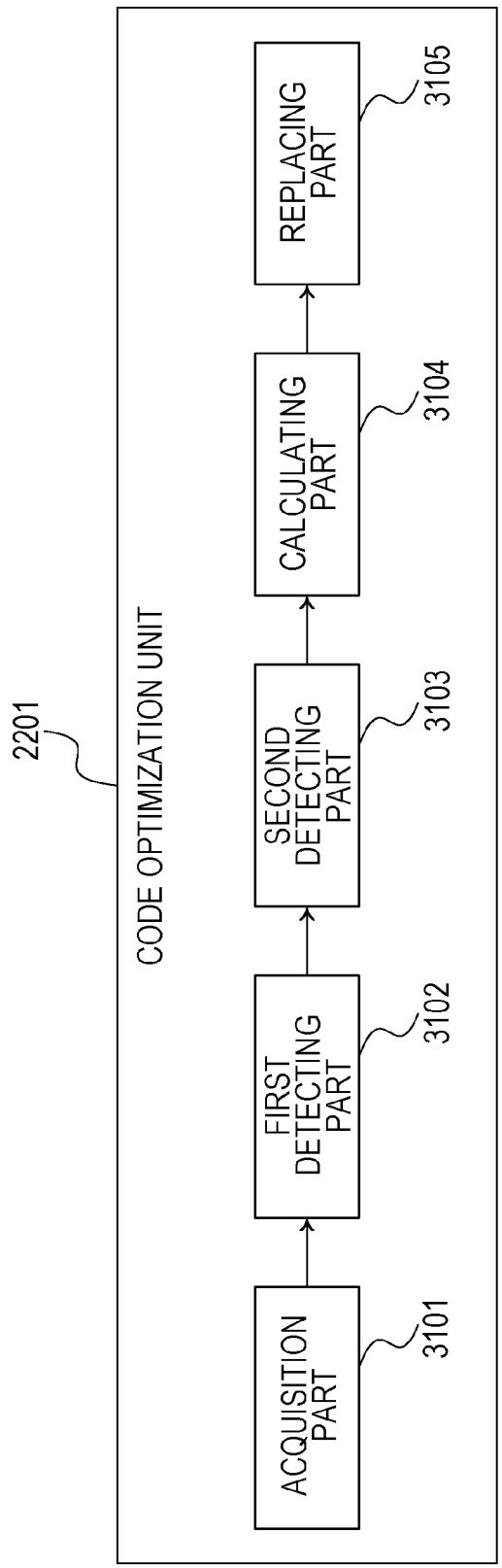
FIG. 31 is a block diagram illustrating a detailed example of a code optimization unit.

FIG. 31 is a block diagram illustrating a detailed example of the code optimization unit. The code optimization unit 2201 includes an acquisition part 3101, a first detecting part 3102, a second detecting part 3103, a calculating part 3104, and a replacing part 3105.

First, an example in which a helper function 1 call instruction that has been determined not to use the data cache memory 1001 is replaced with a performance computing instruction, which has been explained in the first embodiment, will be explained. The acquisition part 3101 acquires the computational code cc301 stored in association with the target block b.

The first detecting part 3102 detects a helper function 1 call instruction for an access instruction for which it has been determined that an attribute does not indicate that the data cache memory 1001 is available for use from the acquired computational code cc301. The second detecting part 3103 detects a performance computing instruction existing in a range from the detected helper function 1 call instruction to a helper function 1 call instruction for an access instruction for which it has been determined that an attribute indicates that the data cache memory 1001 is available for use.

For example, the calculating part 3104 calculates the total value of a performance value to be added to the performance value of the target block b based on the detected performance computing instruction and the performance value of an access instruction for the case where the data cache memory 1001 is not used.

The replacing part 3105 replaces the detected performance computing instruction and the detected helper function 1 call instruction in the computational code cc301 with a performance computing instruction for adding the calculated total value to the performance value of the target block b.

Next, an example in which a helper function 1 call instruction for which it has been determined that the operation mode of the target CPU 101 is a privileged mode is replaced with a performance computing instruction, which has been explained in the fourth embodiment, will be explained. The acquisition part 3101 acquires the computational code cc301.

The first detecting part 3102 detects a helper function 1 call instruction for an access instruction for which it has been determined that the operation mode is a privileged mode from the acquired computational code cc301. The second detecting part 3103 detects a performance computing instruction existing in a range from the detected helper function 1 call instruction to a helper function 1 call instruction for an access instruction for which it has been determined that the operation mode is not a privileged mode.

For example, the calculating part 3104 calculates the total value of a performance value to be added to the performance value of the target block b based on the detected performance computing instruction and the performance value of an access instruction for the case where conversion information on a logical address and a physical address is stored in the TLB.

The replacing part 3105 replaces the detected performance computing instruction and the detected helper function 1 call instruction from the computational code cc301 with a performance computing instruction for adding the calculated total value to the performance value of the target block b.

Next, operation example 1 by the code optimization unit 2201 will be explained in detail with reference to FIGS. 32 to 36, and operation example 2 by the code optimization unit 2201 will be explained in detail with reference to FIGS. 37 to 42.

FIGS. 32 to 36 are explanatory diagrams illustrating the detailed operation example 1 by the code optimization unit. First, the acquisition part 3101 acquires a computational code cc321. The number of performance computing instructions for individual instructions within a target block b is determined based on the configuration of the host CPU 201. In an example of the computational code cc321, performance computing instructions for adding the performance values of individual instructions to the target block b are implemented by the following three instructions:

performance computing instruction 1: load performance value to register performance computing instruction 2: add performance value to register performance computing instruction 3: store value of register in performance value The first detecting part 3102 selects an address included in the call instruction list L_helper, and defines the selected address as m_helper. Then, the first detecting part 3102 detects a helper function 1 call instruction represented by m_helper. In the example of FIG. 32, for easier understanding, the order of an instruction from the beginning is used as the address of the instruction. Since "6" exists in the call instruction list L_helper, the first detecting part 3102 detects a helper function 1 call instruction of an instruction i2.

For example, if an instruction coded immediately before the detected helper function 1 call instruction is a performance computing instruction, the second detecting part 3103 defines the address of the performance computing instruction as r_start. If an instruction coded immediately before the detected helper function 1 call instruction is not a performance computing instruction, the second detecting part 3103 defines the address representing the detected helper function 1 call instruction as r_start. In the example of FIG. 33, the address representing a performance computing instruction 1 of an instruction i1 is represented as r_start.

Then, the second detecting part 3103 searches for an instruction subsequent to the detected helper function 1 call instruction of the instruction i2. Then, the second detecting part 3103 searches a range from the helper function 1 call instruction of the instruction i2 to a helper function 1 call instruction whose address is not registered in the call instruction list L_helper. The second detecting part 3103 defines an address representing an instruction immediately before the helper function 1 call instruction that is not registered, out of instructions existing between the helper function 1 call instruction of the instruction i2 and the helper function 1 call instruction that is not registered, as r_end. In the case where no helper function 1 call instruction whose address is not registered in the call instruction list L_helper follows the helper function 1 call instruction of the instruction i2, the second detecting part 3103 defines the address representing the last instruction within the target block b as r_end. In the example of FIG. 34, r_end represents the address representing the helper function 1 call instruction of the instruction i2.

The calculating part 3104 acquires a performance value to be added to the performance value of the target block b based on a performance computing instruction of an instruction group from the instruction represented by r_start to the instruction represented by r_end. The calculating part 3104 acquires a performance value to be added to the performance value of the target block b based on the helper function 1 call instruction of the instruction group. The performance value to be added to the performance value of the target block b based on the helper function 1 call instruction of the instruction group is, for example, the performance value of an access instruction for the case where the data cache memory 1001 is not used. The performance value to be added to the performance value of the target block b based on the helper function 1 call instruction of the instruction group is, for example, the performance value of an access instruction for the case where conversion information exists in the TLB. In the example of the helper function 2 cache_Id (address, rep_delay, pre_delay) illustrated in FIG. 13, three arguments are passed to the helper function cache_Id. Therefore, in the case where the host CPU 201 is based on x86 architecture, a helper function 1 call instruction includes the following four instructions:

push pre_delay: store the third argument to stack
   push rep_delay: store the second argument to stack
   push addr: store the first argument to stack
   call cache_Id: call helper function 1 cache_Id.

The calculating part 3104 acquires the performance value of the helper function 1 call instruction by referring to pre_delay or the like of the four instructions and calculating a performance value for the case where the data cache memory 1001 is not used.

Figure 35:
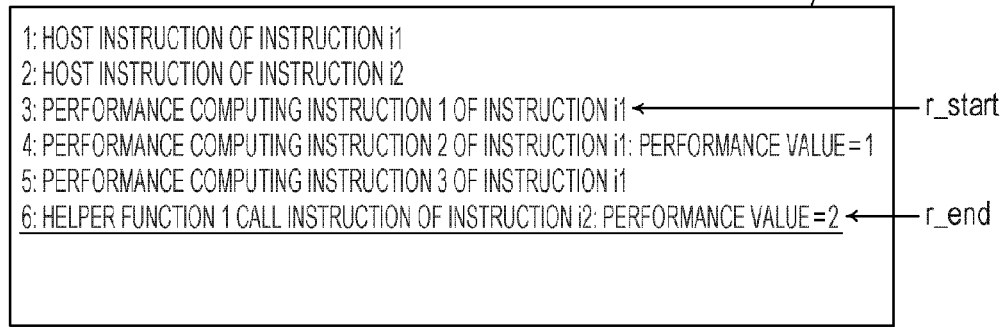
FIG. 35 is an explanatory diagram (part 4) illustrating detailed operation example 1 by the code optimization unit.

Then, the calculating part 3104 calculates the total value of the acquired performance values. In the example of FIG. 35, since the performance value of the performance computing instruction 2 of the instruction i1 is 1 and the performance value of the helper function 1 call instruction of the instruction i2 is 2, the total value sum is 3.

Figure 36:
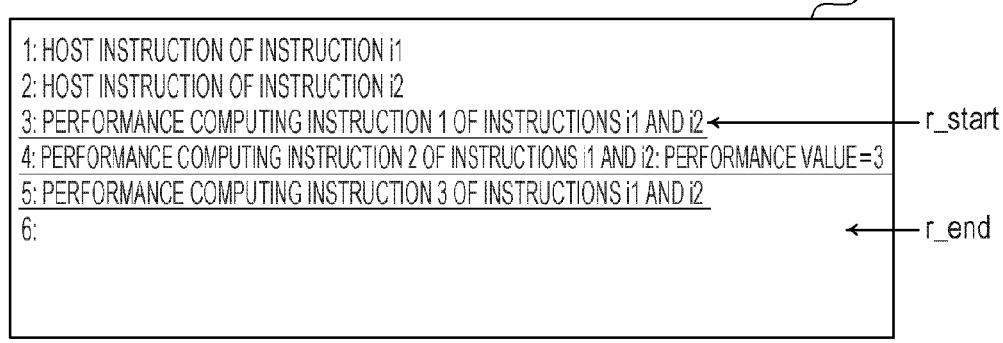
FIG. 36 is an explanatory diagram (part 5) illustrating detailed operation example 1 by the code optimization unit.

The replacing part 3105 generates an instruction group in which a host instruction included in an instruction group of a range from the instruction represented by r_start to the instruction represented by r_end and a performance computing instruction for adding the total value sum to the performance value of the target block b are arranged in order. As illustrated in FIG. 36, the replacing part 3105 generates a computational code cc362 by replacing the instruction group of the range from the instruction represented by r_start to the instruction represented by r_end with the generated instruction group. After the replacement is completed, the replacing part 3105 deletes m_helper from the call instruction list L_helper. The replacing part 3105 also corrects, based on the computational code cc321 before the replacement and the computational code cc362 after the replacement, addresses included in the call instruction list L_helper. Then, the code optimization unit 2201 repeats processing from the acquisition part 3101 to the replacing part 3105 until the call instruction list L_helper becomes empty.

Figure 37:
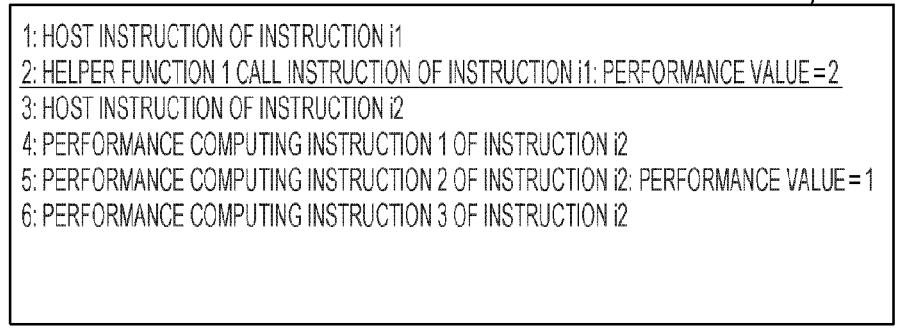
FIG. 37 is an explanatory diagram (part 1) illustrating detailed operation example 2 by the code optimization unit.
Figure 38:
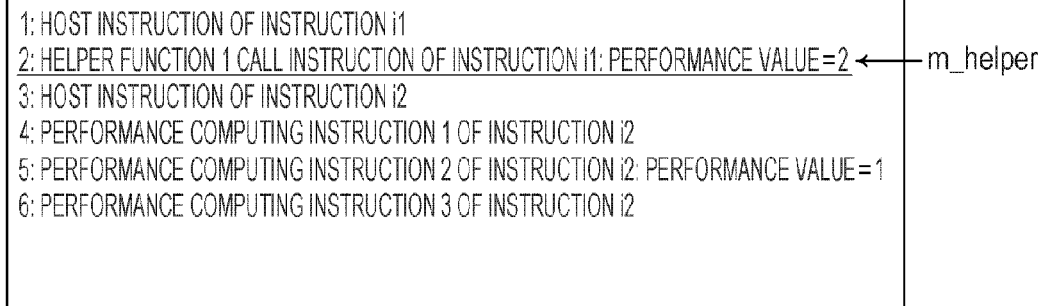
FIG. 38 is an explanatory diagram (part 2) illustrating detailed operation example 2 by the code optimization unit.

FIGS. 37 to 42 are explanatory diagrams illustrating the detailed operation example 2 by the code optimization unit. First, the acquisition part 3101 acquires a computational code cc371. The first detecting part 3102 selects an address included in the call instruction list L_helper, and defines the selected address as m_helper. Then, the first detecting part 3102 detects a helper function 1 call instruction represented by m_helper. In the example of FIG. 37, for easier understanding, the order of an instruction from the beginning is defined as the address of the instruction. Since "2" exists in the call instruction list L_helper, the first detecting part 3102 detects a helper function 1 call instruction of an instruction i1.

Figure 39:
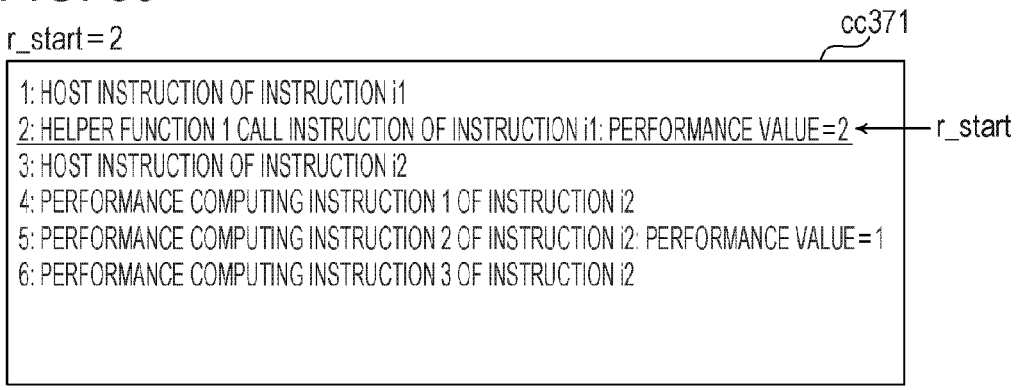
FIG. 39 is an explanatory diagram (part 3) illustrating detailed operation example 2 by the code optimization unit.

For example, in the case where an instruction coded immediately before the detected helper function 1 call instruction is a performance computing instruction, the second detecting part 3103 defines the address representing the performance computing instruction as r_start. In the case where the instruction coded immediately before the detected helper function 1 call instruction is not a performance computing instruction, the second detecting part 3103 defines the address representing the detected helper function 1 call instruction as r_start. In the example of FIG. 39, the address representing the helper function 1 call instruction of the instruction i1 represents r_start.

Figure 40:
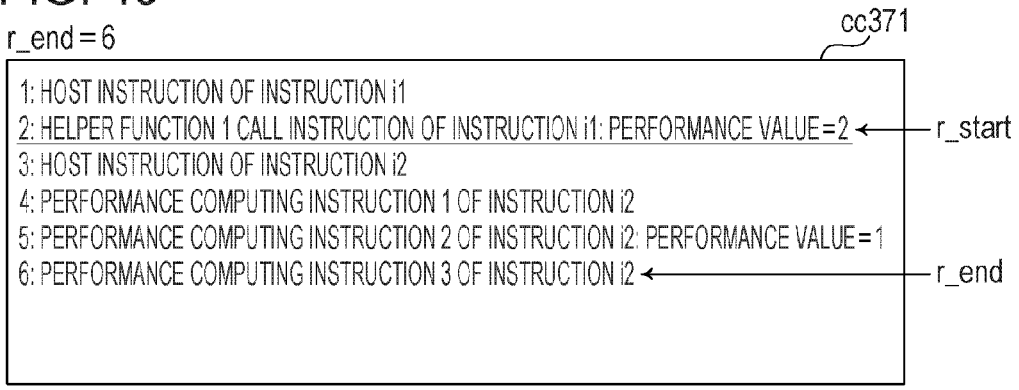
FIG. 40 is an explanatory diagram (part 4) illustrating detailed operation example 2 by the code optimization unit.

Then, the second detecting part 3103 searches for an instruction subsequent to the detected helper function 1 call instruction of the instruction i2. The second detecting part 3103 searches a range from the helper function 1 call instruction of the instruction i2 to a helper function 1 call instruction whose address is not registered in the call instruction list L_helper. The second detecting part 3103 defines an address representing an instruction immediately before the helper function 1 call instruction that is not registered, out of instructions existing between the helper function 1 call instruction of the instruction i2 and the helper function 1 call instruction that is not registered, as r_end. In the case where no helper function 1 call instruction whose address is not registered in the call instruction list L_helper follows the helper function 1 call instruction of the instruction i2, the second detecting part 3103 defines the address representing the last instruction within the target block b as r_end. In the example of FIG. 40, r_end represents the address representing the performance computing instruction of the instruction i2.

Figure 41:
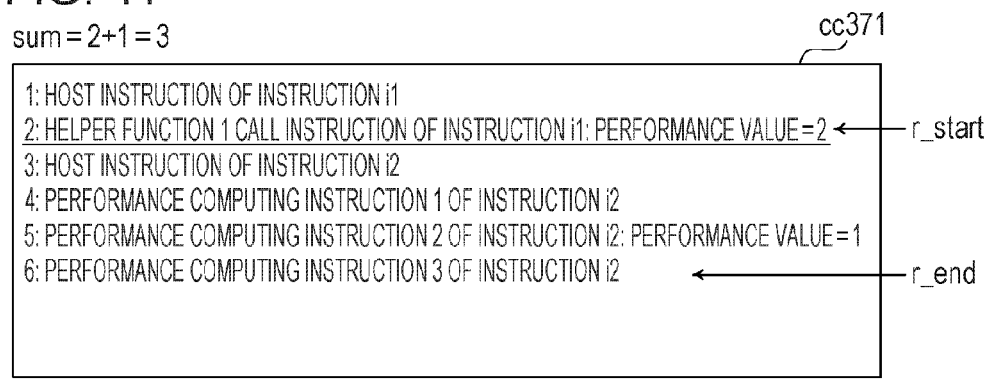
FIG. 41 is an explanatory diagram (part 5) illustrating detailed operation example 2 by the code optimization unit.

The calculating part 3104 acquires a performance value to be added to the performance value of the target block b based on a performance computing instruction in the instruction group of the range from the instruction represented by r_start to the instruction represented by r_end. The calculating part 3104 acquires a performance value to be added to the performance value of the target block b based on the helper function 1 call instruction of the instruction group. Then, the calculating part 3104 calculates the total value of the acquired performance values. In the example of FIG. 41, since the performance value of the helper function 1 call instruction of the instruction i1 is 2 and the performance value of the performance computing instruction 2 of the instruction i2 is 1, the total value sum is 3.

Figure 42:
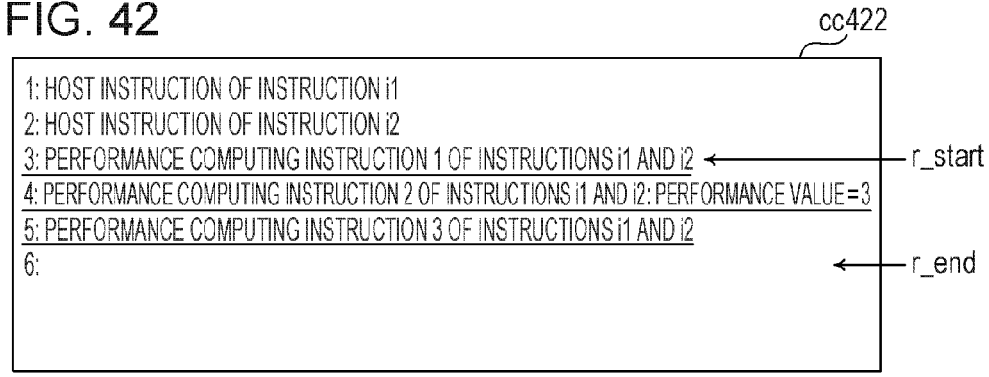
FIG. 42 is an explanatory diagram (part 6) illustrating detailed operation example 2 by the code optimization unit.

As in the operation example 1, the replacing part 3105 generates an instruction group in which a host instruction included in the instruction group of the range from the instruction represented by r_start to the instruction represented by r_end and a performance computing instruction for adding the total value sum to the performance value of the target block b are arranged in order. As illustrated in FIG. 42, the replacing part 3105 generates a computational code cc422 by replacing the instruction group of the range from the instruction represented by r_start to the instruction represented by r_end with the generated instruction group. After the replacement is completed, the replacing part 3105 deletes the address representing the helper function 1 call instruction included in the instruction group of the range from the instruction represented by r_start to the instruction represented by r_end from the call instruction list L_helper. The replacing part 3105 also corrects, based on the computational code cc371 before the replacement and the computational code cc422 after the replacement, addresses included in the call instruction list L_helper. Then, the code optimization unit 2201 repeats processing from the acquisition part 3101 to the replacing part 3105 until the call instruction list L_helper becomes empty.

As described above, by reducing the number of instructions included in a computational code, the amount of computation may be reduced.

Example of Computing Processing Procedure by Computing Apparatus 100 According to Fifth Embodiment In the fifth embodiment, a computing processing procedure example which is the same as that performed by the computing apparatus 100 according to the first or second embodiment will not be explained, and only computing processing different from that in the first and second embodiments will be explained in detail.

FIGS. 43 and 44 are flowcharts illustrating the code optimization process illustrated in FIG. 17 in detail. First, the computing apparatus 100 acquires a computational code as a target block b (step S4301). Then, the computing apparatus 100 determines whether or not a call instruction list L_helper is empty (step S4302). In the case where the call instruction list L_helper is not empty (step S4302: No), the computing apparatus 100 sets the first address of the addresses within the call instruction list L_helper for m_helper (step S4303).

Next, the computing apparatus 100 determines whether or not the instruction immediately before the helper function 1 call instruction represented by m_helper is a performance computing instruction (step S4401). In the case where the instruction is not a performance computing instruction (step S4401: No), the computing apparatus 100 sets m_helper as r_start (step S4402), and proceeds to step S4405.

In contrast, in the case where the instruction is a performance computing instruction (step S4401: Yes), the computing apparatus 100 sets the address of the performance computing instruction immediately before the helper function 1 call instruction as r_start (step S4403). The computing apparatus 100 detects a helper function 1 call instruction whose address is not included in the call instruction list L_helper from among instructions subsequent to the helper function 1 call instruction represented by m_helper (step S4404).

Then, the computing apparatus 100 determines whether or not a helper function 1 call instruction whose address is not included in the call instruction list L_helper is detected (S4405). In the case where a helper function 1 call instruction whose address is not included in the call instruction list L_helper is not detected (step S4405: No), the computing apparatus 100 sets m_helper as r_end (step S4406), and proceeds to step S4408. In the case where a helper function 1 call instruction whose address is not included in the call instruction list L_helper is detected (step S4405: Yes), the computing apparatus 100 sets the address representing the instruction immediately before the detected helper function 1 call instruction as r_end (step S4407).

Then, the computing apparatus 100 acquires the performance value of a performance computing instruction and the performance value of a helper function 1 call instruction existing in a range from the instruction represented by r_start to the instruction represented by r_end (step S4408). The computing apparatus 100 calculates the total value of the acquired performance values (step S4409).

The computing apparatus 100 generates an instruction group including a host instruction existing in a range from the instruction represented by r_start to the instruction represented by r_end and an performance computing instruction for addition of the calculated total value (step S4410). The computing apparatus 100 replaces an instruction group included in the range from the instruction represented by r_start to the instruction represented by r_end of the computational code with the generated instruction group (step S4411). The computing apparatus 100 deletes the address representing the helper function 1 call instruction existing in the range from the instruction represented by r_start to the instruction represented by r_end from the call instruction list L_helper (step S4412), and returns to step S4302.

In contrast, in the case where the call instruction list L_helper is empty in step S4302 (step S4302: Yes), the computing apparatus 100 detects a helper function 1 call instruction other than the helper function 1 call instruction represented by an address within the call instruction list L_helper of the computational code (step S4304). The computing apparatus 100 replaces the detected helper function 1 call instruction with a helper function 2 call instruction (step S4305), and terminates the series of processing operations.

As described above, the computing apparatus according to the first embodiment generates, in the case where an access destination of an access instruction in an operation simulation sim is not able to use a cache memory, a computational code for computing the performance value of a corresponding block based on the assumption that the cache memory is not used. Therefore, the amount of computation for the case where the block becomes a target again may be reduced.

Furthermore, the computing apparatus according to the first embodiment replaces a helper function 1 call instruction of an access instruction for which it has been determined that a cache memory is not available for use in a computational code with a performance computing instruction of an access instruction for the case where the cache memory is not available for use. Therefore, a computational code for computing the performance value of a block for the case where the cache memory is not available for use at the time of execution of an access instruction, may be generated easily.

The computing apparatus according to the second embodiment generates, in the case where an access instruction within a target block is able to use a cache memory, a computational code for computing the performance value of the block, by correcting the performance value based on an operation of the cache memory, without depending on an attribute of the memory area. Therefore, in the case where the target block becomes a new computing target, since a determination as to the attribute of the memory area is not made, the amount of computation of the performance value may be reduced.

Furthermore, the computing apparatus according to the second embodiment replaces a helper function 1 call instruction of an access instruction for which it has been determined that a cache memory is not available for use in a computational code with a helper function 2 call instruction. Therefore, a computational code for computing the performance value of a block for the case where a cache memory is available for use at the time of execution of an access instruction, may be easily generated.

The computing apparatus according to the third embodiment executes, during a period of time in which the state of a cache memory is shifted from an unavailable state for use to an available state for use, a computational code for computing the performance value of a target block based on the performance value of an access instruction for the case where the cache memory is not used. Therefore, the amount of computation of the performance value of a target block for a period during which the cache memory is not available for use, may be reduced, and the performance value of a target program may be computed more quickly.

Furthermore, the computing apparatus according to the third embodiment generates, when the state of the cache memory has been shifted to the available state for use, a computational code for computing the performance value of a block, based on the performance values of individual instructions within the block for the case where the cache memory is available for use. Therefore, an error in the computing result of the performance value of the target program may not occur.

Furthermore, in the computing apparatus according to the third embodiment, the TLB is not in an available state for use during initialization of the target CPU. Therefore, after the initialization of the target CPU is completed, the TLB becomes available for use. In the third embodiment, during the period in which the state of the TLB is shifted from an unavailable state for use to an available state for use, a computational code for computing the performance value of a target block based on the performance value of an access instruction for the case where the TLB is not used, is executed. Therefore, the amount of computation of the performance value of the target block during a period in which the TLB is not available for use may be reduced, and the performance value of the target program may be computed more quickly.

Furthermore, the computing apparatus according to the third embodiment generates, when the state of the TLB has been shifted to the available state for use, a computational code for computing the performance value of a block, based on the performance values of individual instructions within the block for the case where the TLB is used. Therefore, an error in the computing result of the performance value of the target program may not occur.

Furthermore, the computing apparatus according to the fourth embodiment generates, in the case where the operation mode is a privileged mode at the execution of an access instruction in an operation simulation, a computational code for computing the performance value of a target block, based on the performance values of individual instructions of the target bock for the case where there is a hit in the TLB.

Therefore, since processing for determining whether or not there is a hit in the TLB is not performed when the target block becomes a new computing target, the amount of computation for the case where the target block becomes a new computing target may be reduced.

The computing apparatus according to the fifth embodiment integrates consecutive performance computing instructions together into one performance computing instruction at the replacement of a helper function 1 call instruction with a performance computing instruction. Therefore, the amount of computation for the case where a target block becomes a new computing target may be reduced.

The computing methods explained in the foregoing embodiments may be realized when a computer, such as a personal computer or a work station, executes a prepared program. The method is summarized as follows;

A computing method for use in a computer which computes a performance value of a program for a case where the program is executed by a processor, the program including a specific code which is executed multiple times by the processor and which includes an access instruction for instructing the processor to access a memory area, the method including:

determining, in a case where the specific code has become a computing target for a performance value, whether or not the processor is able to use a cache memory at a time of execution of the access instruction in a simulation of an operation in which the processor executes the program, in accordance with a direction of the access instruction;

generating, in a case where it has been determined that the cache memory is not in an available state for use, a computational code for computing the performance value of the specific code for a case where the processor executes the specific code, based on performance values of individual instructions within the specific code for a case where the cache memory is not used, without depending on an attribute of the memory area; and executing, in a case where the specific code has become a new computing target for a performance value, the generated computational code.

Or, a computing method for use in a computer which computes a performance value of a program for a case where the program is executed by a processor, the program including a specific code which is executed multiple times by the processor and which includes an access instruction for instructing the processor to access a memory area, the method including:

determining, in a case where the specific code has become a computing target for a performance value, whether or not a translation lookaside buffer accessible by the processor is in an available state for use at a time of execution of the access instruction in a simulation of an operation in which the processor executes the program;

generating, in a case where it has been determined that the translation lookaside buffer is available for use, a computational code for computing the performance value of the specific code for a case where the processor executes the specific code, based on performance values of individual instructions within the specific code for a case where the translation lookaside buffer is not used, without depending on a state of the translation lookaside buffer;

executing the generated computational code;

determining, in a case where the specific code has become a new computing target for a performance value, whether or not the translation lookaside buffer is in the available state for use at the execution of the access instruction in the simulation; and executing, in a case where it has been determined that the translation lookaside buffer is not in the available state for use, the computational code.

Or, a computing method for use in a computer which computes a performance value of a program for a case where the program is executed by a processor having two operation modes, a first mode and a second mode in which an operation is less limited compared to the first mode, the program including a specific code which is executed multiple times by the processor and which includes an access instruction for instructing the processor to access a memory area, the method including:

determining, in a case where the specific code has become a computing target for a performance value, whether or not the operation mode at a time of execution of the access instruction in a simulation of an operation in which the program is executed by the processor is the second mode;

generating, in a case where it has been determined that the operation mode is the second mode, a computational code for computing the performance value of the specific code for a case where the processor executes the specific code, based on performance values of individual instructions within the specific code for a case where conversion information of a logical address representing the memory area and a physical address representing the memory area is stored in a translation lookaside buffer accessible by the processor, without depending on the operation mode; and executing, in a case where the specific code has become a new computing target for a performance value, the generated computational code.

The present computing program may be executed when a computer reads the computing program recorded in a recording medium which is readable by a computer, such as a disk or a Universal Serial Bus (USB) memory. Alternatively, the present computing program may be distributed via a network NET, such as the Internet.

Regarding the first to fifth embodiments described above, the followings are disclosed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A computing apparatus that computes a performance value of a program for a case where the program is executed by a processor, the program including a specific code which is executed multiple times by the processor and which includes an access instruction for instructing the processor to access a memory area, the computer apparatus comprising:

a first determining unit that determines, in a case where the specific code has become a computing target for a performance value, whether or not a cache memory accessible by the processor is in an available state for use at a time of execution of the access instruction in a simulation of an operation in which the processor executes the program, in accordance with a direction of the access instruction;

a generating unit that generates, in a case where the first determining unit has determined that the cache memory is not in the available state for use, a computational code for computing the performance value of the specific code for a case where the processor executes the specific code, based on performance values of individual instructions within the specific code for a case where the cache memory is not used, without depending on an attribute of the memory area; and an execution unit that executes the generated computational code in a case where the specific code has become a new computing target for a performance value.

2. The computing apparatus according to claim 1, wherein the first determining unit determines, in accordance with whether or not the attribute of the memory area is an attribute which indicates that the processor is able to use the cache memory in accordance with the direction of the access instruction, whether or not the cache memory accessible by the processor is in the available state for use.

3. The computing apparatus according to claim 1, wherein the first determining unit makes a determination before the access instruction is executed in the simulation.

4. The computing apparatus according to claim 1, wherein in a case where it has been determined that the cache memory is available for use, the generating unit generates a computational code for computing the performance value of the specific code, based on performance values of individual instructions within the specific code for a case where the cache memory is used, without depending on the attribute.

5. The computing apparatus according to claim 1,
wherein the computational code generated by the generating unit is a first computational code and the generating unit generates the first computational code by
acquiring a second computational code including a first computing instruction for adding performance values of individual instructions different from the access instruction within the specific code to the performance value of the specific code, and a second computing instruction for adding the performance value of the access instruction based on the attribute to the performance value of the specific code, and
replacing, in the acquired second computational code, a second computing instruction for the access instruction for which it has been determined that the attribute does not indicate that the cache memory is available for use, with a third computing instruction for adding the performance value of the access instruction for the case where the cache memory is not used to the performance value of the specific code.

6. The computing apparatus according to claim 4,
wherein the computational code generated by the generating unit is a first computational code and the generating unit generates the first computational code by
acquiring a second computational code including a first computing instruction for adding performance values of individual instructions different from the access instruction within the specific code to the performance value of the specific code, and a second computing instruction for adding the performance value of the access instruction based on the attribute to the performance value of the specific code, and
replacing, in the acquired second computational code, a second computing instruction for the access instruction for which it has been determined that the attribute indicates that the cache memory is available for use, with a third computing instruction for adding the performance value of the access instruction for the case where the cache memory is used to the performance value of the specific code.

7. The computing apparatus according to claim 1,
wherein the computational code generated by the generating unit is a first computational code and the generating unit generates the first computational code by
acquiring a second computational code including a first computing instruction for adding performance values of individual instructions different from the access instruction within the specific code to the performance value of the specific code, and a second computing instruction for adding performance values of individual access instructions based on the attribute to the performance value of the specific code,
detecting, in the acquired second computational code, a second computing instruction for the access instruction for which it has been determined that the attribute does not indicate that the cache memory is available for use,
detecting, from the second computational code, a first computing instruction existing in a range from the detected second computing instruction to a second computing instruction for the access instruction for which it has been determined that the attribute indicates that the cache memory is available for use,
calculating a total sum of the performance value of the instruction to be added to the performance value of the specific code based on the detected first computing instruction, and the performance value of the access instruction for a case where the cache memory is not used at a time of execution of the access instruction for which it has been determined that the attribute does not indicate that the cache memory is available for use, and
replacing the detected first computing instruction and the detected second computing instruction in the second computational code with a third computing instruction for adding the total sum to the performance value of the specific code.

8. The computing apparatus according to claim 1, further comprising:
a second determining unit that performs, in a case where the specific code has become a new computing target for a performance value, a determination as to whether or not the cache memory accessible by the processor is in an available state for use at the time of execution of the access instruction in the simulation, before the execution of the access instruction in the simulation; and
a second execution unit that executes the computational code in a case where the second determining unit has determined that the cache memory is not in the available state for use.

9. A computing apparatus that computes a performance value of a program for a case where the program is executed by a processor, the program including a specific code which is executed multiple times by the processor and which includes an access instruction for instructing the processor to access a memory area, comprising:
a first determining unit that determines, in a case where the specific code has become a computing target for a performance value, whether or not a translation lookaside buffer accessible by the processor is in an available state for use at a time of execution of the access instruction in a simulation of an operation in which the processor executes the program;
a generating unit that generates, in a case where the first determining unit has determined that the translation lookaside buffer is available for use, a computational code for computing the performance value of the specific code for a case where the processor executes the specific code, based on performance values of individual instructions within the specific code for a case where the translation lookaside buffer is not used, without depending on a state of the translation lookaside buffer;
a first execution unit that executes the computational code generated by the generating unit;
a second determining unit that determines, in a case where the specific code has become a new computing target for a performance value, whether or not the translation lookaside buffer is in the available state for use at the time of execution of the access instruction in the simulation; and
a second execution unit that executes the computational code in a case where the second determining unit has determined that the translation lookaside buffer is not in the available state for use.

10. The computing apparatus according to claim 9,
wherein in a case where it has been determined that the translation lookaside buffer is in the available state for use, the generating unit generates a computational code for computing the performance value of the specific code, based on performance values of individual instructions within the specific code for a case where the translation lookaside buffer is used.

11. A computing apparatus that computes a performance value of a program for a case where the program is executed by a processor having two operation modes, a first mode and a second mode in which an operation is less limited compared to the first mode, the program including a specific code which is executed multiple times by the processor and which includes an access instruction for instructing the processor to access a memory area, comprising:
a determining unit that determines, in a case where the specific code has become a computing target for a performance value, whether or not the operation mode at a time of execution of the access instruction in a simulation of an operation in which the processor executes the program is the second mode;
a generating unit that generates, in a case where the determining unit has determined that the operation mode is the second mode, a computational code for computing the performance value of the specific code for a case where the processor executes the specific code, based on performance values of individual instructions within the specific code for a case where conversion information of a logical address representing the memory area and a physical address representing the memory area is stored in a translation lookaside buffer accessible by the processor, without depending on the operation mode; and
an execution unit that executes, in a case where the specific code has become a new computing target for a performance value, the computational code generated by the generating unit.

12. The computing apparatus according to claim 11,
wherein in a case where the determining unit has determined that the operation mode is not the second mode, the generating unit generates a computational code for computing the performance value of the specific code for a case where the processor executes the specific code, based on performance values of individual instructions within the specific code for a case where the translation lookaside buffer is used, without depending on the operation mode.

13. The computing apparatus according to claim 11, wherein the computational code generated by the generating unit is a first computational code and the generating unit generates the first computational code by acquiring a second computational code including a first computing instruction for adding performance values of individual instructions different from the access instruction within the specific code to the performance value of the specific code, and a second computing instruction for adding the performance value of the access instruction based on whether or not the conversion information is stored in the translation lookaside buffer to the performance value of the specific code, and replacing, in the acquired second computational code, a second computing instruction for the access instruction for which it has been determined that the operation mode is the second mode, with a third computing instruction for adding the performance value of the access instruction for the case where the conversion information is stored in the translation lookaside buffer to the performance value of the specific code.

14. The computing apparatus according to claim 11, wherein the computational code generated by the generating unit is a first computational code and the generating unit generates the first computational code by acquiring a second computational code including a first computing instruction for adding performance values of individual instructions different from the access instruction within the specific code to the performance value of the specific code, and a second computing instruction for adding performance values of individual access instructions based on whether or not the conversion information is stored in the translation lookaside buffer to the performance value of the specific code, detecting, in the acquired second computational code, a second computing instruction for the access instruction for which it has been determined that the operation mode is the second mode, detecting, from the second computational code, a first computing instruction existing in a range from the detected second computing instruction to a second computing instruction for the access instruction for which it has been determined that the operation mode is not the second mode, calculating a total sum of the performance value of the instruction to be added to the performance value of the specific code based on the detected first computing instruction, and the performance value of the access instruction for the case where the conversion information is stored in the translation lookaside buffer at the time of execution of the access instruction for which it has been determined that the operation mode is the second mode, and replacing the detected first computing instruction and the detected second computing instruction in the second computational code with a third computing instruction for adding the total sum to the performance value of the specific code.

\* \* \* \* \*